(12) United States Patent
Menassa et al.

(10) Patent No.: US 11,305,949 B1
(45) Date of Patent: Apr. 19, 2022

(54) AUTOMATED TRAY HANDLING SYSTEMS AND METHODS

(71) Applicant: Amazon Technologies, Inc., Seattle, WA (US)

(72) Inventors: Roland J. Menassa, Renton, WA (US); Larry Joe Robb, Miramar Beach, FL (US); Vatsal Mehta, Renton, WA (US); Duncan Pratt, Issaquah, WA (US); Max Alfonso Bruccoleri, Seattle, WA (US); Robert Brown, Fairwood, MI (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 16/532,863

(22) Filed: Aug. 6, 2019

(51) Int. Cl.
*G06F 7/00* (2006.01)
*B65G 47/90* (2006.01)
*B65G 1/137* (2006.01)

(52) U.S. Cl.
CPC ......... *B65G 47/905* (2013.01); *B65G 1/1373* (2013.01); *B65G 2201/0258* (2013.01)

(58) Field of Classification Search
CPC ............... B65G 47/905; B65G 1/1373; B65G 2201/0258
See application file for complete search history.

(56) References Cited

U.S. PATENT DOCUMENTS

2014/0262979 A1* 9/2014 Bonora ..................... B07C 5/00 209/577

* cited by examiner

*Primary Examiner* — Yolanda R Cumbess
(74) *Attorney, Agent, or Firm* — Athorus, PLLC

(57) ABSTRACT

Automated tray handling systems and methods may include robotic systems having various end effectors to move trays relative to item sortation systems. For example, the robotic systems may include robotic arms and gantry systems. In addition, the various end effectors may include dual end effectors and passthrough end effectors. The dual end effectors may lift, move, and place trays by engaging and clamping onto flanges of the trays. The passthrough end effectors may lift, move, and place trays through an interior of the end effectors by engaging and pulling or pushing flanges, edges, or other surfaces of the trays. The various automated tray handling systems and methods may increase the speed and efficiency of such processes while also reducing or minimizing the space required for such systems.

23 Claims, 32 Drawing Sheets

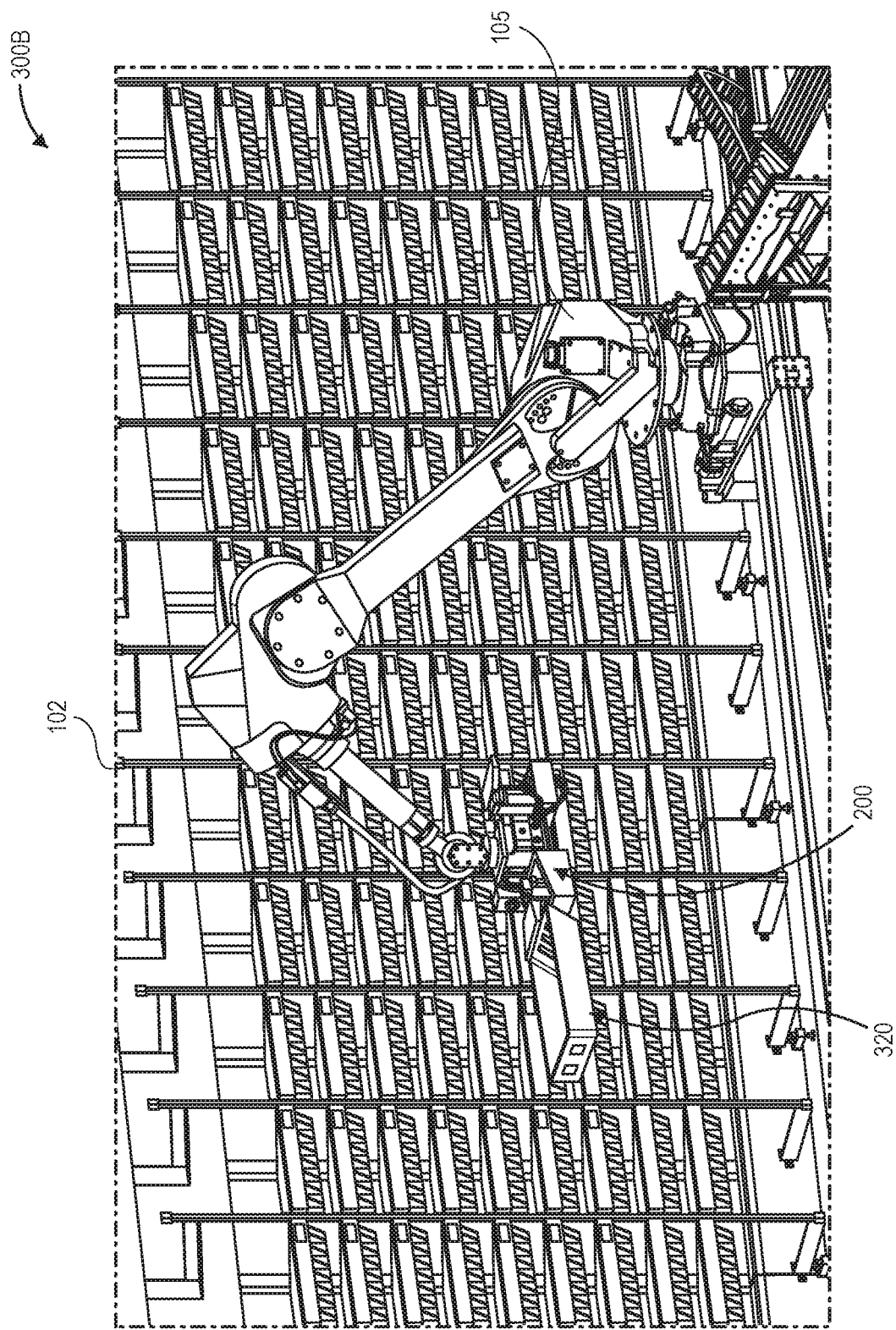

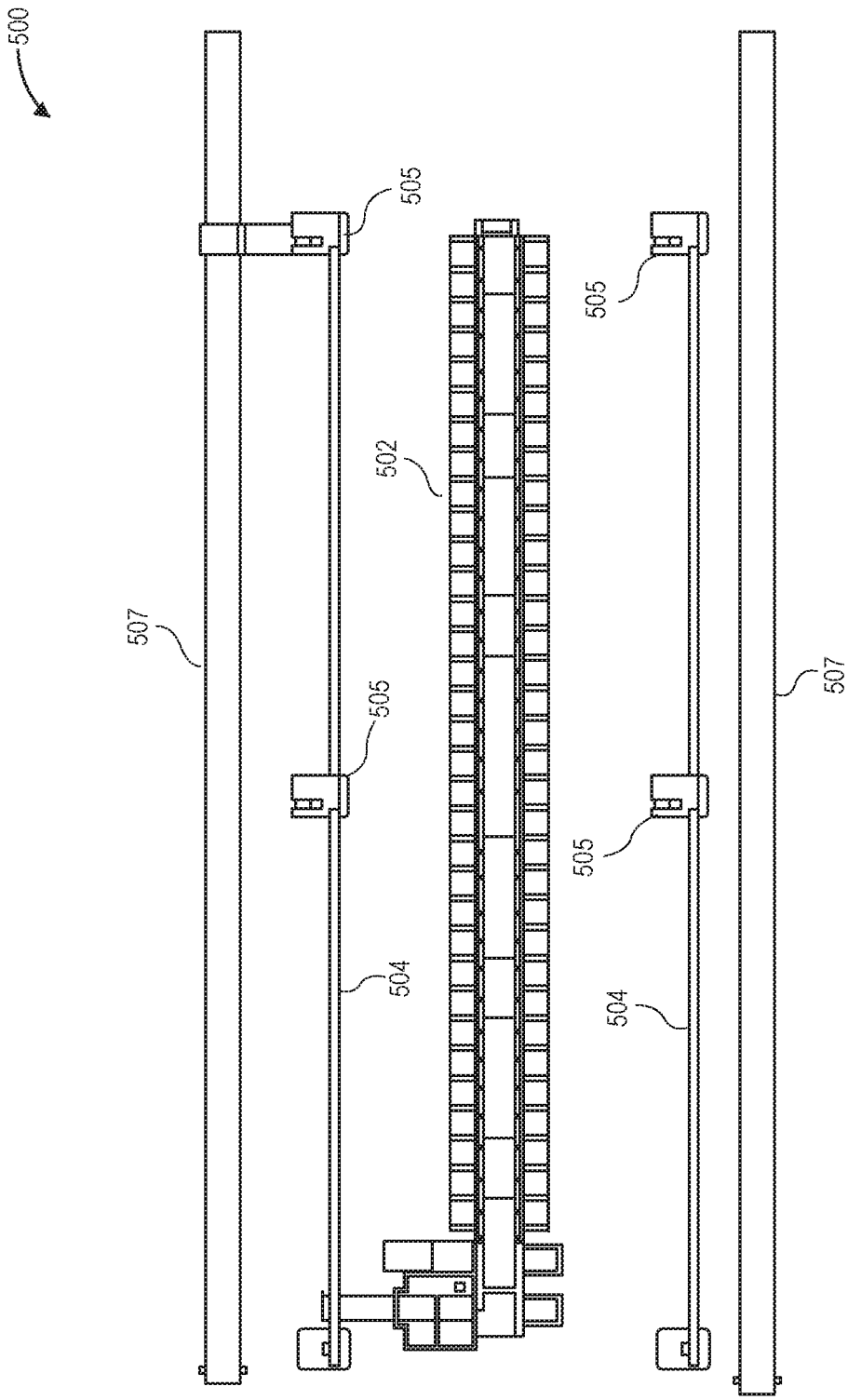

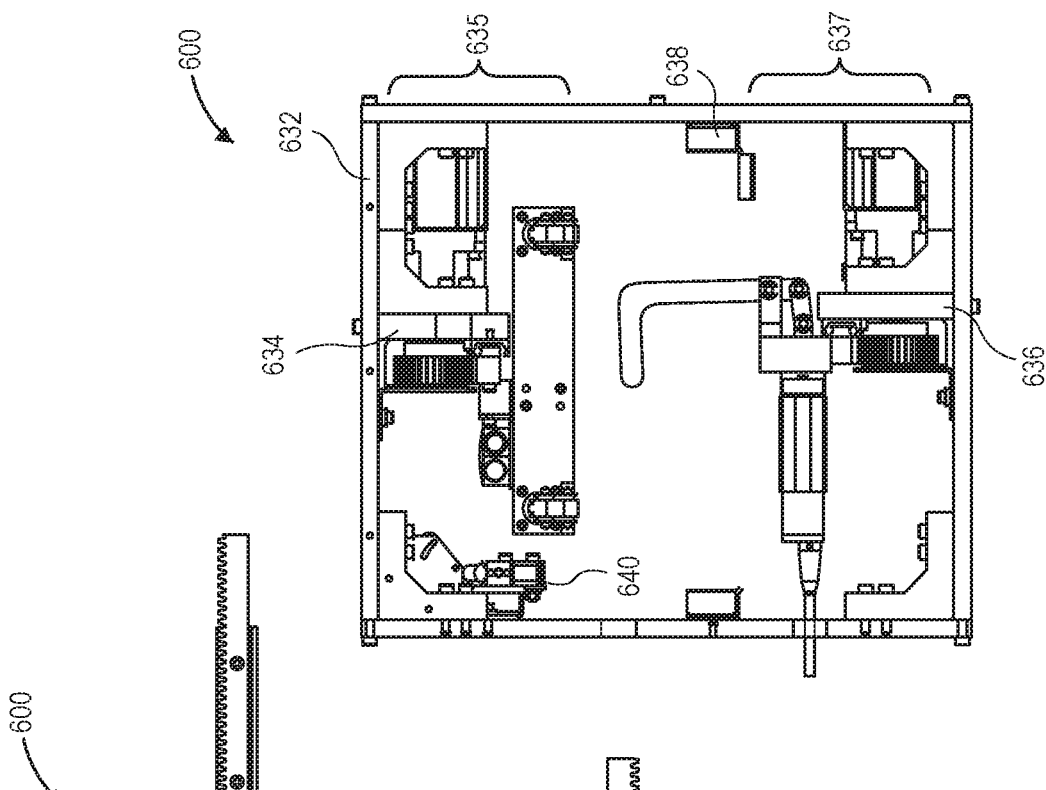
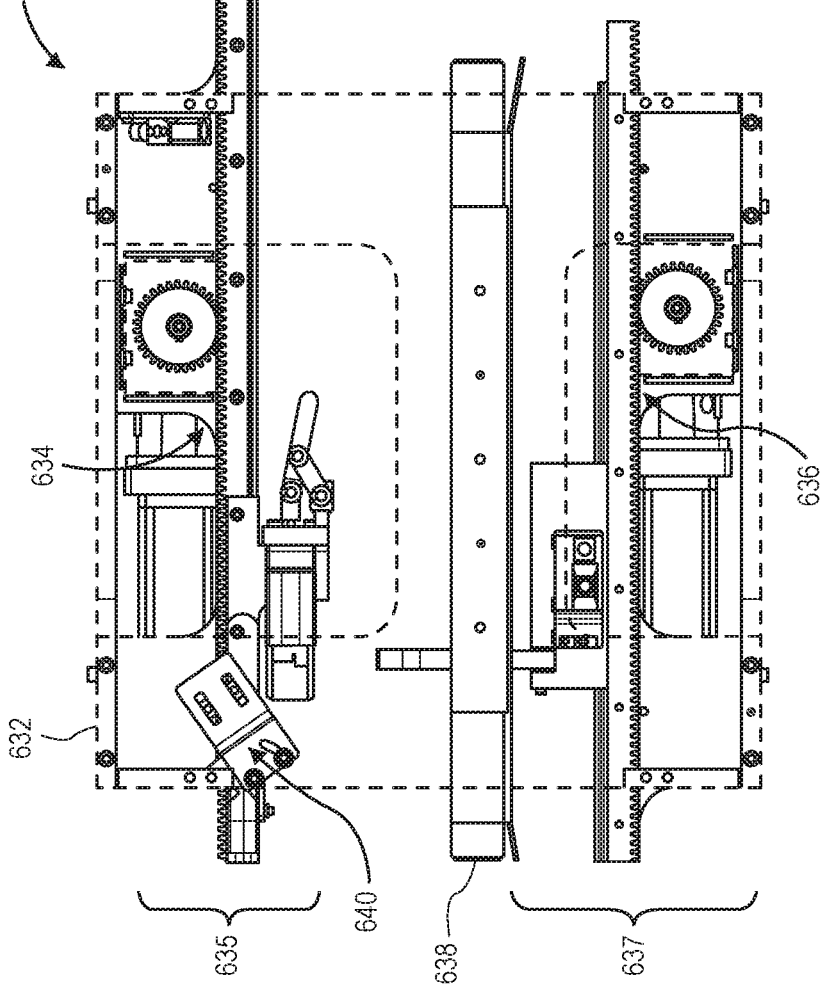

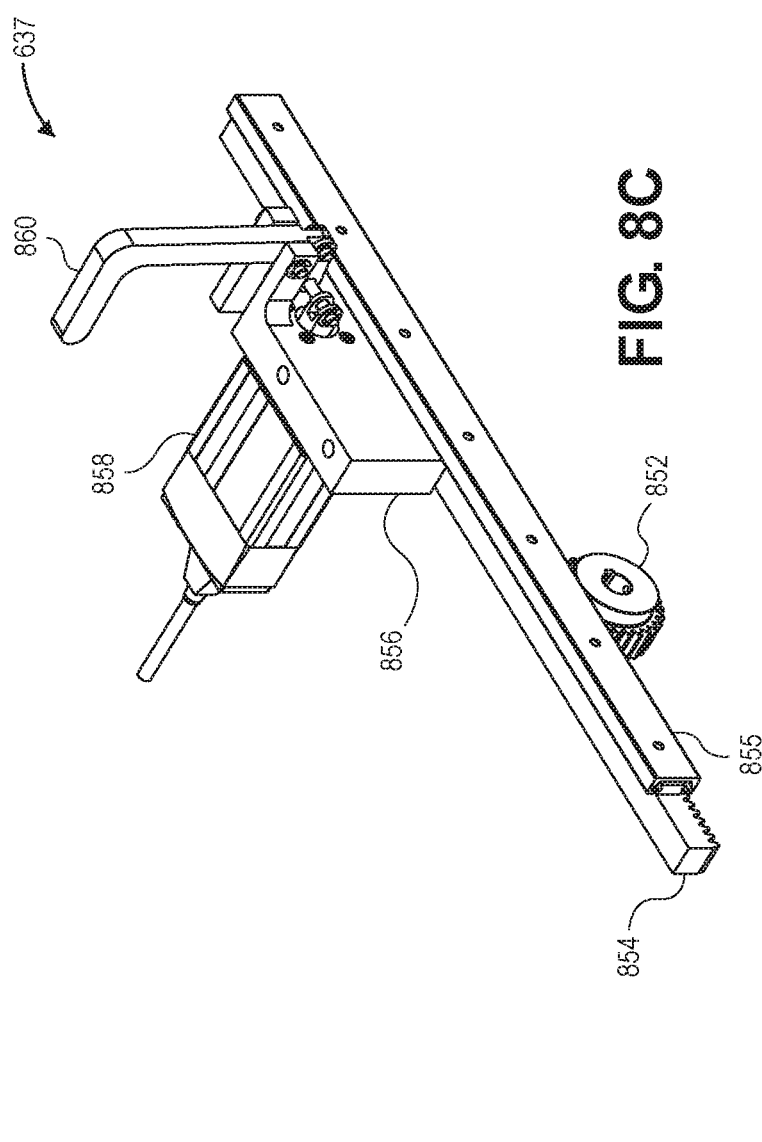
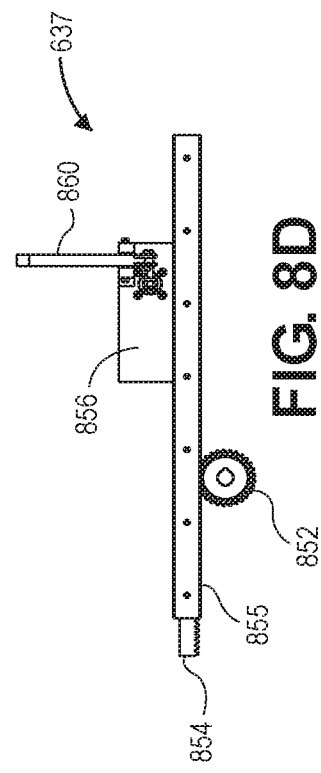
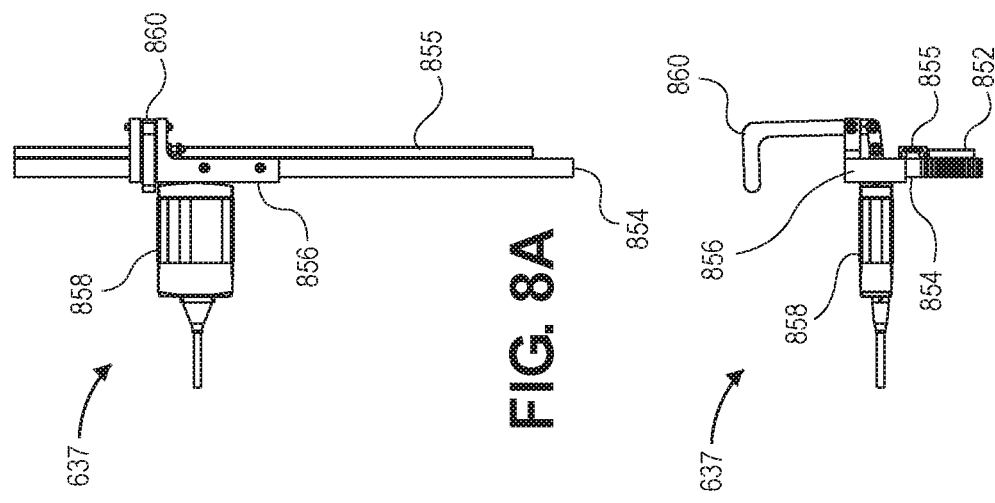

AUTOMATED TRAY HANDLING SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Various material handling processes, including receipt, sorting, storage, packing, shipping, or other processing of items within a material handling facility, often incur significant cost and time. Accordingly, there is a need for automated systems and methods to facilitate the various material handling processes within a material handling facility, thereby improving the speed and efficiency of such processes.

BRIEF DESCRIPTION OF THE DRAWINGS

The detailed description is presented with reference to the accompanying figures. In the figures, the left-most digit(s) of a reference number identifies the figure in which the reference number first appears. The use of the same reference numbers in different figures indicates similar or identical components or features.

FIGS. 3A-3H are schematic diagrams of an example dual end effector tray removal/replenishment process of an automated tray handling system, in accordance with disclosed implementations.

FIG. 5 is an overhead schematic diagram of another example automated tray handling system associated with an item sortation system, in accordance with disclosed implementations.

FIGS. 6A-6C are perspective, side, and front view schematic diagrams, respectively, of an example passthrough end effector of an automated tray handling system, in accordance with disclosed implementations.

FIGS. 8A-8D are top, front, perspective, and side view schematic diagrams, respectively, of an example lower finger assembly of the example passthrough end effector of an automated tray handling system, in accordance with disclosed implementations.

Figure 1:
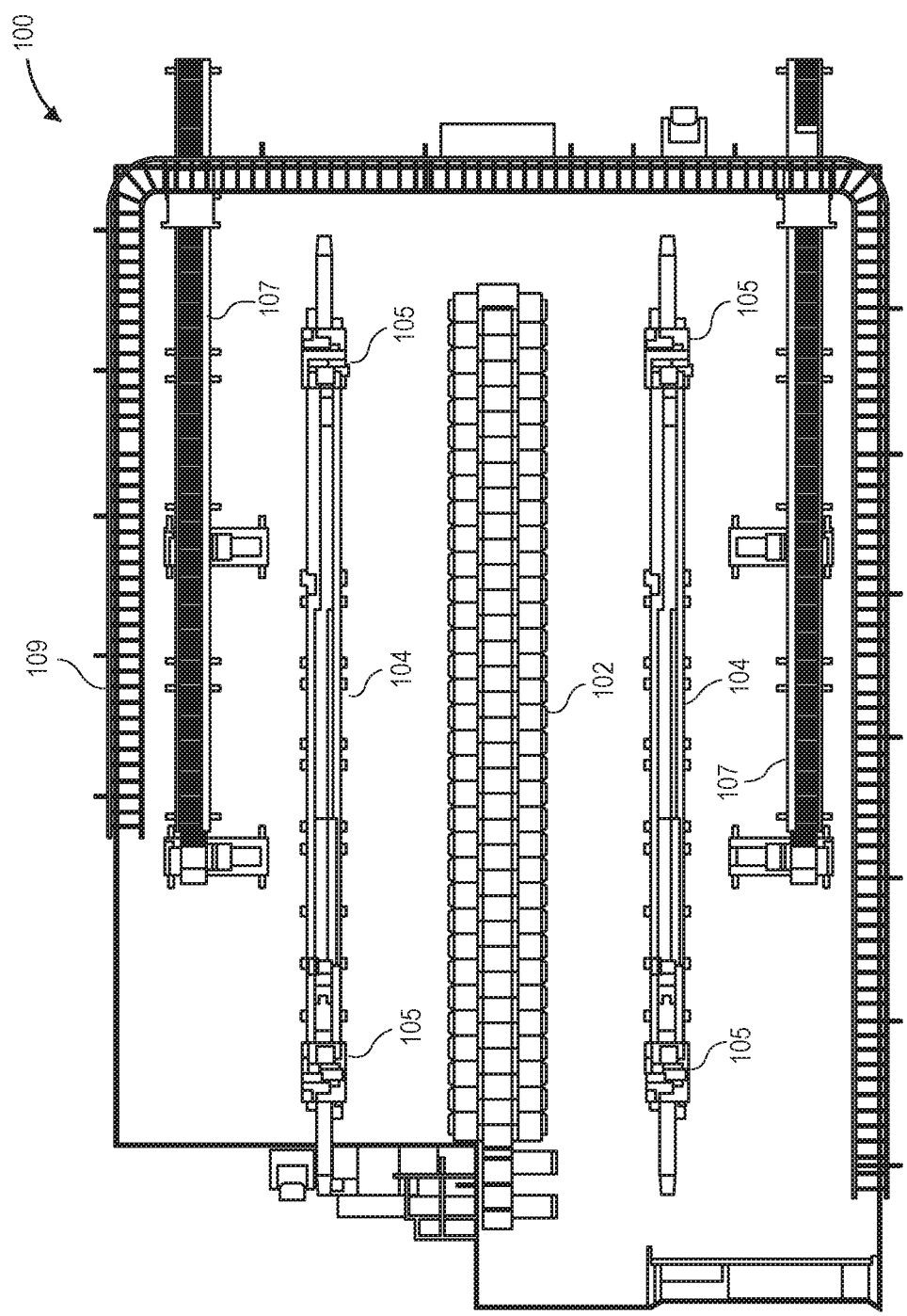
FIG. 1 is an overhead schematic diagram of an example automated tray handling system associated with an item sortation system, in accordance with disclosed implementations.
Figure 2A:
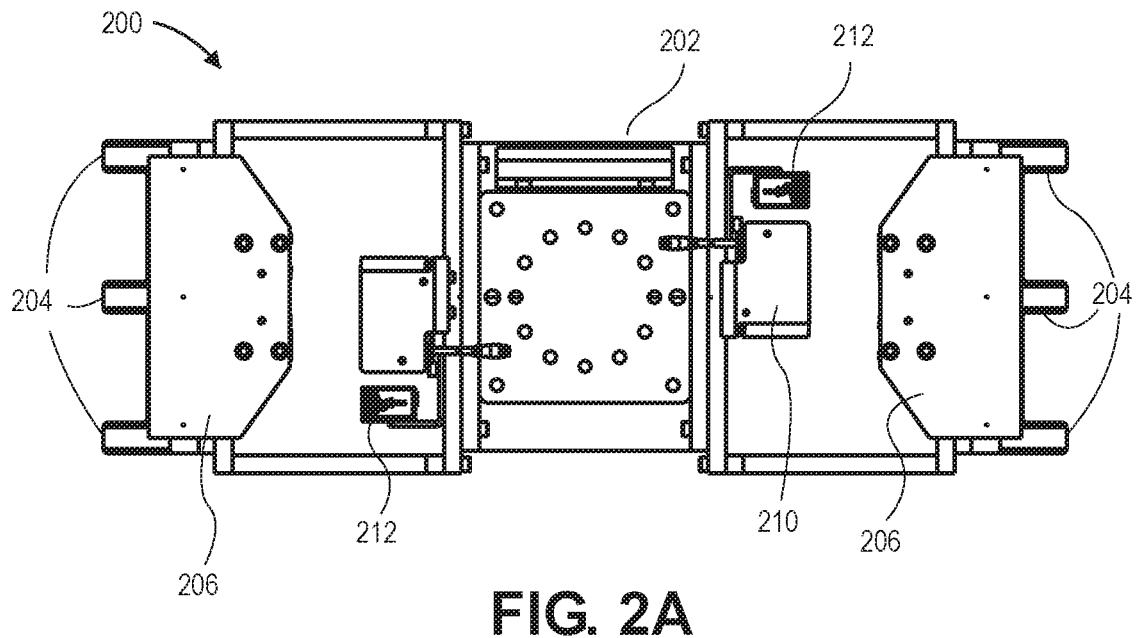
FIGS. 2A-2D are top, perspective, side, and front view schematic diagrams, respectively, of an example dual end effector of an automated tray handling system, in accordance with disclosed implementations.
Figure 2B:
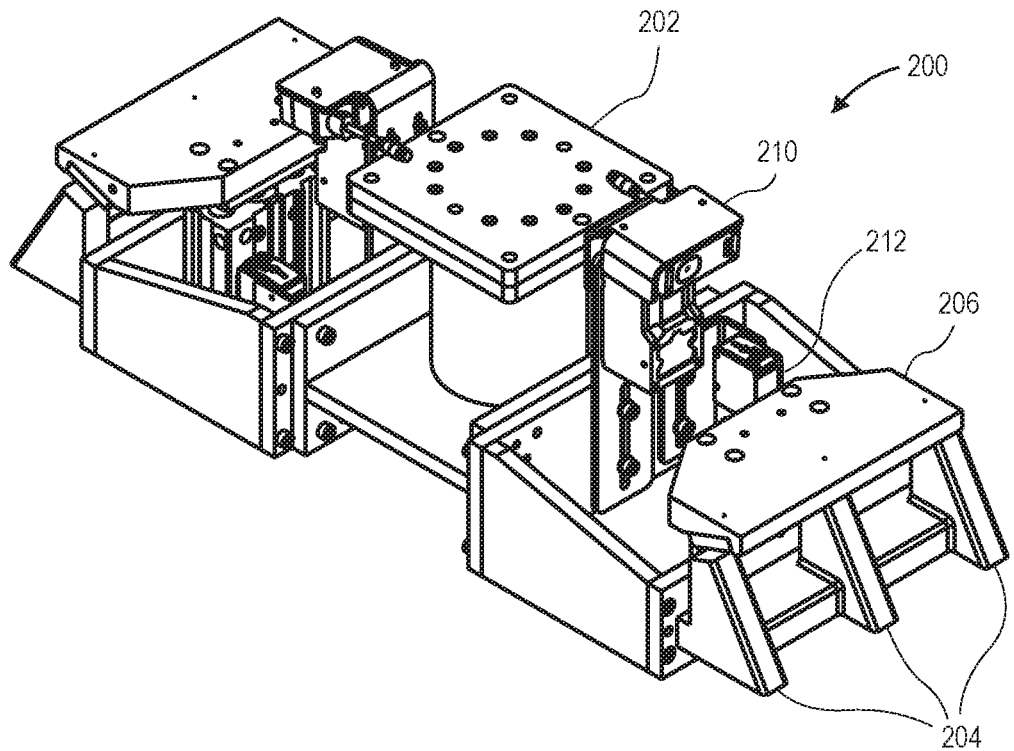
Figure 2C:
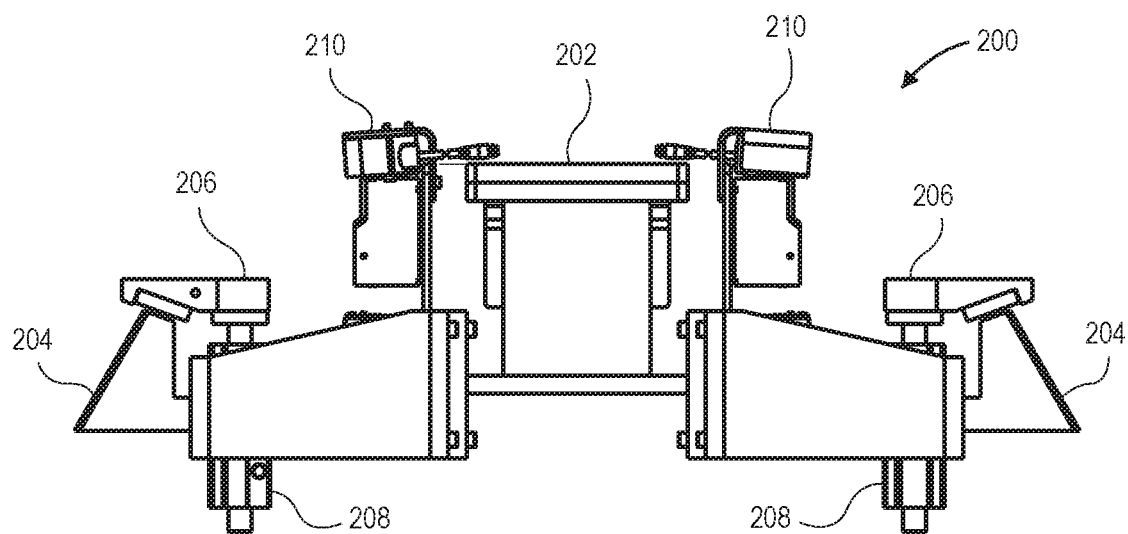
Figure 2D:
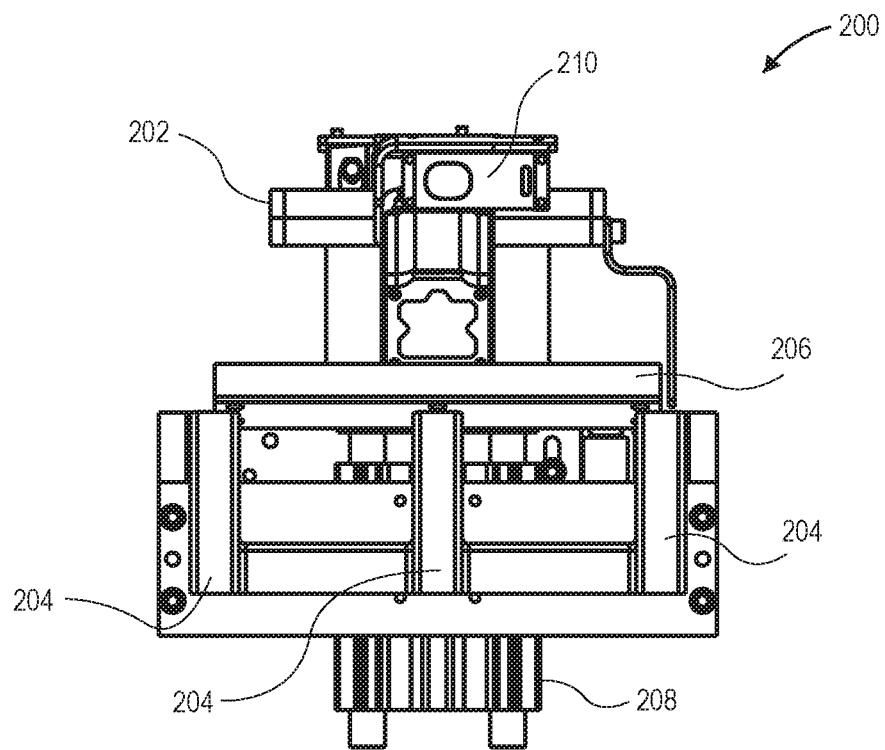

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein relate to automated tray handling systems and processes. For example, the automated tray handling systems may remove trays from and place trays in tray positions of an item sortation system. In addition, the automated tray handling systems may receive trays from upstream stations or processes and place or transfer trays to downstream stations or processes. Upstream and downstream stations or processes may comprise various stations or processes within a material handling facility, such as receive, sortation, storage, picking, consolidation, packing, shipping, or others. Each of the trays may be empty or may include one or more items sorted to the trays by the item sortation system.

In example embodiments, the automated tray handling systems may include a robotic system such as a robotic arm, and a dual end effector. The dual end effector may be coupled to the robotic arm, and the robotic arm may manipulate, move, and/or rotate the dual end effector. For example, the dual end effector may include a frame, and grasping elements on opposite sides of the frame. The grasping elements may further include locking plates and associated actuators. In some example embodiments, the grasping elements may be sized or configured to engage with and lift trays via an underside of a flange or lip of the trays. In addition, the locking plates may be configured to engage with an upper side of the flange or lip of the trays, such that the trays are held between the grasping elements and the locking plates.

Further, a first grasping element, first locking plate, and first actuator associated with a first side of the frame of the dual end effector may be configured to engage, lift, and manipulate trays having one or more items sorted thereto by the item sortation system relative to tray positions of the item sortation system and downstream stations or processes. In addition, a second grasping element, second locking plate, and second actuator associated with a second side of the frame of the dual end effector may be configured to engage, lift, and manipulate empty trays relative to tray positions of the item sortation system and upstream stations or processes.

In other example embodiments, the automated tray handling systems may include a robotic system such as a gantry system, and a passthrough end effector. The passthrough end effector may be coupled to the gantry system, and the gantry system may manipulate, move, and/or rotate the passthrough end effector. For example, the passthrough end effector may include a frame, tray guides, a lower finger assembly, an upper finger assembly, and associated actuators. The lower finger assembly may be configured to move one or more lower fingers between a lowered or stowed position, and a raised or engaged position, in which the one or more lower fingers may engage with and lift trays via an underside of a flange or lip of the trays. The upper finger assembly may be configured to move one or more upper fingers between a raised or stowed position, and a lowered or engaged position, in which the one or more upper fingers may engage with trays via an upper edge of the trays.

Further, the lower finger assembly may include a linear actuator to move trays relative to tray positions of the item sortation system, an interior of the passthrough end effector, downstream stations or processes, and upstream stations or processes. In addition, the upper finger assembly may also include a linear actuator to move trays relative to tray positions of the item sortation system, an interior of the passthrough end effector, downstream stations or processes, and upstream stations or processes.

In further example embodiments, the automated tray handling systems may include a robotic system such as a gantry system, and a passthrough belted end effector. The passthrough belted end effector may be coupled to the gantry system, and the gantry system may manipulate, move, and/or rotate the passthrough belted end effector. For example, the passthrough belted end effector may include a frame, tray guides, one or more belts, and associated actuators. The one or more belts may be configured to move or translate in either direction to engage, lift, and move trays via an underside of the trays. Further, the one or more belts may move trays relative to tray positions of the item sortation system, an interior of the passthrough belted end effector, downstream stations or processes, and upstream stations or processes.

Using the various automated tray handling systems described herein, various tray handling processes may be performed more quickly and efficiently, which may in turn enable increased speed or efficiency of upstream processes, e.g., item sortation, as well as downstream processes, e.g., packing and shipping. Further, the automated tray handling systems described herein may utilize less physical space or footprint compared to conventional, manual tray handling processes.

FIG. 1 is an overhead schematic diagram of an example automated tray handling system 100 associated with an item sortation system, in accordance with disclosed implementations.

As shown in FIG. 1, an item sortation system 102 may receive items from various upstream stations or processes, e.g., via conveyors, slides, chutes, totes, containers, robotic drive units, other material handling equipment, or other automated or manual processes. The items may comprise various types of items, including books, electronics, toys, sporting goods, tools, housewares, clothing, shoes, jewelry, packaged foods, or other types of items. The item sortation system 102 may also receive a plurality of trays, e.g., ten, twenty, one hundred, or more trays, at a respective plurality of tray positions on one or more sides of the item sortation system 102 to which the various items may be sorted. Each of the one or more sides of the item sortation system 102 may form an array of trays that may be individually placed and removed at respective tray positions, and to which one or more items may be sorted. In example embodiments, the item sortation system 102 may sort items to individual trays corresponding to customer orders or other item bundles or groups on either side of the item sortation system 102. Each of the plurality of trays may receive one or more items that are sorted thereto.

Along each side of the item sortation system 102 that includes a plurality of trays at the respective plurality of tray positions, one or more robotic systems, machines, or apparatus, such as six-axis, multi-axis, or other types or configurations of robotic arms 105, may be configured to move along respective rails 104, and the respective rails 104 may extend substantially parallel to respective sides or planes of the item sortation system 102 having respective pluralities of trays at tray positions. In example embodiments, the rails 104 may be positioned on or proximate a ground, and the one or more robotic arms 105 may move along and substantially above the rails 104. In other example embodiments, the rails 104 may be positioned on or associated with walls, ceilings, or other support structures, and the one or more robotic arms 105 may move along such other support structures, e.g., substantially adjacent and along rails associated with a wall, substantially below rails associated with a ceiling, or other arrangements and configurations. The robotic arms 105 may move or translate in either direction along the rails 104 and manipulate various trays relative to tray positions of the item sortation system 102. For example, the robotic arms 105 may include end effectors to place empty trays at tray positions of the item sortation system 102, and the robotic arms 105 may include end effectors to remove full trays from tray positions of the item sortation system 102.

Adjacent the rails 104 and associated one or more robotic arms 105 may be one or more conveyors 107. For example, the conveyors 107 may be two-tier or two-level conveyors, with upper tiers or levels configured to move and transport trays in a first direction and lower tiers or levels configured to move and transport trays in a second direction opposite the first direction. In example embodiments, the robotic arms 105 and associated end effectors may remove full trays from tray positions of the item sortation system 102 and place the full trays on the upper tiers of the conveyors 107 to transport the full trays to downstream stations or processes. In addition, the robotic arms 105 and associated end effectors may remove empty trays from the lower tiers of the conveyors 107 that have been transported from upstream stations or processes and place the empty trays at empty tray positions of the item sortation system 102.

Further, the item sortation system 102, rails 104, robotic arms 105, and conveyors 107 may be surrounded by a fence, rail, or guarding 109 to ensure safety of other agents operating near the automated tray handling system 100.

Although FIG. 1 shows a particular number, arrangement, and configuration of components of an automated tray handling system, the automated tray handling system may include other numbers, arrangements, and configurations of various components. For example, a plurality of item sortation systems may be included, the item sortation system may have one, two, three, or other numbers of sides associated with respective trays and tray positions, one, two three, or other numbers of rails may be included, each rail may include various numbers of robotic arms and associated end effectors, and various numbers of conveyors having one, two, three, or other numbers of tiers or levels may be included. Further, although the example trays described and shown herein may include a flange or lip on only one side out of four sides of the rectangular trays, in other example embodiments, the example trays may include flanges or lips on more than one side or all sides of the trays. In addition, in further example embodiments, the trays may have various other sizes, shapes, or configurations, such as square, rectangular, triangular, oval, circular, or other regular or irregular shapes and sizes.

FIGS. 2A-2D are top, perspective, side, and front view schematic diagrams, respectively, of an example dual end effector 200 of an automated tray handling system, in accordance with disclosed implementations. The example dual end effector 200 may be coupled to a robotic arm 105 that moves along a rail 104, as described with respect to FIG. 1.

The dual end effector may include a frame or body 202, one or more grasping elements 204, one or more locking plates 206, one or more actuators 208, and one or more sensors 210, 212. The frame or body 202 may form a central portion of the end effector to which other components may be attached or coupled. In addition, the dual end effector may couple to a robotic arm 105 via a portion, e.g., a top, of the frame or body 202, and the robotic arm 105 may move or rotate the dual end effector to various positions or orientations. The dual end effector may couple to the robotic arm 105 in various ways, such as fasteners, adhesives, welds, other attachment elements, or combinations thereof. In addition, various components of the dual end effector may couple to the frame or body 202 in various ways, such as fasteners, adhesives, welds, other attachment elements, or combinations thereof.

As shown in FIGS. 2A-2D, on opposite sides of the frame 202, respective sets of grasping elements 204 may be coupled to the frame 202. For example, the sets of grasping elements may be arranged or offset around a vertical axis of rotation that extends through a center of the frame 202 of the dual end effector. The grasping elements 204 may be formed, shaped, or configured to engage with and/or fit within an underside of a flange of a tray. Accordingly, the grasping elements 204 may have various angles, slopes, curves, surfaces, edges, or other features that correspond to features associated with an underside of a flange of a tray. In the example shown in FIGS. 2A-2D, the grasping elements 204 may have a sloped or angled surface that fits within a corresponding sloped or angled surface associated with an underside of a flange of a tray.

In addition, a locking plate 206 may be associated with each set of grasping elements 204 on opposite sides of the frame 202. The locking plate 206 may be associated with a respective actuator 208 that is configured to move the locking plate 206 between a raised or open position, and a lowered or closed position. For example, in the lowered or closed position, the locking plate 206 may be configured to engage with an upper side of a flange of a tray, thereby holding or locking the flange of the tray between the grasping elements 204 and the locking plate 206. The frame or body 202, the grasping elements 204, and the locking plates 206 may be formed of various materials, such as metals, plastics, composites, other materials, or combinations thereof. In addition, the actuator 208 may comprise various types of actuators, such as solenoids, servos, pneumatic actuators, hydraulic actuators, linear actuators, geared actuators, other types of actuators, or combinations thereof.

Further, the dual end effector may also include one or more sensors 210, 212. For example, the sensors 210, 212 may comprise photoeyes, proximity sensors, ranging sensors, imaging sensors, barcode scanning sensors, radiofrequency identification (RFID) readers, or other types of sensors. In one example, the sensors 210, 212 may comprise a ranging sensor that is configured to detect a distance between the dual end effector and a tray, e.g., a distance between grasping elements 204 and a flange of a tray. In a further example, the sensors 210, 212 may comprise an imaging sensor, a barcode scanning sensor, or an RFID reader that is configured to identify a tray, a tray position, and/or one or more items in a tray. In another example, the sensors 210, 212 may comprise a photoeye or proximity sensor that is configured to detect a presence of a tray held or locked by the grasping elements 204 and the locking plate 206. In still another example, the sensors 210, 212 may comprise a photoeye, a proximity sensor, or an imaging sensor that is configured to detect a position or actuation of the locking plate 206 and associated actuator 208.

Although FIGS. 2A-2D show a particular number, arrangement, and configuration of components of a dual end effector, the dual end effector may include other numbers, arrangements, and configurations of various components. For example, the frame or body may have other shapes, sizes, or configurations, one, two, three, four, or other numbers of sets of grasping elements may be arranged or offset around the frame or body, e.g., around a vertical axis of rotation that extends through a center of the frame, other numbers or arrangements of locking plates and associated actuators may be included, and other numbers or arrangements of sensors may be included.

FIGS. 3A-3H are schematic diagrams of an example dual end effector tray removal/replenishment process 300A-300H of an automated tray handling system, in accordance with disclosed implementations.

As shown in FIGS. 3A-3H, an item sortation system 102 may include a plurality of trays associated with a respective plurality of tray positions. A robotic system such as a robotic arm 105 may be configured to move along a rail 104 that extends adjacent and substantially parallel to the plurality of trays and tray positions of the item sortation system 102. In addition, a conveyor 107, such as a two-tier conveyor, may be positioned adjacent the rail 104 and associated robotic arm 105 to transport empty trays from upstream stations or processes to the robotic arm 105 and item sortation system 102, and to transport full trays from the item sortation system 102 and robotic arm 105 to downstream stations or processes.

Figure 3A:
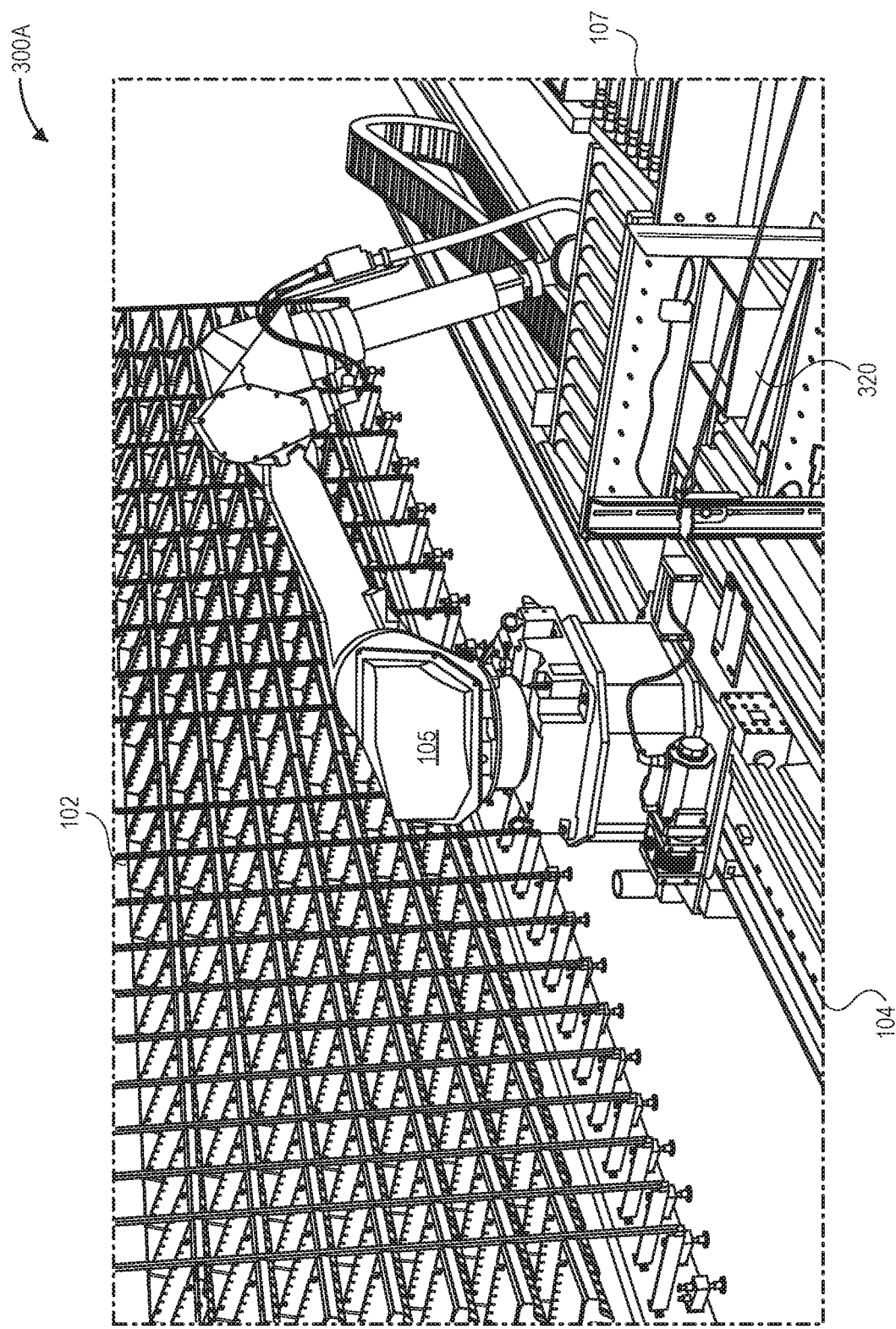

In FIG. 3A, the robotic arm 105 including an associated dual end effector 200, as described with respect to FIGS. 2A-2D, is in the process of retrieving an empty tray 320 from a lower tier of the conveyor 107. Initially, the empty tray 320 and/or the lower tier of the conveyor 107 may be identified using one or more sensors associated with the dual end effector 200. In other example embodiments, one or more sensors (similar to sensors 210, 212 described with respect to FIGS. 2A-2D) may be associated with the conveyor 107, e.g., the lower tier of the conveyor, in order to identify the empty tray 320, identify a presence of the empty tray 320, identify a position or orientation of the empty tray 320, etc. In order to retrieve the empty tray 320, the grasping elements 204 associated with a first side of the dual end effector 200 may be used to engage with an underside of a flange of the empty tray 320, and the locking plate 206 associated with the first side of the dual end effector 200 may then be actuated by an associated actuator 208 to engage with an upper side of the flange of the empty tray 320. Then, the robotic arm 105 may lift, move, and rotate the empty tray 320 that is held or locked between the grasping elements 204 and the locking plate 206 associated with the first side of the dual end effector 200. One or more sensors associated with the dual end effector 200 may be used for positioning and movement of the dual end effector 200 during tray grasping or retrieval, may detect a position or actuation of the locking plate 206, and/or may detect presence of the empty tray 320 during subsequent movement by the robotic arm 105.

FIG. 3B shows the empty tray 320 that is held or locked between the grasping elements 204 and the locking plate 206 associated with the first side of the dual end effector 200. One or more sensors associated with the dual end effector 200 may continue to detect a position or actuation of the locking plate 206, and/or may continue to detect presence of the empty tray 320 during subsequent movement by the robotic arm 105.

Figure 3C:
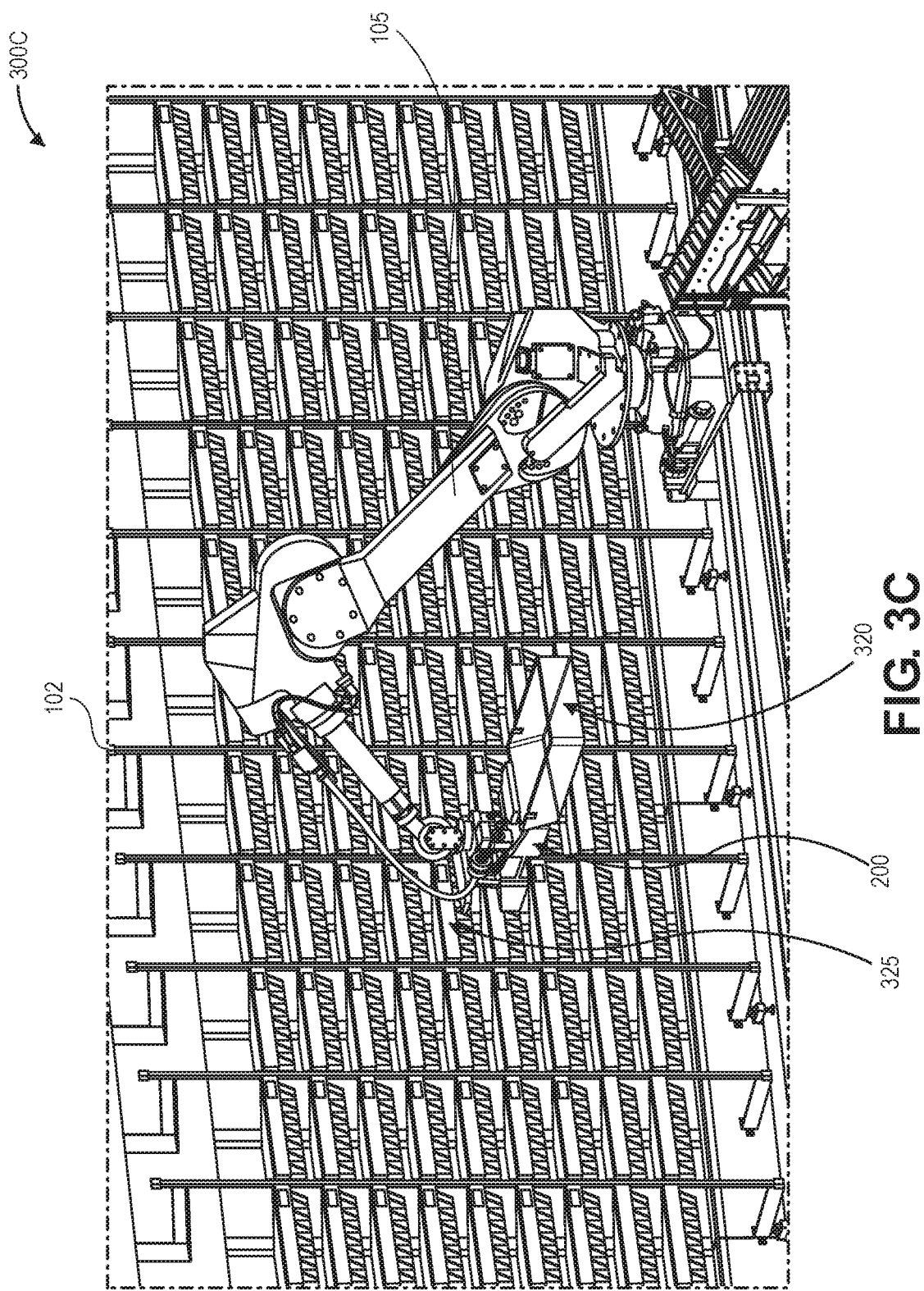

In FIG. 3C, the robotic arm 105 and associated dual end effector 200, which is still holding or grasping the empty tray 320 between the grasping elements 204 and the locking plate 206 associated with the first side of the dual end effector 200, is in the process of retrieving a full tray 325 from a tray position of an item sortation system 102. Initially, the full tray 325 and/or the tray position of the item sortation system 102 may be identified using one or more sensors associated with the dual end effector 200. In order to retrieve the full tray 325, the grasping elements 204 associated with a second side of the dual end effector 200 may be used to engage with an underside of a flange of the full tray 325, and the locking plate 206 associated with the second side of the dual end effector 200 may then be actuated by an associated actuator 208 to engage with an upper side of the flange of the full tray 325. Then, the robotic arm 105 may remove the full tray 325 from the tray position of the item sortation system 102 and may lift, move, and rotate the full tray 325 that is held or locked between the grasping elements 204 and the locking plate 206 associated with the second side of the dual end effector 200, while still lifting, moving, and rotating the empty tray 320 that is held or locked between the grasping elements 204 and the locking plate 206 associated with the first side of the dual end effector 200. One or more sensors associated with the dual end effector 200 may be used for positioning and movement of the dual end effector 200 during tray grasping or retrieval, may detect positions or actuations of the locking plates 206, and/or may detect presence of the empty tray 320 and the full tray 325 during subsequent movement by the robotic arm 105.

Figure 3D:
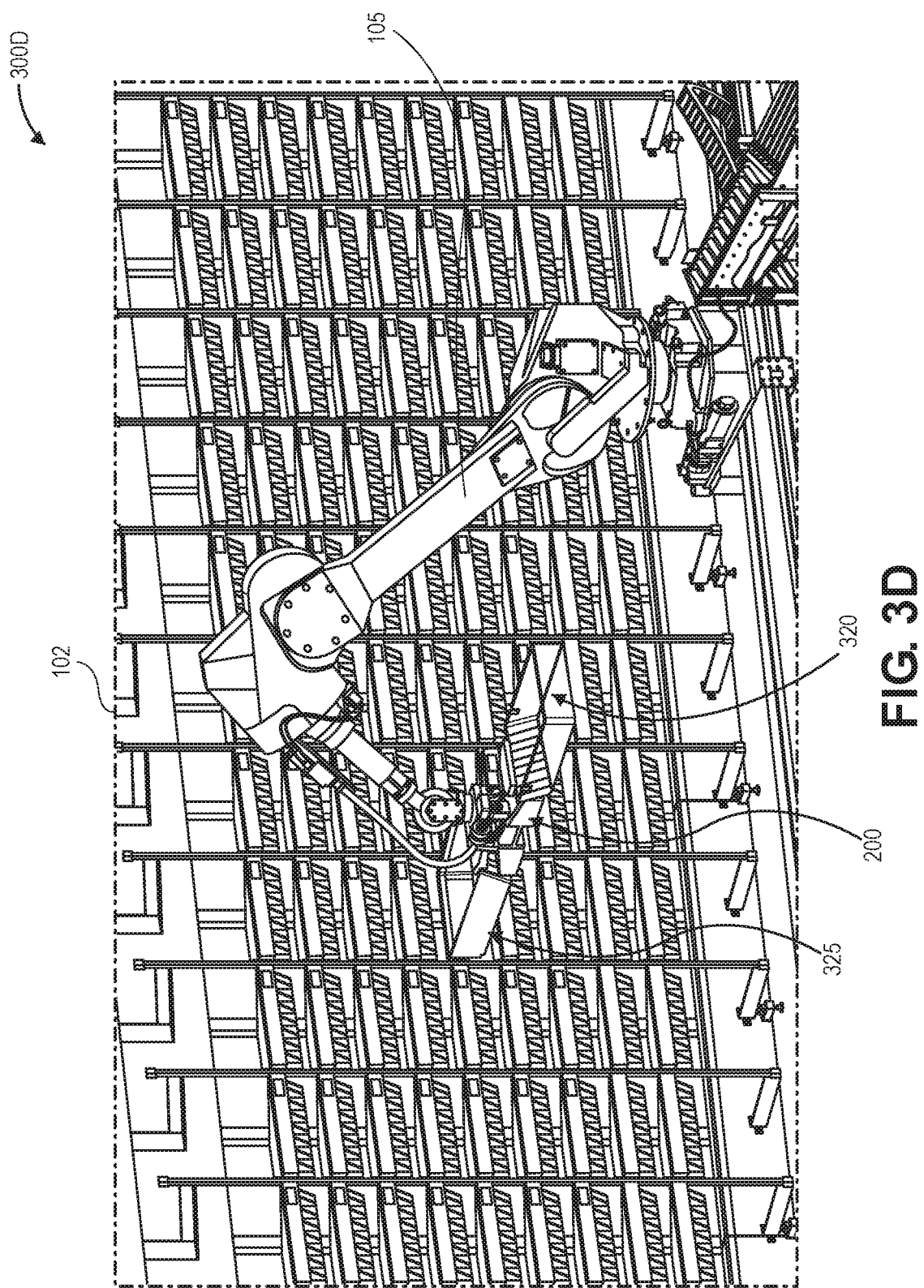

FIG. 3D shows the empty tray 320 that is held or locked between the grasping elements 204 and the locking plate 206 associated with the first side of the dual end effector 200 and the full tray 325 that is held or locked between the grasping elements 204 and the locking plate 206 associated with the second side of the dual end effector 200 after removal of the full tray 325 from the tray position of the item sortation system 102. One or more sensors associated with the dual end effector 200 may continue to detect positions or actuations of the locking plates 206, and/or may continue to detect presence of the empty tray 320 and the full tray 325 during subsequent movement by the robotic arm 105.

Figure 3E:
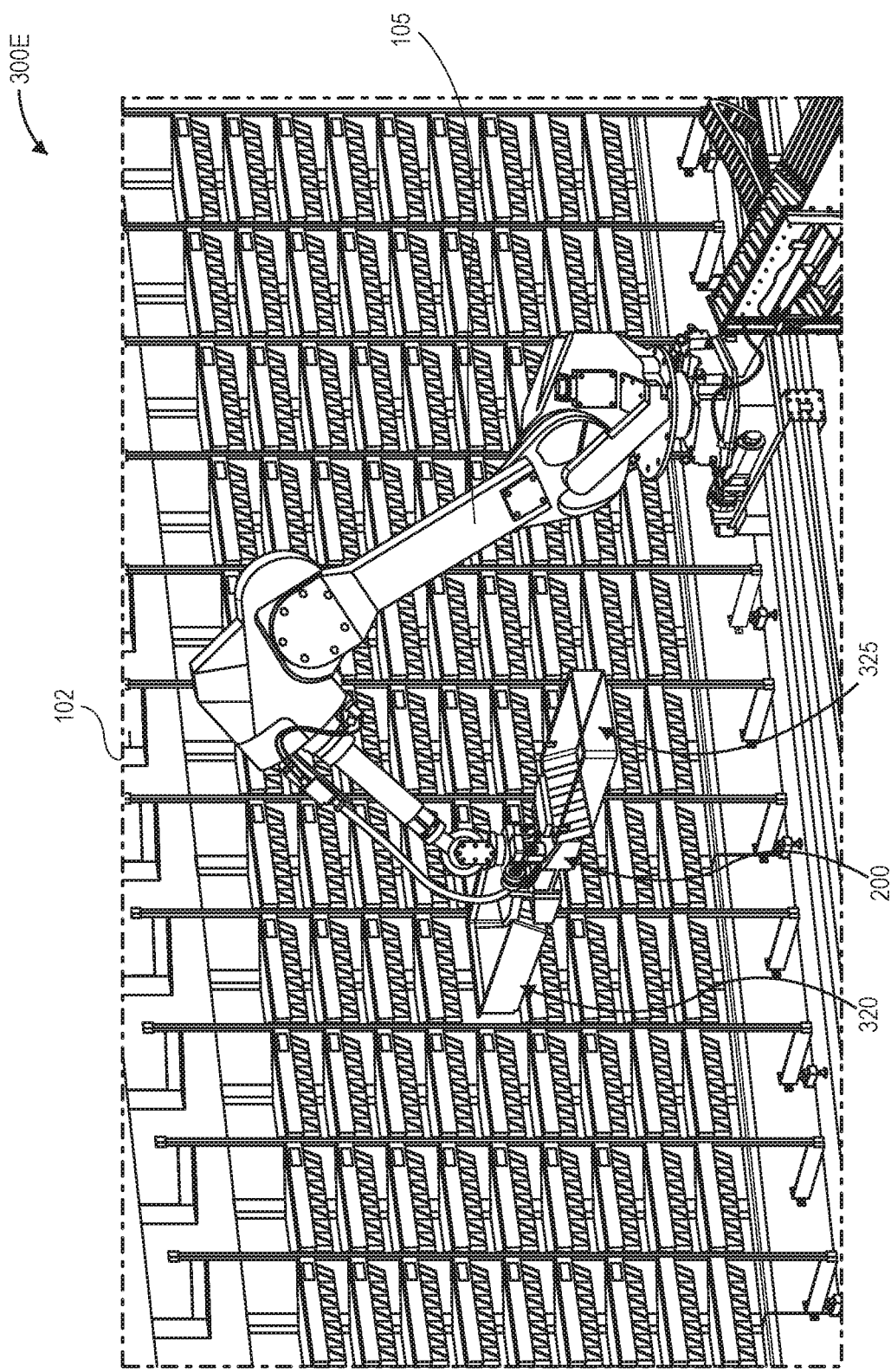

FIG. 3E shows the empty tray 320 that is held or locked between the grasping elements 204 and the locking plate 206 associated with the first side of the dual end effector 200 and the full tray 325 that is held or locked between the grasping elements 204 and the locking plate 206 associated with the second side of the dual end effector 200 after rotation by the robotic arm 105 and dual end effector 200 to align the empty tray 320 with the empty tray position (from which the full tray 325 was removed) of the item sortation system 102. One or more sensors associated with the dual end effector 200 may continue to detect positions or actuations of the locking plates 206, and/or may continue to detect presence of the empty tray 320 and the full tray 325 during subsequent movement by the robotic arm 105.

Figure 3F:
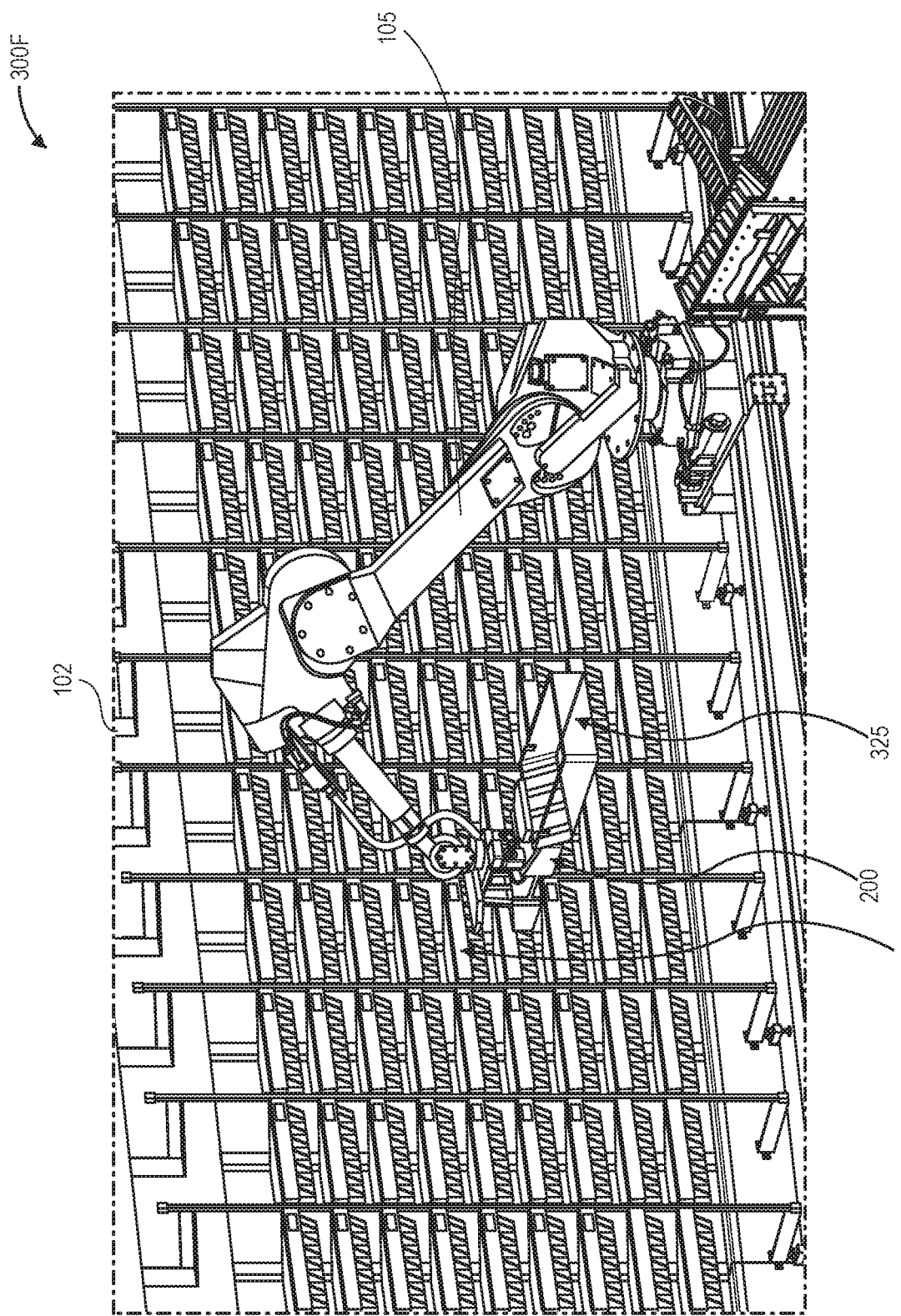

In FIG. 3F, the robotic arm 105 and associated dual end effector 200, which is still holding or grasping the full tray 325 between the grasping elements 204 and the locking plate 206 associated with the second side of the dual end effector 200, is in the process of placing the empty tray 320 at the empty tray position (from which the full tray 325 was removed) of the item sortation system 102. Initially, the empty tray 320 and/or the empty tray position may be identified using one or more sensors associated with the dual end effector 200. In order to place the empty tray 320, the locking plate 206 associated with the first side of the dual end effector 200 may be actuated by an associated actuator 208 to disengage from an upper side of the flange of the empty tray 320, and the robotic arm 105 may move the empty tray 320 into the empty tray position of the item sortation system 102. Then, the robotic arm 105 may lower the dual end effector 200, such that the grasping elements 204 associated with the first side of the dual end effector 200 disengage from an underside of a flange of the empty tray 320. Then, the robotic arm 105 may remove the dual end effector 200 and disengaged grasping elements 204 and locking plate 206 from the tray position of the item sortation system 102. The robotic arm 105 may continue to lift, move, and rotate the full tray 325 that is held or locked between the grasping elements 204 and the locking plate 206 associated with the second side of the dual end effector 200, during and after placement of the empty tray 320 at the empty tray position. One or more sensors associated with the dual end effector 200 may be used for positioning and movement of the dual end effector 200 during tray placement, may detect positions or actuations of the locking plates 206, and/or may detect absence of the empty tray 320 and presence of the full tray 325 during subsequent movement by the robotic arm 105.

Figure 3G:
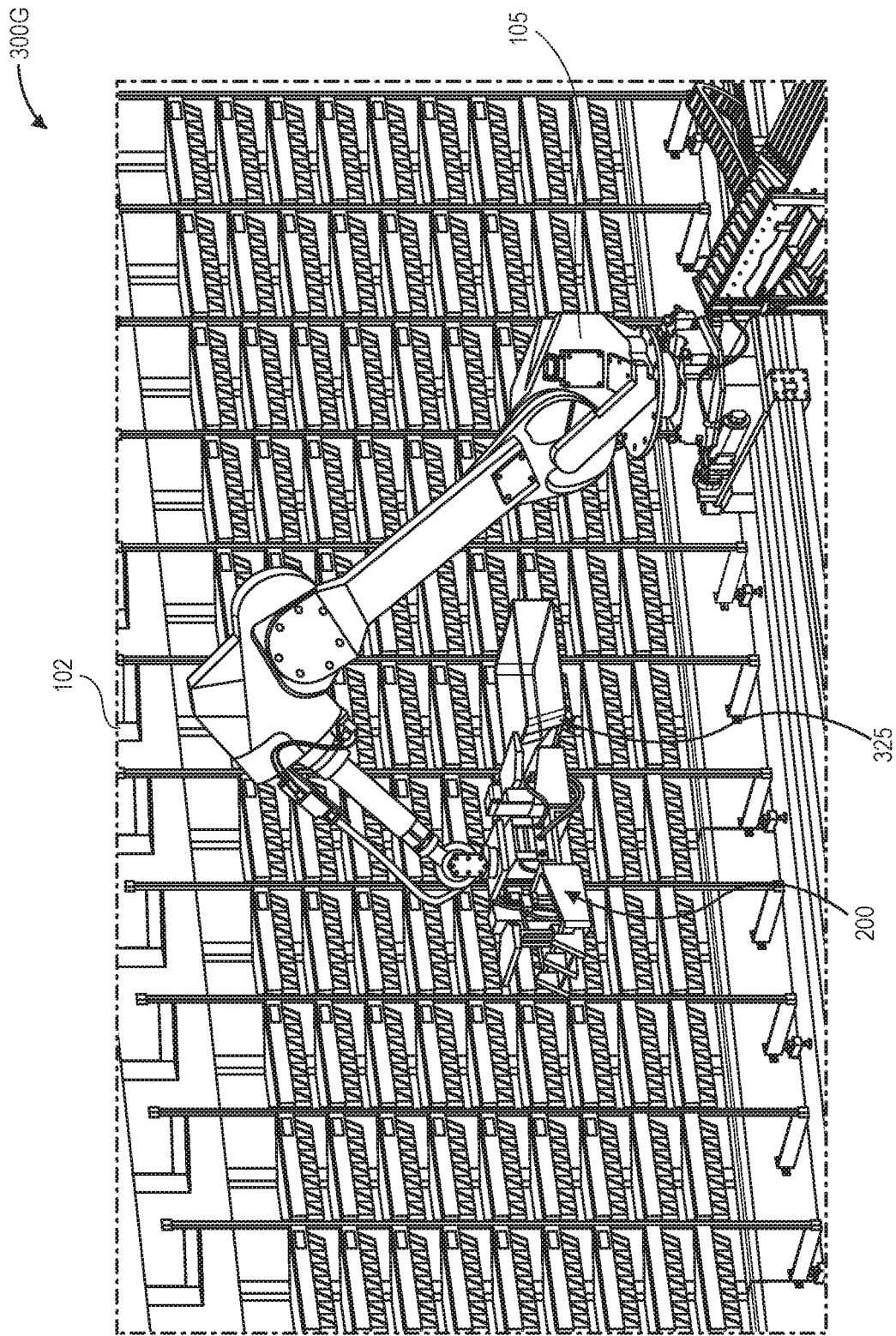

FIG. 3G shows the full tray 325 that is held or locked between the grasping elements 204 and the locking plate 206 associated with the second side of the dual end effector 200 after placement of the empty tray 320 at the empty tray position of the item sortation system 102. One or more sensors associated with the dual end effector 200 may continue to detect a position or actuation of the locking plate 206, and/or may continue to detect presence of the full tray 325 during subsequent movement by the robotic arm 105.

Figure 3H:
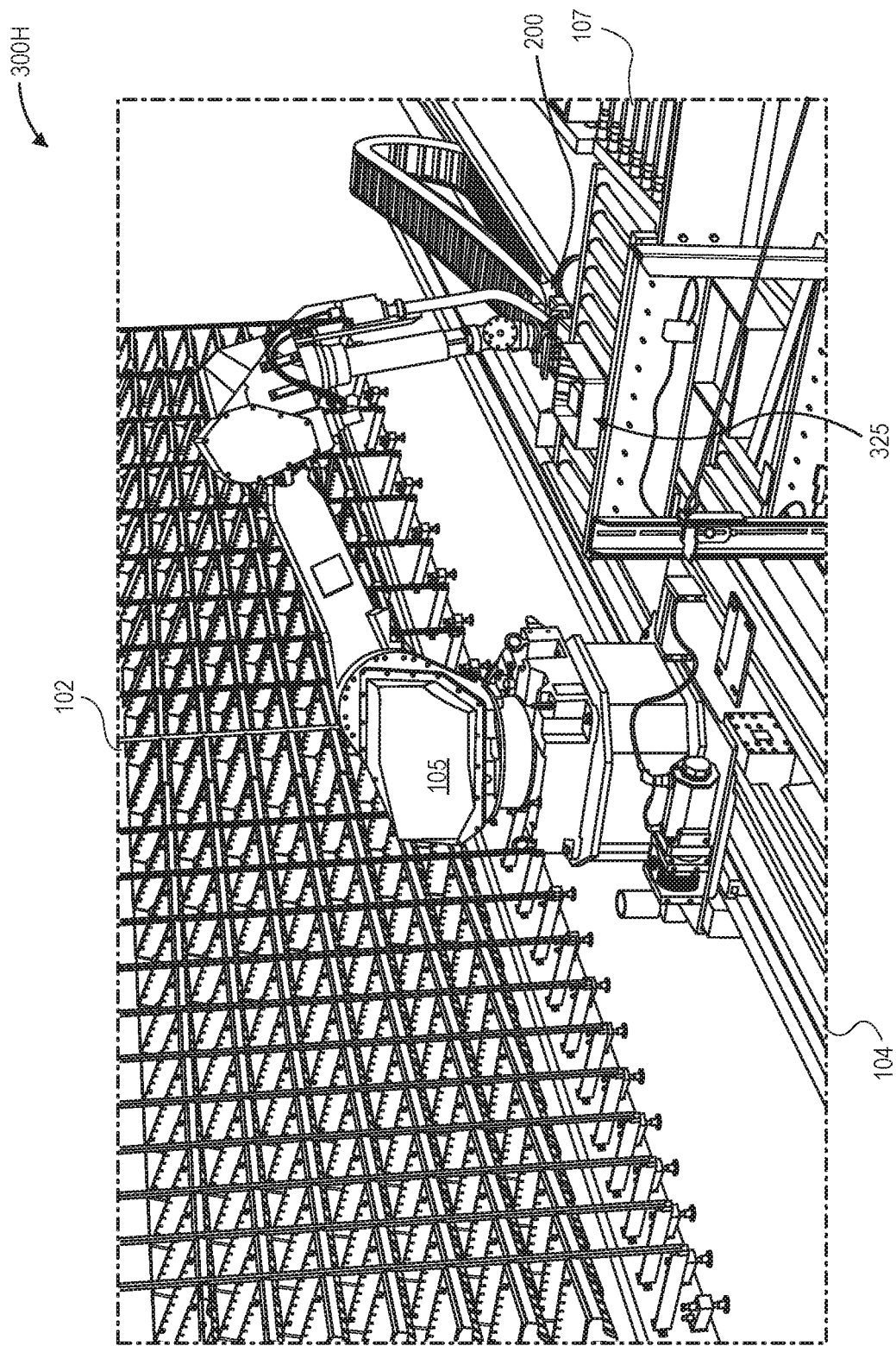

In FIG. 3H, the robotic arm 105 and associated dual end effector 200 is in the process of placing a full tray 325 on an upper tier of the conveyor 107. Initially, the full tray 325 and/or the upper tier of the conveyor 107 may be identified using one or more sensors associated with the dual end effector 200. In other example embodiments, one or more sensors (similar to sensors 210, 212 described with respect to FIGS. 2A-2D) may be associated with the conveyor 107, e.g., the upper tier of the conveyor, in order to identify the full tray 325, identify one or more items sorted to the full tray 325, identify a presence of the full tray 325, identify a position or orientation of the full tray 325, identify one or more other trays associated with or positioned on the conveyor 107, etc. In order to place the full tray 325, the locking plate 206 associated with the second side of the dual end effector 200 may be actuated by an associated actuator 208 to disengage from an upper side of the flange of the full tray 325, and the robotic arm 105 may move and place the full tray 325 on the upper tier of the conveyor 107. Then, the robotic arm 105 may lower the dual end effector 200, such that the grasping elements 204 associated with the second side of the dual end effector 200 disengage from an underside of a flange of the full tray 325. Then, the robotic arm 105 may remove the dual end effector 200 and disengaged grasping elements 204 and locking plate 206 from the upper tier of the conveyor 107. One or more sensors associated with the dual end effector 200 may be used for positioning and movement of the dual end effector 200 during tray placement, may detect a position or actuation of the locking plate 206, and/or may detect absence of the full tray 325 during subsequent movement by the robotic arm 105.

Thereafter, the example dual end effector tray removal/replenishment process 300A-300H of the automated tray handling system described with respect to FIGS. 3A-3H may be substantially repeated to continuously place additional empty trays at tray positions of the item sortation system and remove additional full trays from tray positions of the item sortation system. At least in part because of the operations of the robotic arm and associated dual end effector, substantially all tray positions of the item sortation system may be maintained occupied by trays that are ready to receive sorted items, by both efficiently and quickly removing full trays from tray positions to downstream stations or processes and also efficiently and quickly refilling empty trays at tray positions from upstream stations or processes.

Figure 4:
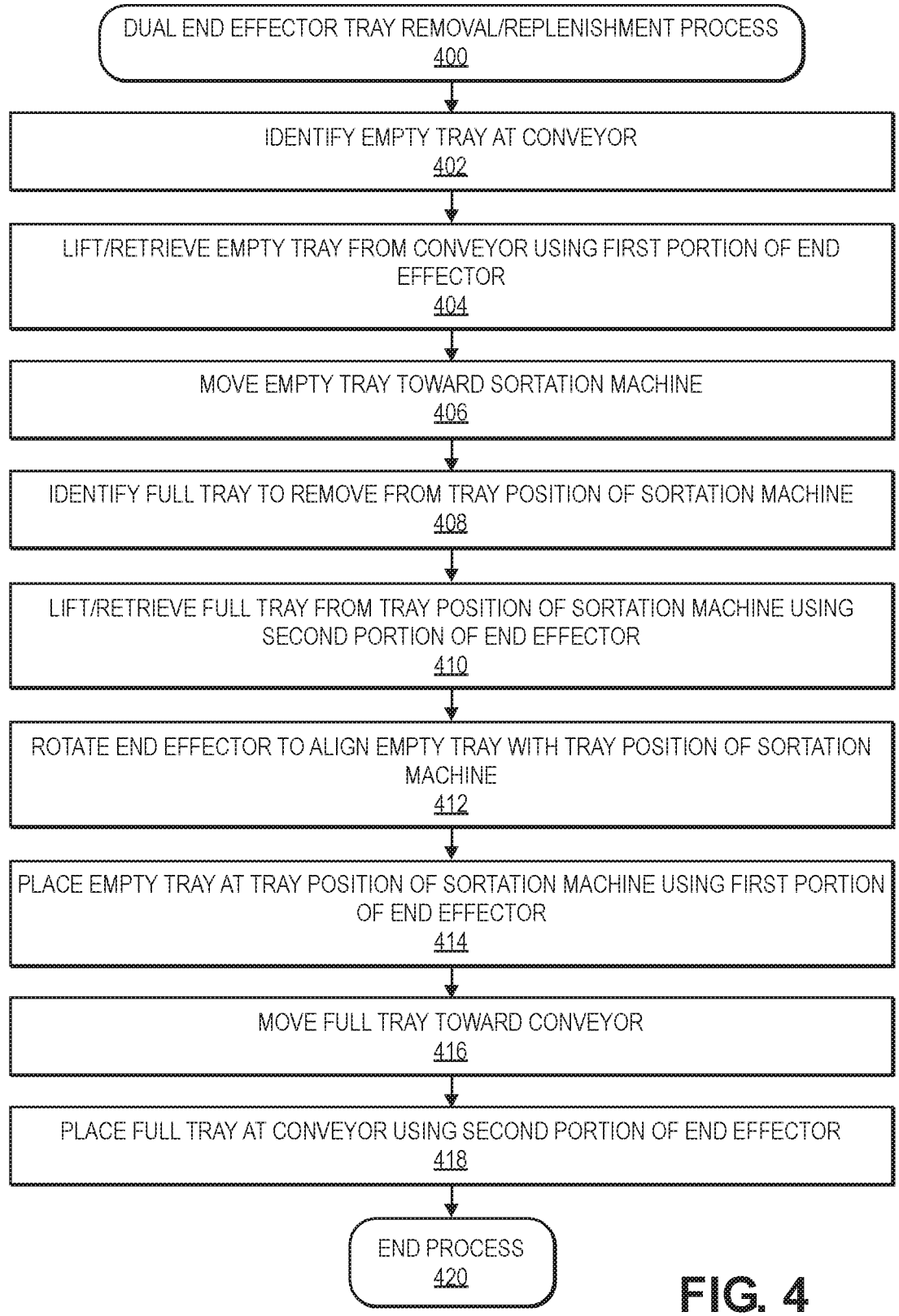
FIG. 4 is a flow diagram illustrating an example dual end effector tray removal/replenishment process, in accordance with disclosed implementations.

FIG. 4 is a flow diagram illustrating an example dual end effector tray removal/replenishment process 400, in accordance with disclosed implementations.

The process 400 may begin by identifying an empty tray at a conveyor, as at 402. For example, one or more sensors, such as imaging sensors, barcode scanning sensors, RFID readers, or other sensors, may identify an empty tray at a lower tier of a conveyor that is to be placed at a tray position of an item sortation system. In example embodiments, the one or more sensors may be associated with a dual end effector coupled to a robotic arm. Further, a control system may provide instructions or commands to a robotic arm, dual end effector, or components thereof to identify an empty tray at a conveyor.

The process 400 may continue by lifting or retrieving the empty tray from the conveyor using a first portion of the dual end effector, as at 404. For example, a robotic arm may position and orient a first portion or side of a dual end effector to engage and lift the empty tray. In example embodiments, grasping elements associated with the first portion of the dual end effector may engage with an underside of a flange of the empty tray by movement of the robotic arm and dual end effector, and a locking plate associated with the first portion of the dual end effector may engage with an upper side of the flange of the empty tray by actuation of an associated actuator. Further, a control system may provide instructions or commands to a robotic arm, dual end effector, or components thereof to engage, lift, and retrieve the empty tray using a first portion of the dual end effector.

The process 400 may proceed by moving the empty tray toward an item sortation machine, as at 406. For example, a robotic arm may position and orient the empty tray grasped by the first portion or side of a dual end effector toward a tray position of an item sortation system. In example embodiments, the empty tray may be held or locked by grasping elements and a locking plate associated with the first portion of the dual end effector, and the robotic arm may move and rotate the empty tray to a desired position and orientation. Further, a control system may provide instructions or commands to a robotic arm, dual end effector, or components thereof to move the empty tray held by a first portion of the dual end effector using the robotic arm.

The process 400 may then continue to identify a full tray to remove from a tray position of an item sortation machine, as at 408. For example, one or more sensors, such as imaging sensors, barcode scanning sensors, RFID readers, or other sensors, may identify a full tray that is to be removed from a respective tray position of an item sortation system. In example embodiments, the one or more sensors may be associated with a dual end effector coupled to a robotic arm. Further, a control system may provide instructions or commands to a robotic arm, dual end effector, or components thereof to identify a full tray at a respective tray position of an item sortation system.

The process 400 may then proceed to lift or retrieve the full tray from the tray position of the item sortation machine using a second portion of the dual end effector, as at 410. For example, a robotic arm may position and orient a second portion or side of a dual end effector to engage and lift the full tray from the tray position of the item sortation system. In example embodiments, grasping elements associated with the second portion of the dual end effector may engage with an underside of a flange of the full tray by movement of the robotic arm and dual end effector, and a locking plate associated with the second portion of the dual end effector may engage with an upper side of the flange of the full tray by actuation of an associated actuator. In example embodiments, the full tray may be at least partially lifted in order to provide clearance over a ridge, protrusion, or wall configured to maintain the full tray inside the tray position of the item sortation system. Further, a control system may provide instructions or commands to a robotic arm, dual end effector, or components thereof to engage, lift, and retrieve the full tray using a second portion of the dual end effector.

The process 400 may continue with rotating the dual end effector to align the empty tray with the tray position of the item sortation machine, as at 412. For example, a robotic arm may position and orient the empty tray grasped by the first portion or side of a dual end effector toward an empty tray position of an item sortation system from which the full tray may have been removed by the second portion or side of the dual end effector. In example embodiments, the empty tray may be held or locked by grasping elements and a locking plate associated with the first portion of the dual end effector, the full tray may be held or locked by grasping elements and a locking plate associated with the second portion of the dual end effector, and the robotic arm may move and rotate such that the empty tray is aligned with the empty tray position of the item sortation system. Further, a control system may provide instructions or commands to a robotic arm, dual end effector, or components thereof to rotate and align, using the robotic arm, the empty tray held by a first portion of the dual end effector with an empty tray position of the item sortation system.

The process 400 may proceed with placing the empty tray at the tray position of the item sortation machine using the first portion of the dual end effector, as at 414. For example, a robotic arm may position and orient the empty tray held by a first portion or side of a dual end effector to be placed at an empty tray position of the item sortation system. In example embodiments, a locking plate associated with the first portion of the dual end effector may disengage from an upper side of the flange of the empty tray by actuation of an associated actuator, and grasping elements associated with the first portion of the dual end effector may disengage from an underside of a flange of the empty tray by movement of the robotic arm and dual end effector. Further, a control system may provide instructions or commands to a robotic arm, dual end effector, or components thereof to move and place the empty tray using a first portion of the dual end effector.

The process 400 may then continue by moving the full tray toward the conveyor, as at 416. For example, a robotic arm may position and orient the full tray grasped by the second portion or side of a dual end effector toward an upper tier of a conveyor. In example embodiments, the full tray may be held or locked by grasping elements and a locking plate associated with the second portion of the dual end effector, and the robotic arm may move and rotate the full tray to a desired position and orientation at the upper tier of the conveyor. Further, a control system may provide instructions or commands to a robotic arm, dual end effector, or components thereof to move the full tray held by a second portion of the dual end effector using the robotic arm.

The process 400 may then proceed by placing the full tray at the conveyor using the second portion of the dual end effector, as at 418. For example, a robotic arm may position and orient the full tray held by a second portion or side of a dual end effector to be placed at an upper tier of a conveyor. In example embodiments, a locking plate associated with the second portion of the dual end effector may disengage from an upper side of the flange of the full tray by actuation of an associated actuator, and grasping elements associated with the second portion of the dual end effector may disengage from an underside of a flange of the full tray by movement of the robotic arm and dual end effector. Further, a control system may provide instructions or commands to a robotic arm, dual end effector, or components thereof to move and place the full tray using a second portion of the dual end effector. The process 400 may then end, as at 420.

Thereafter, the example dual end effector tray removal/replenishment process 400 of the automated tray handling system described with respect to FIG. 4 may be substantially repeated to continuously place additional empty trays at tray positions of the item sortation system and remove additional full trays from tray positions of the item sortation system. At least in part because of the operations of the robotic arm and associated dual end effector, substantially all tray positions of the item sortation system may be maintained occupied by trays that are ready to receive sorted items, by both efficiently and quickly removing full trays from tray positions to downstream stations or processes and also efficiently and quickly refilling empty trays at tray positions from upstream stations or processes.

In further example embodiments, the example dual end effector tray removal/replenishment process 400 of the automated tray handling system described with respect to FIG. 4 may be modified or changed to include additional steps, omit one or more steps, repeat one or more steps, or other modifications. For example, in some example embodiments, the example robotic arm and end effector may grasp and lift two or more full trays concurrently and move the full trays from the sortation system to one or more downstream stations or processes. In addition, the example robotic arm and end effector may grasp and lift two or more empty trays concurrently and move the empty trays from one or more upstream stations or processes to the sortation system. Further, the example robotic arm and end effector may grasp and lift various other combinations of full and/or empty trays and move the trays between various of the systems described herein.

FIG. 5 is an overhead schematic diagram of another example automated tray handling system 500 associated with an item sortation system, in accordance with disclosed implementations.

As shown in FIG. 5, an item sortation system 502 may receive items from various upstream stations or processes, e.g., via conveyors, slides, chutes, totes, containers, robotic drive units, other material handling equipment, or other automated or manual processes. The items may comprise various types of items, including books, electronics, toys, sporting goods, tools, housewares, clothing, shoes, jewelry, packaged foods, or other types of items. The item sortation system 502 may also receive a plurality of trays, e.g., ten, twenty, one hundred, or more trays, at a respective plurality of tray positions on one or more sides of the item sortation system 502 to which the various items may be sorted. Each of the one or more sides of the item sortation system 502 may form an array of trays that may be individually placed and removed at respective tray positions, and to which one or more items may be sorted. In example embodiments, the item sortation system 502 may sort items to individual trays corresponding to customer orders or other item bundles or groups on either side of the item sortation system 502. Each of the plurality of trays may receive one or more items that are sorted thereto.

Along each side of the item sortation system 502 that includes a plurality of trays at the respective plurality of tray positions, one or more robotic systems, machines, or apparatus such as two-axis, three-axis, or other types or configurations of gantry systems 504, may include one or more associated passthrough end effectors 505, and the gantry systems 504 may extend substantially parallel to respective sides or planes of the item sortation system 102 having respective pluralities of trays at tray positions. The passthrough end effectors 505 may move or translate in either direction, as well as move or translate vertically, along the gantry systems 504 and manipulate various trays relative to tray positions of the item sortation system 502. For example, the passthrough end effectors 505 may place empty trays at tray positions of the item sortation system 502, and the passthrough end effectors 505 may remove full trays from tray positions of the item sortation system 502.

In example embodiments described herein, the gantry systems 504 may comprise two-axis gantry systems that enable movement of end effectors and trays in a substantially two-dimensional, vertical plane that extends along the length of the gantry system, and the one or more associated passthrough end effectors 505 may enable movement of trays in a third dimension that extends substantially perpendicular to the two-dimensional vertical plane of movement enabled by the two-axis gantry systems. In this manner, the two-axis gantry systems and associated passthrough end effectors described herein may comprise a simpler and more cost effective system to enable three-dimensional movement of trays, in comparison to more complicated and costly three-axis gantry systems having other types of end effectors that may enable three-dimensional movement of trays.

Adjacent the gantry systems 504 and one or more associated passthrough end effectors 505 may be one or more conveyors 507. For example, the conveyors 507 may be two-tier or two-level conveyors, with upper tiers or levels configured to move and transport trays in a first direction and lower tiers or levels configured to move and transport trays in a second direction opposite the first direction. In example embodiments, the passthrough end effectors 505 may remove full trays from tray positions of the item sortation system 502 and place the full trays on the upper tiers of the conveyors 507 to transport the full trays to downstream stations or processes. In addition, the passthrough end effectors 505 may remove empty trays from the lower tiers of the conveyors 507 that have been transported from upstream stations or processes and place the empty trays at empty tray positions of the item sortation system 502.

Further, although not shown in FIG. 5, the item sortation system 502, gantry systems 504, passthrough end effectors 505, and conveyors 507 may be surrounded by a fence, rail, or guarding to ensure safety of other agents operating near the automated tray handling system 500.

Although FIG. 5 shows a particular number, arrangement, and configuration of components of an automated tray handling system, the automated tray handling system may include other numbers, arrangements, and configurations of various components. For example, a plurality of item sortation systems may be included, the item sortation system may have one, two, three, or other numbers of sides associated with respective trays and tray positions, one, two three, or other numbers of gantry systems may be included, each gantry system may include various numbers of associated passthrough end effectors, and various numbers of conveyors having one, two, three, or other numbers of tiers or levels may be included. Further, although the example trays described and shown herein may include a flange or lip on only one side out of four sides of the rectangular trays, in other example embodiments, the example trays may include flanges or lips on more than one side or all sides of the trays. In addition, in further example embodiments, the trays may have various other sizes, shapes, or configurations, such as square, rectangular, triangular, oval, circular, or other regular or irregular shapes and sizes.

Figure 6A:
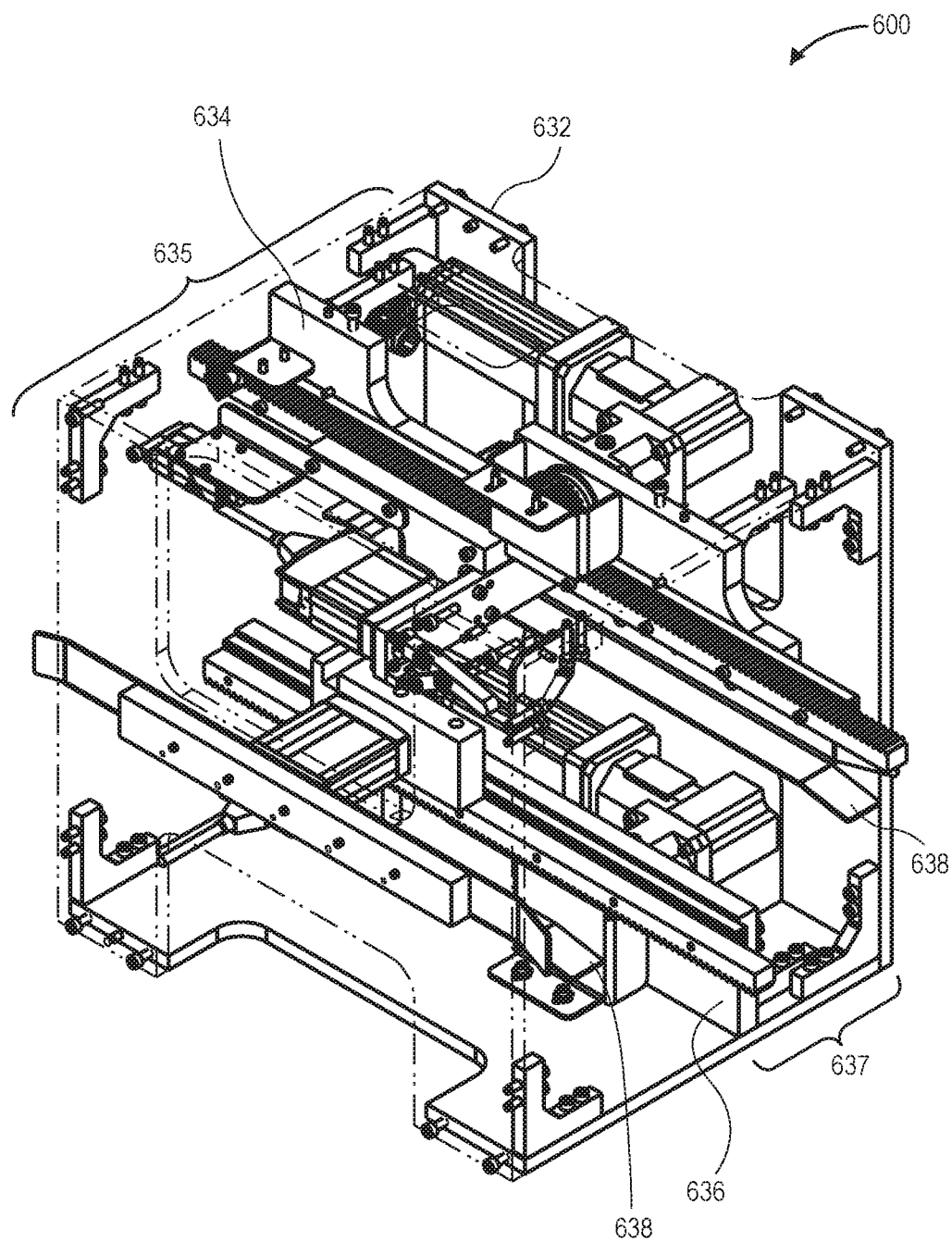
Figure 7A:
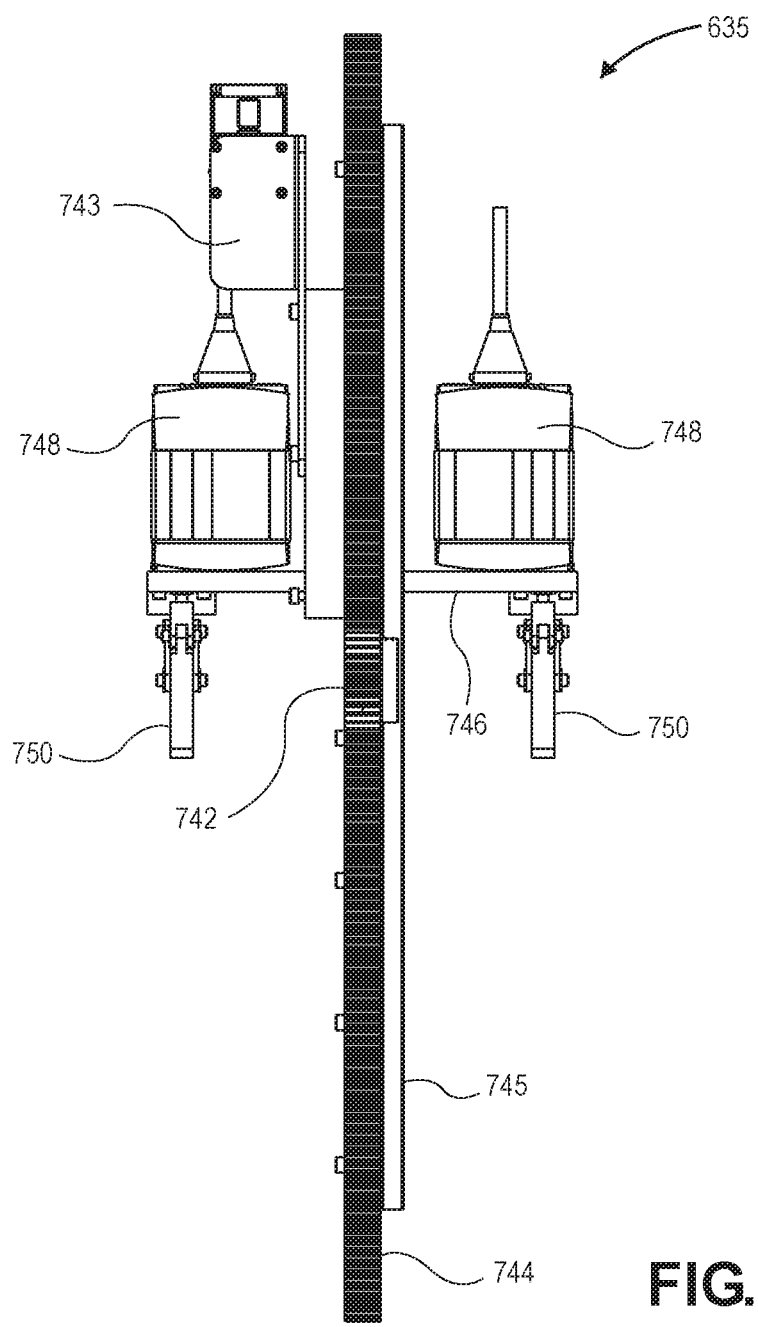
FIGS. 7A-7D are top, front, perspective, and side view schematic diagrams, respectively, of an example upper finger assembly of the example passthrough end effector of an automated tray handling system, in accordance with disclosed implementations.
Figure 7B:
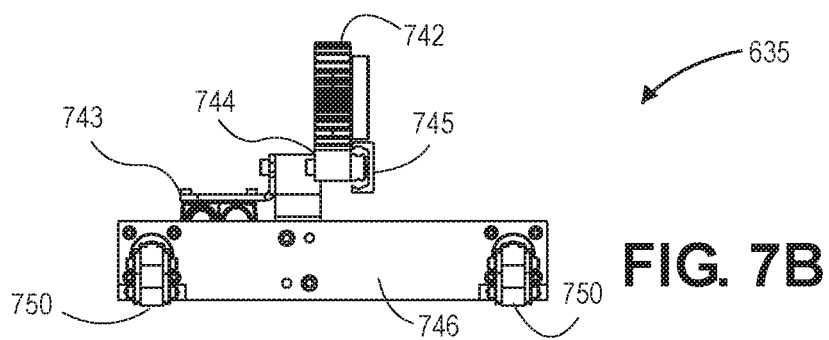
Figure 7C:
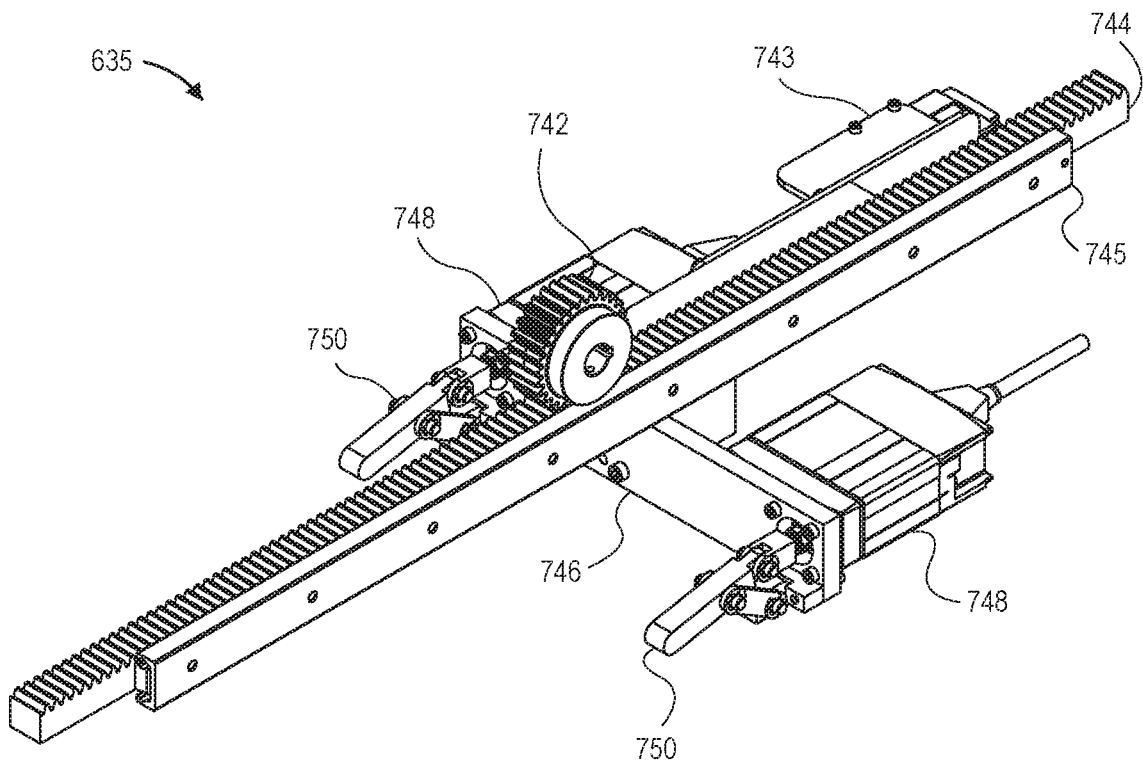
Figure 7D:
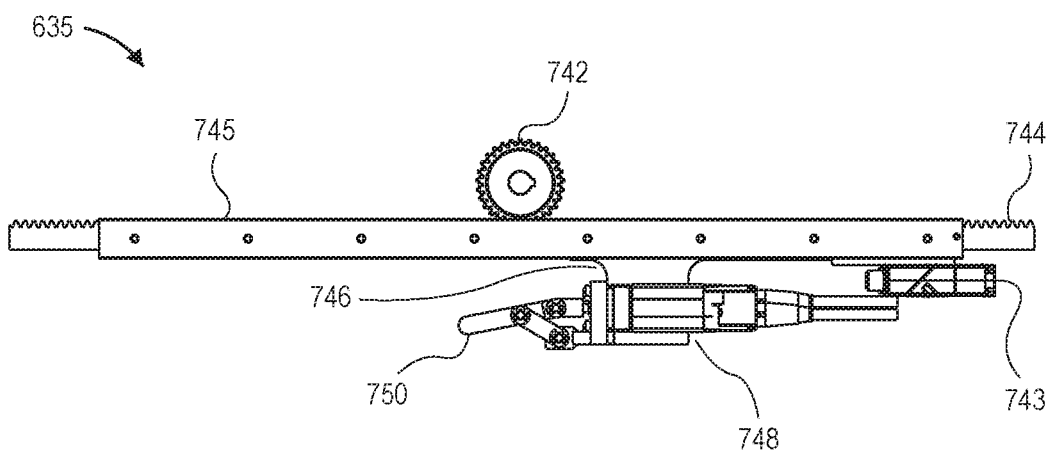

FIGS. 6A-6C are perspective, side, and front view schematic diagrams, respectively, of an example passthrough end effector 600 of an automated tray handling system, in accordance with disclosed implementations. The example passthrough end effector 600 may be coupled to a gantry system 504, as described with respect to FIG. 5. The example passthrough end effector 600 may be an example of passthrough end effectors 505, as also described with respect to FIG. 5.

The passthrough end effector may include a frame or body 632, an upper support member 634, an upper finger assembly 635, a lower support member 636, a lower finger assembly 637, one or more tray guides 638, and one or more sensors 640. The frame or body 632 may form an enclosure, box, channel, tube, cylinder, tunnel, or other similar structure of the end effector to which other components may be attached or coupled. In addition, the passthrough end effector may couple to a gantry system 504 via a portion, e.g., a top, a bottom, and/or sides, of the frame or body 632, and the gantry system 504 may move or rotate the passthrough end effector to various positions or orientations. The passthrough end effector may couple to the gantry system 504 in various ways, such as fasteners, adhesives, welds, other attachment elements, or combinations thereof. In addition, various components of the passthrough end effector may couple to the frame or body 632 in various ways, such as fasteners, adhesives, welds, other attachment elements, or combinations thereof.

As shown in FIGS. 6A-6C, within an interior of the frame 632, an upper finger assembly 635 and a lower finger assembly 637 may be coupled to the frame 632 via an upper support member 634 and a lower support member 636, respectively. For example, the upper finger assembly 635 may include one or more fingers that are formed, shaped, or configured to selectively engage with and push and/or pull an upper edge of a flange of a tray, as described in more detail with respect to FIGS. 7A-7D. In addition, the lower finger assembly 637 may also include one or more fingers that are formed, shaped, or configured to selectively engage with and/or fit within and push and/or pull an underside of a flange of a tray, as described in more detail with respect to FIGS. 8A-8D. Accordingly, the one or more fingers of the upper finger assembly 635 and/or the lower finger assembly 637 may have various sizes, shapes, angles, slopes, curves, surfaces, edges, or other features that correspond to features associated with an upper edge and/or an underside of a flange of a tray. In the examples shown in FIGS. 6A-6C, the one or more fingers of the upper finger assembly 635 may be substantially straight rods, bars, or poles, and the one or more fingers of the lower finger assembly 637 may be substantially L-shaped rods, bars, or poles.

In addition, one or more tray guides 638 may be coupled to an interior of the frame 632. For example, the tray guides 638 may comprise substantially straight, flat, or smooth surfaces, rails, slides, or plates upon which one or more surfaces or features of a tray may slide into, through, and out of an interior of the passthrough end effector. The frame or body 632, the upper support member 634, the upper finger assembly 635, the lower support member 636, the lower finger assembly 637, and the one or more tray guides 638 may be formed of various materials, such as metals, plastics, composites, other materials, or combinations thereof.

Further, the passthrough end effector may also include one or more sensors 640. For example, the sensors 640 may comprise photoeyes, proximity sensors, ranging sensors, imaging sensors, barcode scanning sensors, radiofrequency identification (RFID) readers, or other types of sensors. In one example, the sensors 640 may comprise a ranging sensor that is configured to detect a distance between the passthrough end effector and a tray, e.g., a distance between the upper finger assembly 635, the lower finger assembly 637, and/or one or more fingers thereof and an upper edge or an underside of a flange of a tray. In a further example, the sensors 640 may comprise an imaging sensor, a barcode scanning sensor, or an RFID reader that is configured to identify a tray, a tray position, and/or one or more items in a tray. In another example, the sensors 640 may comprise a photoeye or proximity sensor that is configured to detect a presence of a tray within an interior of the passthrough end effector. In still another example, the sensors 640 may comprise a photoeye, a proximity sensor, or an imaging sensor that is configured to detect a position or actuation of the upper finger assembly 635, the lower finger assembly 637, and/or one or more fingers thereof.

Although FIGS. 6A-6C show a particular number, arrangement, and configuration of components of a passthrough end effector, the passthrough end effector may include other numbers, arrangements, and configurations of various components. For example, the frame or body may have other shapes, sizes, or configurations, one, two, three, four, or other numbers of upper and/or lower finger assemblies may be coupled to the frame or body, e.g., within an interior of the frame or body, other numbers or arrangements of one or more finger assemblies, one or more associated fingers, and associated actuators may be included, other numbers or arrangements of one or more tray guides may be included, and other numbers or arrangements of sensors may be included.

FIGS. 7A-7D are top, front, perspective, and side view schematic diagrams, respectively, of an example upper finger assembly 635 of the example passthrough end effector 600 of an automated tray handling system, in accordance with disclosed implementations. The example upper finger assembly 635 of a passthrough end effector 600 may be coupled to a gantry system 504, as described with respect to FIGS. 5 and 6A-6C.

As shown in FIGS. 7A-7D, the upper finger assembly 635 may include a pinion 742 that is rotated by a motor or actuator (not shown), and the motor or actuator may be coupled to an interior of the frame 632, e.g., via a connection or coupling to the upper support member 634. The pinion 742 may include gear teeth that are in operative mating engagement with a rack 744 having corresponding gear teeth. In addition, the rack 744 may be coupled to a first portion of a slider 745 and configured for linear, sliding movement within an interior of the frame 632. A second portion of the slider 745 may be fixedly coupled to an interior of the frame 632, e.g., via a connection or coupling to the upper support member 634. For example, the slider 745 may be similar to a drawer glide having two portions that can move or slide linearly relative to each other with various bearings, rollers, balls, or other sliding elements positioned between the two portions of the drawer glide. In this manner, the rack 744 may move linearly within an interior of the frame 632 responsive to rotation of the pinion 742 by a motor and sliding movement along the slider 745.

Coupled to the rack 744 or the slider 745 may be one or more sensors 743, which may include various types of sensors, such as sensors 640 described with respect to FIGS. 6A-6C. In addition, an upper finger support member 746 may be coupled to the rack 744, e.g., to an underside or other portion of the rack 744. As shown in FIGS. 7A-7D, one or more upper fingers 750 and associated actuators 748 may be coupled to the upper finger support member 746. For example, the one or more upper fingers 750 may include substantially straight rods, bars, poles, brackets, or other linkages that may move between a raised or stowed position, and a lowered or engaged position, in which the one or more upper fingers may engage with trays via an upper edge of the trays. In addition, one or more associated actuators 748 may cause movement of various elements of the one or more upper fingers 750 between the raised or stowed position and the lowered or engaged position. Further, the motor or actuator that drives the pinion 742 and/or the actuators 748 may comprise various types of actuators, such as solenoids, servos, pneumatic actuators, hydraulic actuators, linear actuators, rotary actuators, geared actuators, gearboxes or drivetrains, other types of actuators, or combinations thereof.

Using the upper finger assembly 635 described with respect to FIGS. 7A-7D, a tray may be moved between a tray position of an item sortation system, an interior of the passthrough end effector, and an upstream or downstream station or process, e.g., a portion, tier, or level of a conveyor. For example, in order to pull a tray from a tray position of an item sortation system or from a portion of a conveyor into an interior of the passthrough end effector, a motor may rotate the pinion 742 in order to linearly move the rack 744 and associated upper fingers 750 toward an upper edge of the tray. Upon positioning the upper fingers 750 proximate the upper edge of the tray, the actuators 748 may actuate the upper fingers 750 from the raised or stowed position to the lowered or engaged position, such that the upper fingers 750 engage with an upper edge of the tray, e.g., engage with an inner surface of an upper edge of the tray. Then, the motor may rotate the pinion 742 in order to linearly move the rack 744 and associated upper fingers 750 toward an interior of the passthrough end effector, such that the upper fingers 750 engage with the upper edge of the tray and pull the tray into the interior of the passthrough end effector.

Likewise, in order to push a tray from an interior of the passthrough end effector to a tray position of an item sortation system or a portion of a conveyor, a motor may rotate the pinion 742 in order to linearly move the rack 744 and associated upper fingers 750 toward an upper edge of the tray that is within an interior of the passthrough end effector. Upon positioning the upper fingers 750 proximate the upper edge of the tray, the actuators 748 may actuate the upper fingers 750 from the raised or stowed position to the lowered or engaged position, such that the upper fingers 750 engage with an upper edge of the tray, e.g., engage with an outer surface of an upper edge of the tray. Then, the motor may rotate the pinion 742 in order to linearly move the rack 744 and associated upper fingers 750 toward a tray position of an item sortation system or a portion of a conveyor, such that the upper fingers 750 engage with the upper edge of the tray and push the tray out of the interior of the passthrough end effector and toward a tray position of an item sortation system or a portion of a conveyor.

FIGS. 8A-8D are top, front, perspective, and side view schematic diagrams, respectively, of an example lower finger assembly 637 of the example passthrough end effector 600 of an automated tray handling system, in accordance with disclosed implementations. The example lower finger assembly 637 of a passthrough end effector 600 may be coupled to a gantry system 504, as described with respect to FIGS. 5 and 6A-6C.

As shown in FIGS. 8A-8D, the lower finger assembly 637 may include a pinion 852 that is rotated by a motor or actuator (not shown), and the motor or actuator may be coupled to an interior of the frame 632, e.g., via a connection or coupling to the lower support member 636. The pinion 852 may include gear teeth that are in operative mating engagement with a rack 854 having corresponding gear teeth. In addition, the rack 854 may be coupled to a first portion of a slider 855 and configured for linear, sliding movement within an interior of the frame 632. A second portion of the slider 855 may be fixedly coupled to an interior of the frame 632, e.g., via a connection or coupling to the lower support member 636. For example, the slider 855 may be similar to a drawer glide having two portions that can move or slide linearly relative to each other with various bearings, rollers, balls, or other sliding elements positioned between the two portions of the drawer glide. In this manner, the rack 854 may move linearly within an interior of the frame 632 responsive to rotation of the pinion 852 by a motor and sliding movement along the slider 855.

Coupled to the rack 854 or the slider 855 may be one or more sensors (not shown), which may include various types of sensors, such as sensors 640 described with respect to FIGS. 6A-6C. In addition, a lower finger support member 856 may be coupled to the rack 854, e.g., to an upper side or other portion of the rack 854. As shown in FIGS. 8A-8D, one or more lower fingers 860 and associated actuators 858 may be coupled to the lower finger support member 856. For example, the one or more lower fingers 860 may include a substantially L-shaped, rod, bar, or pole, and additional rods, bars, poles, brackets, or other linkages that may move between a lowered or stowed position, and a raised or engaged position, in which the one or more lower fingers may engage with trays via an underside of a flange of the trays, and/or via other side, outer surfaces. In addition, one or more associated actuators 858 may cause movement of various elements of the one or more lower fingers 860 between the lowered or stowed position and the raised or engaged position. Further, the motor or actuator that drives the pinion 852 and/or the actuators 858 may comprise various types of actuators, such as solenoids, servos, pneumatic actuators, hydraulic actuators, linear actuators, rotary actuators, geared actuators, gearboxes or drivetrains, other types of actuators, or combinations thereof.

Using the lower finger assembly 637 described with respect to FIGS. 8A-8D, a tray may be moved between a tray position of an item sortation system, an interior of the passthrough end effector, and an upstream or downstream station or process, e.g., a portion, tier, or level of a conveyor. For example, in order to pull a tray from a tray position of an item sortation system or from a portion of a conveyor into an interior of the passthrough end effector, a motor may rotate the pinion 852 in order to linearly move the rack 854 and associated lower fingers 860 toward an underside of a flange of the tray. Upon positioning the lower fingers 860 proximate the underside of a flange of the tray, the actuators 858 may actuate the lower fingers 860 from the lowered or stowed position to the raised or engaged position, such that the lower fingers 860 engage with the underside of the flange of the tray. Then, the motor may rotate the pinion 852 in order to linearly move the rack 854 and associated lower fingers 860 toward an interior of the passthrough end effector, such that the lower fingers 860 engage with the underside of the flange of the tray and pull the tray into the interior of the passthrough end effector.

Likewise, in order to push a tray from an interior of the passthrough end effector to a tray position of an item sortation system or a portion of a conveyor, a motor may rotate the pinion 852 in order to linearly move the rack 854 and associated lower fingers 860 toward an underside of a flange of the tray that is within an interior of the passthrough end effector. Upon positioning the lower fingers 860 proximate the underside of the flange of the tray, the actuators 858 may actuate the lower fingers 860 from the lowered or stowed position to the raised or engaged position, such that the lower fingers 860 engage with the underside of the flange of the tray and/or a side, outer surface of the tray. Then, the motor may rotate the pinion 852 in order to linearly move the rack 854 and associated lower fingers 860 toward a tray position of an item sortation system or a portion of a conveyor, such that the lower fingers 860 engage with the underside of the flange of the tray and/or a side, outer surface of the tray, and push the tray out of the interior of the passthrough end effector and toward a tray position of an item sortation system or a portion of a conveyor.

FIGS. 9A-9D are schematic diagrams of an example passthrough end effector tray removal process 900A-900D of an automated tray handling system, in accordance with disclosed implementations.

Figure 9A:
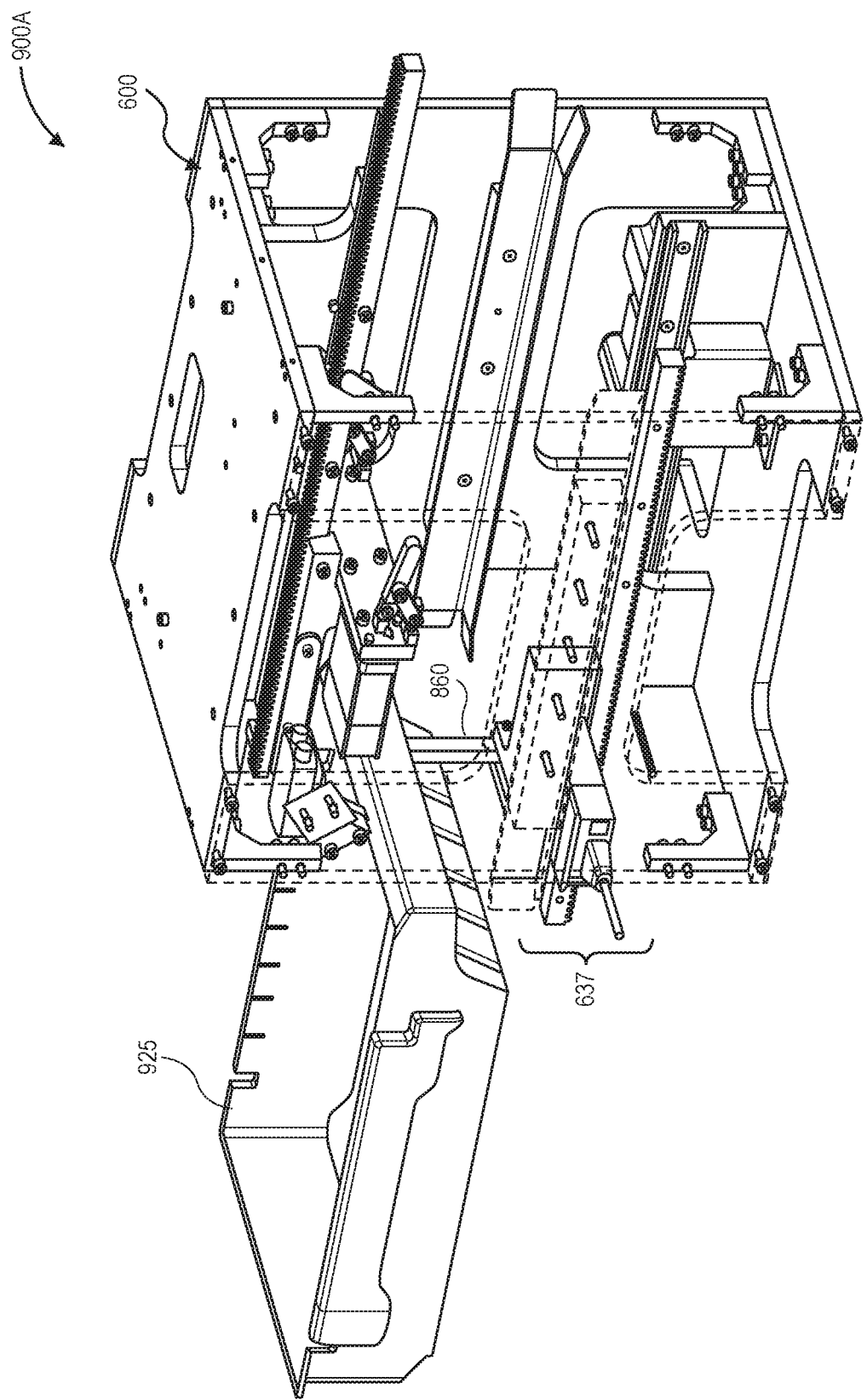
FIGS. 9A-9D are schematic diagrams of an example passthrough end effector tray removal process of an automated tray handling system, in accordance with disclosed implementations.

In FIG. 9A, the gantry system 504 and associated passthrough end effector 600 is in the process of retrieving a tray, such as a full tray 925 from a tray position of an item sortation system 102. Initially, the full tray 925 and/or the tray position of the item sortation system 102 may be identified using one or more sensors associated with the passthrough end effector 600. In order to retrieve the full tray 925, the lower finger assembly 637, e.g., a motor, pinion 852, and rack 854, may be actuated to extend toward the full tray 925, e.g., toward an underside of a flange of the full tray 925, and the one or more lower fingers 860 may be actuated to the raised position to engage with an underside of a flange of the full tray 925 and at least partially lift the full tray 925. One or more sensors associated with the passthrough end effector 600 may be used for positioning and movement of the passthrough end effector 600 during tray grasping or retrieval, may detect positions or actuations of the lower finger assembly 637 and the one or more lower fingers 860, and/or may detect presence of the full tray 925 during subsequent manipulation or movement by the passthrough end effector 600 and gantry system 504.

Figure 9B:
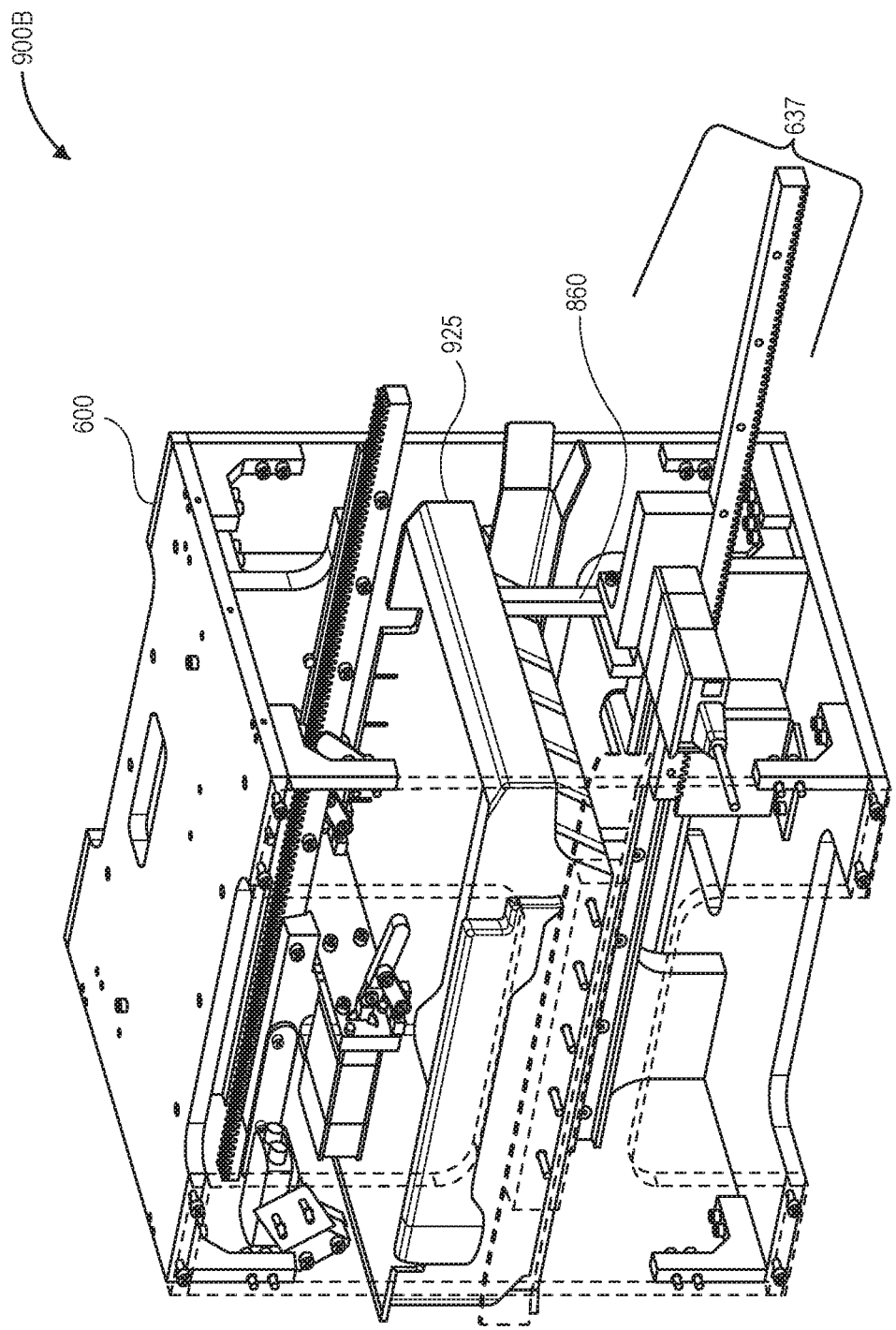

As shown in FIG. 9B, upon engagement between the one or more lower fingers 860 and the underside of the flange of the full tray 925, the lower finger assembly 637, e.g., a motor, pinion 852, and rack 854, may be actuated to pull the full tray 925 into an interior of the passthrough end effector 600. One or more sensors associated with the passthrough end effector 600 may continue to detect positions or actuations of the lower finger assembly 637 and the one or more lower fingers 860, and/or may continue to detect presence of the full tray 925 during subsequent manipulation or movement by the passthrough end effector 600 and gantry system 504.

Figure 9C:
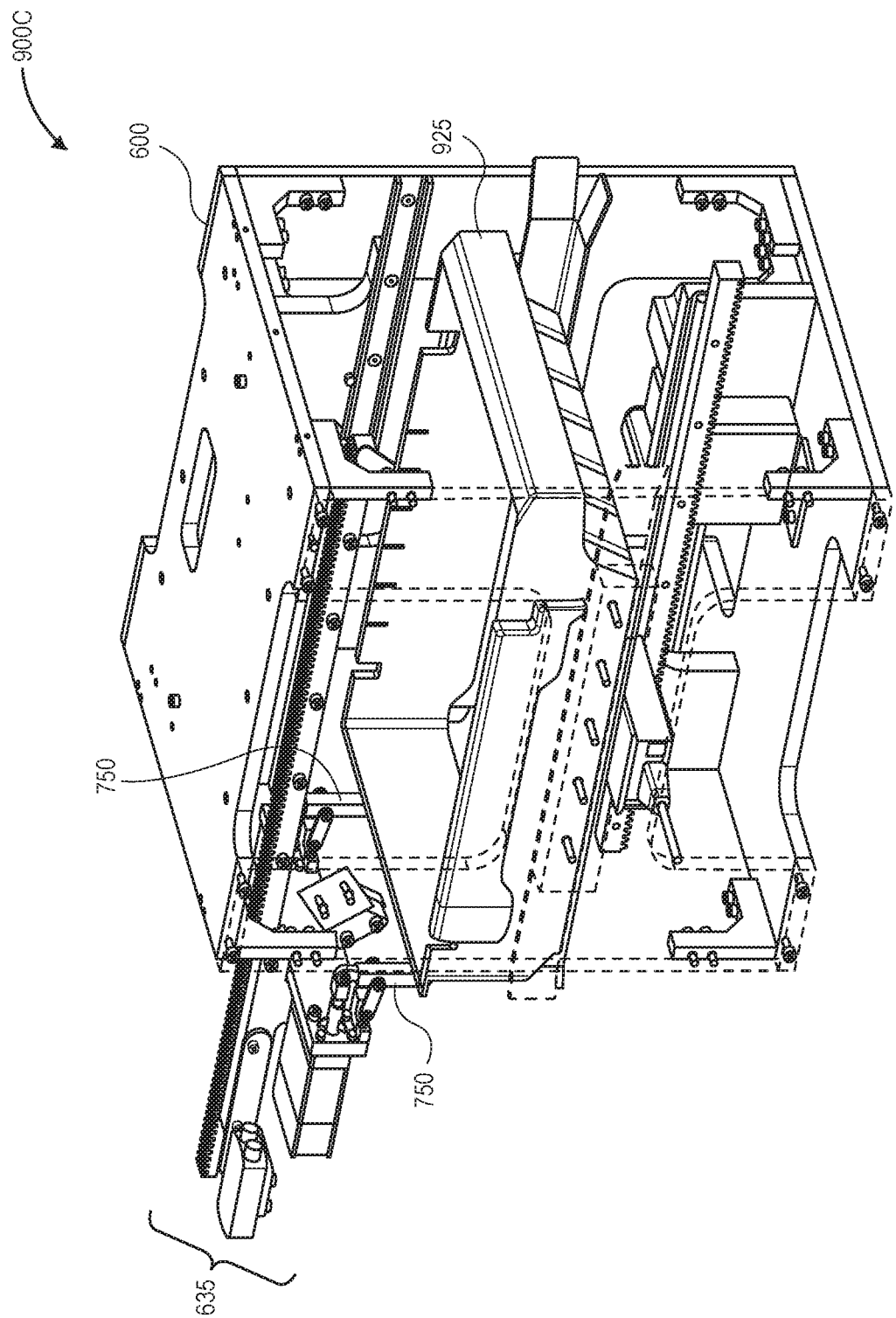

In FIG. 9C, the gantry system 504 and associated passthrough end effector 600 is in the process of placing a tray, such as a full tray 925 at a downstream station or process. Initially, the full tray 925 and/or the downstream station or process may be identified using one or more sensors associated with the passthrough end effector 600. In order to place the full tray 925, the upper finger assembly 635, e.g., a motor, pinion 742, and rack 744, may be actuated to extend toward the full tray 925, e.g., toward an upper edge of the full tray 925 that is within the interior of the passthrough end effector 600, and the one or more upper fingers 750 may be actuated to the lowered position to engage with an upper edge of the full tray 925. One or more sensors associated with the passthrough end effector 600 may be used for positioning and movement of the passthrough end effector 600 during tray placement, may detect positions or actuations of the upper finger assembly 635 and the one or more upper fingers 750, and/or may detect presence of the full tray 925 during subsequent manipulation or movement by the passthrough end effector 600 and gantry system 504. In other example embodiments, one or more sensors (similar to sensors 640, 743 described with respect to FIGS. 6A-8D) may be associated with the conveyor, e.g., the upper tier of the conveyor, in order to identify the full tray 925, identify one or more items sorted to the full tray 925, identify a presence of the full tray 925, identify a position or orientation of the full tray 925, identify one or more other trays associated with or positioned on the conveyor, etc.

Figure 9D:
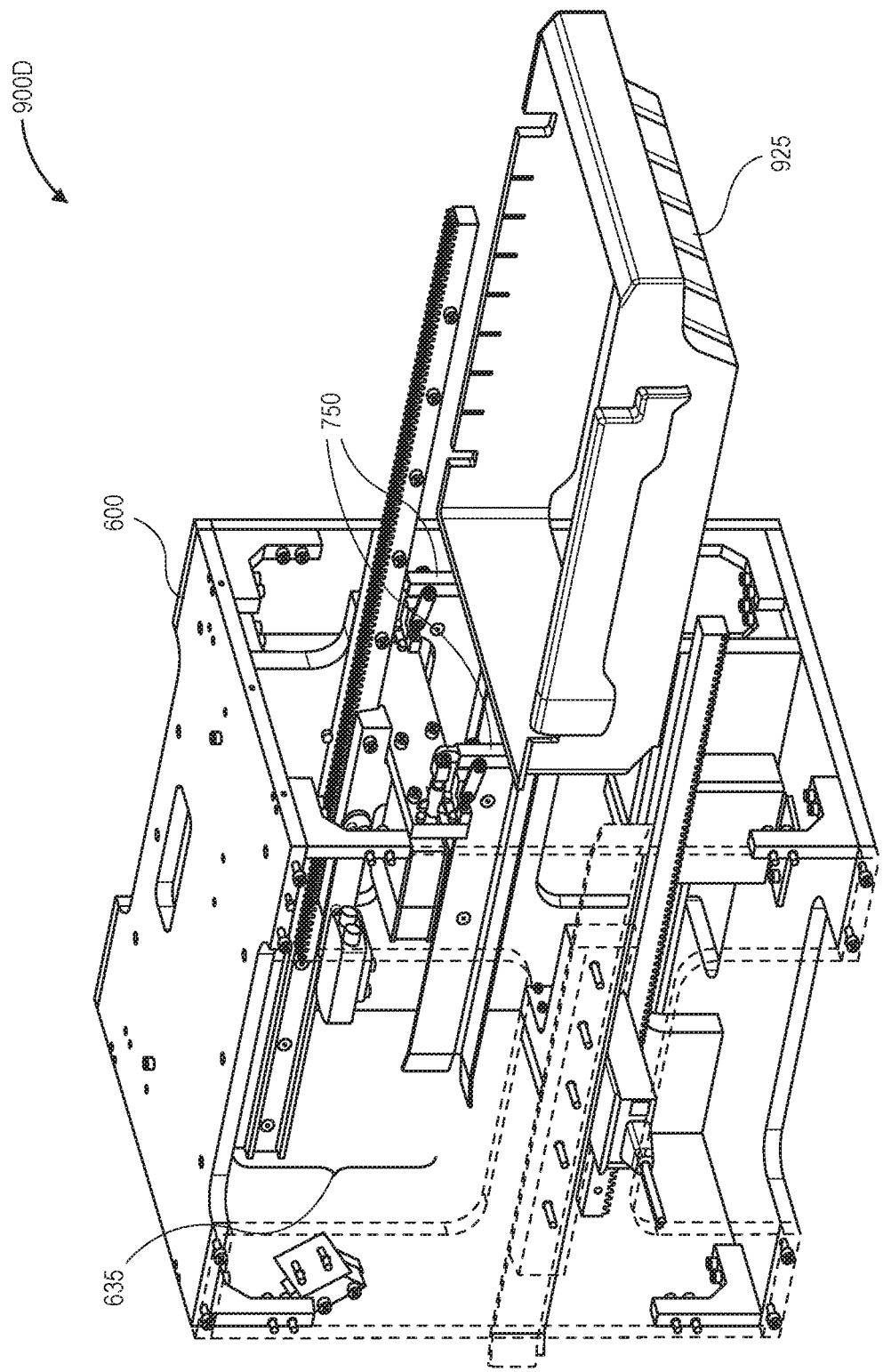

As shown in FIG. 9D, upon engagement between the one or more upper fingers 750 and the upper edge of the full tray 925, the upper finger assembly 635, e.g., a motor, pinion 742, and rack 744, may be actuated to push the full tray 925 out of an interior of the passthrough end effector 600 to a downstream station or process. One or more sensors associated with the passthrough end effector 600 may continue to detect positions or actuations of the upper finger assembly 635 and the one or more upper fingers 750, and/or may continue to detect absence of the full tray 925 during subsequent manipulation or movement by the passthrough end effector 600 and gantry system 504.

Thereafter, the example passthrough end effector tray removal process 900A-900D of the automated tray handling system described with respect to FIGS. 9A-9D may be substantially repeated to continuously remove additional full trays from tray positions of the item sortation system and place additional full trays at downstream stations or processes. At least in part because of the operations of the gantry system and associated passthrough end effector, substantially all tray positions of the item sortation system may be maintained occupied by trays that are ready to receive sorted items, by efficiently and quickly removing full trays from tray positions to downstream stations or processes.

Figure 10:
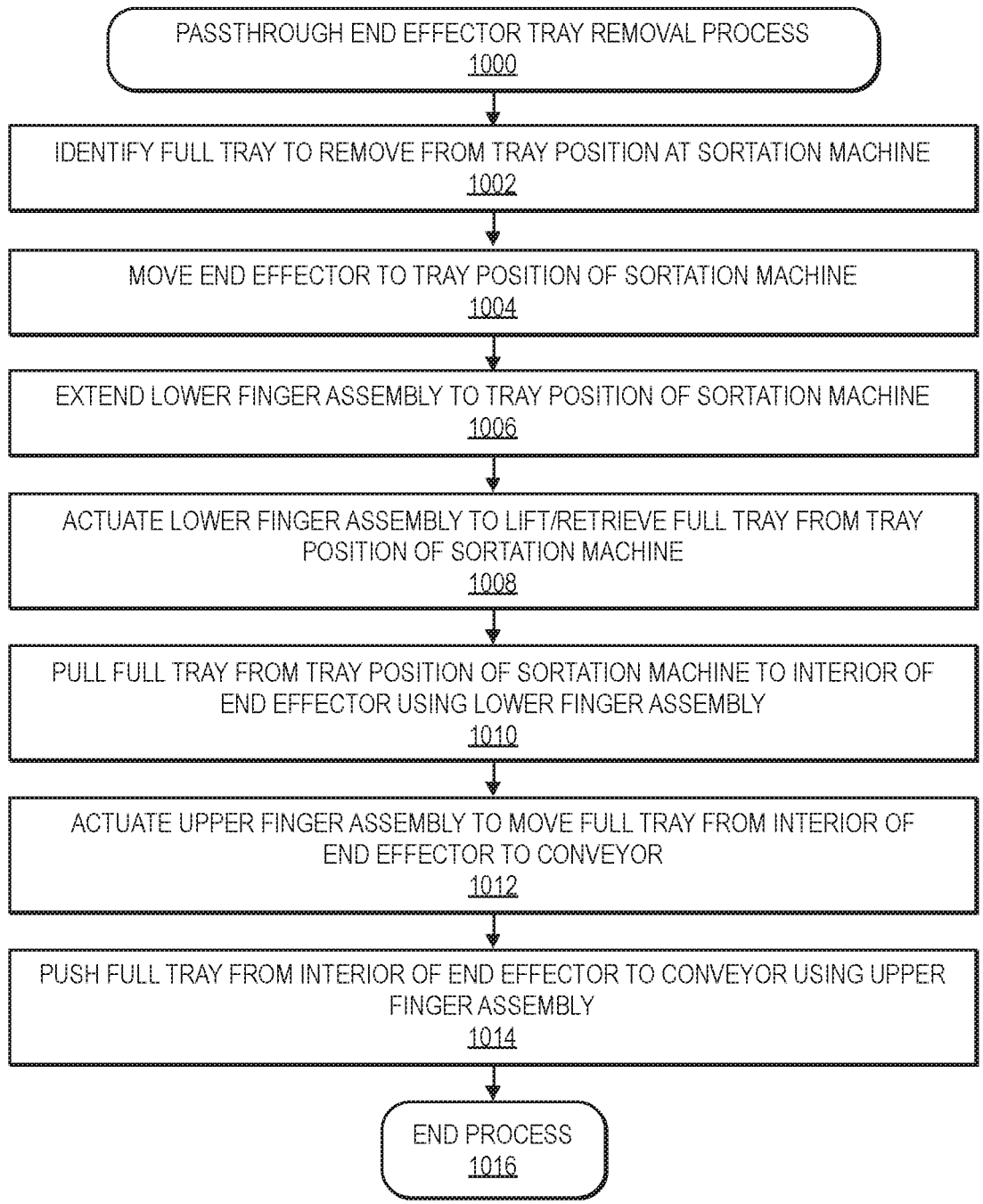
FIG. 10 is a flow diagram illustrating an example passthrough end effector tray removal process, in accordance with disclosed implementations.

FIG. 10 is a flow diagram illustrating an example passthrough end effector tray removal process 1000, in accordance with disclosed implementations.

The process 1000 may begin by identifying a full tray to remove from a tray position of an item sortation machine, as at 1002. For example, one or more sensors, such as imaging sensors, barcode scanning sensors, RFID readers, or other sensors, may identify a full tray that is to be removed from a respective tray position of an item sortation system. In example embodiments, the one or more sensors may be associated with a passthrough end effector coupled to a gantry system. Further, a control system may provide instructions or commands to the gantry system, passthrough end effector, or components thereof to identify a full tray at a respective tray position of an item sortation system.

The process 1000 may continue by moving a passthrough end effector toward the tray position of the item sortation machine, as at 1004. For example, a gantry system may position and orient the passthrough end effector to align with the tray position of the item sortation system. In example embodiments, the gantry system may move and rotate the passthrough end effector to a desired position and orientation. Further, a control system may provide instructions or commands to the gantry system, passthrough end effector, or components thereof to move the passthrough end effector using the gantry system.

The process 1000 may proceed by extending a lower finger assembly toward the tray position of the item sortation machine, as at 1006. For example, the lower finger assembly may be actuated to extend, e.g. using a motor, pinion, and rack, toward the full tray to be removed from the tray position of the item sortation system. In example embodiments, the lower finger assembly may be extended such that one or more lower fingers are aligned with an underside of a flange of the full tray to be removed. Further, a control system may provide instructions or commands to the gantry system, passthrough end effector, or components thereof to actuate the lower finger assembly of the passthrough end effector.

The process 1000 may then continue to actuate the lower finger assembly to lift or retrieve the full tray from the tray position of the item sortation machine, as at 1008. For example, the one or more lower fingers may be actuated to the raised or engaged position, such that the one or more lower fingers engage with an underside of a flange of the full tray and at least partially lift the full tray. In example embodiments, the full tray may be at least partially lifted in order to provide clearance over a ridge, protrusion, or wall configured to maintain the full tray inside the tray position of the item sortation system. Further, a control system may provide instructions or commands to the gantry system, passthrough end effector, or components thereof to actuate the lower finger assembly of the passthrough end effector.

The process 1000 may then proceed to pull the full tray from the tray position of the item sortation machine to an interior of the passthrough end effector using the lower finger assembly, as at 1010. For example, upon engagement of the one or more lower fingers with an underside of a flange of the full tray, the lower finger assembly may be actuated to pull, e.g. using a motor, pinion, and rack, the full tray from the tray position of the item sortation system and into an interior of the passthrough end effector. In example embodiments, the lower finger assembly may pull the full tray substantially or completely into an interior of the passthrough end effector. Further, a control system may provide instructions or commands to the gantry system, passthrough end effector, or components thereof to actuate the lower finger assembly of the passthrough end effector.

The process 1000 may continue with actuating an upper finger assembly to move the full tray from the interior of the passthrough end effector to a conveyor, as at 1012. For example, the upper finger assembly may be actuated to extend, e.g. using a motor, pinion, and rack, toward the full tray to be moved out of the interior of the passthrough end effector. In example embodiments, the upper finger assembly may be extended such that one or more upper fingers are aligned with an upper edge of the full tray to be moved. In addition, the one or more upper fingers may be actuated to the lowered or engaged position, such that the one or more upper fingers engage with an upper edge of the full tray, e.g., an outer side of an upper edge of the full tray. Moreover, a gantry system may move the passthrough end effector to a desired position or orientation adjacent a downstream station or process, e.g., a portion of a conveyor, to which the full tray is to be moved from the interior of the passthrough end effector. In other example embodiments, one or more sensors (similar to sensors 640, 743 described with respect to FIGS. 6A-8D) may be associated with the conveyor, e.g., the upper tier of the conveyor, in order to identify the full tray 925, identify one or more items sorted to the full tray 925, identify a presence of the full tray 925, identify a position or orientation of the full tray 925, identify one or more other trays associated with or positioned on the conveyor, etc. Further, a control system may provide instructions or commands to the gantry system, passthrough end effector, or components thereof to actuate the upper finger assembly of the passthrough end effector.

The process 1000 may proceed with pushing the full tray from the interior of the passthrough end effector to a conveyor using the upper finger assembly, as at 1014. For example, upon engagement of the one or more upper fingers with an upper edge of the full tray, the upper finger assembly may be actuated to push, e.g. using a motor, pinion, and rack, the full tray from the interior of the passthrough end effector to a downstream station or process, such as a portion of a conveyor. In example embodiments, the upper finger assembly may push the full tray substantially or completely out of an interior of the passthrough end effector. Further, a control system may provide instructions or commands to the gantry system, passthrough end effector, or components thereof to actuate the upper finger assembly of the passthrough end effector. The process 1000 may then end, as at 1016.

Thereafter, the example passthrough end effector tray removal process 1000 of the automated tray handling system described with respect to FIG. 10 may be substantially repeated to continuously remove additional full trays from tray positions of the item sortation system and place additional full trays at downstream stations or processes. At least in part because of the operations of the gantry system and associated passthrough end effector, substantially all tray positions of the item sortation system may be maintained occupied by trays that are ready to receive sorted items, by efficiently and quickly removing full trays from tray positions to downstream stations or processes.

FIGS. 11A-11D are schematic diagrams of an example passthrough end effector tray replenishment process 1100A-1100D of an automated tray handling system, in accordance with disclosed implementations.

Figure 11A:
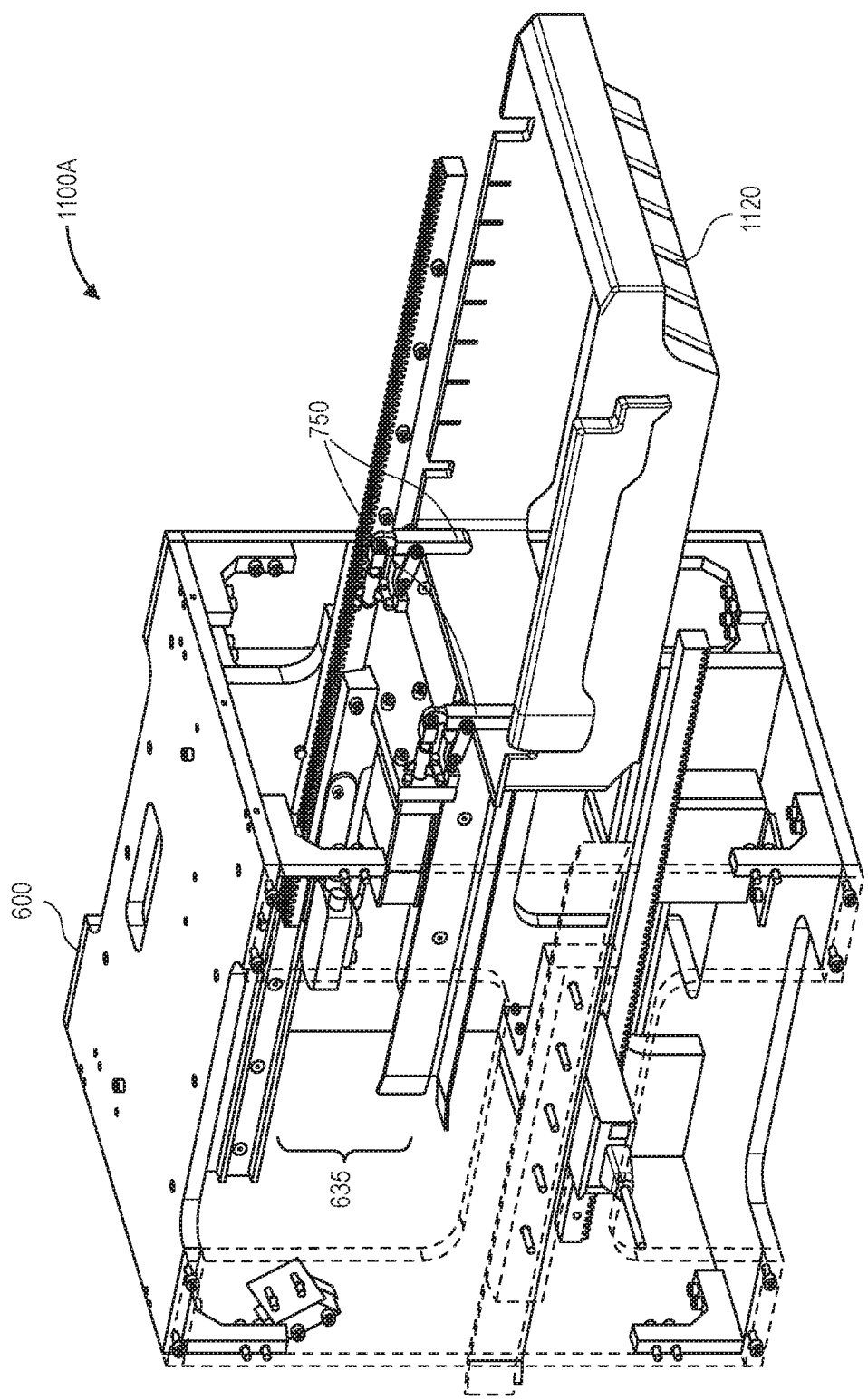
FIGS. 11A-11D are schematic diagrams of an example passthrough end effector tray replenishment process of an automated tray handling system, in accordance with disclosed implementations.

In FIG. 11A, the gantry system 504 and associated passthrough end effector 600 is in the process of retrieving a tray, such as an empty tray 1120 from an upstream station or process. Initially, the empty tray 1120 and/or the upstream station or process may be identified using one or more sensors associated with the passthrough end effector 600. In order to retrieve the empty tray 1120, the upper finger assembly 635, e.g., a motor, pinion 742, and rack 744, may be actuated to extend toward the empty tray 1120, e.g., toward an upper edge of the empty tray 1120, and the one or more upper fingers 750 may be actuated to the lowered position to engage with an upper edge of the empty tray 1120. One or more sensors associated with the passthrough end effector 600 may be used for positioning and movement of the passthrough end effector 600 during tray grasping or retrieval, may detect positions or actuations of the upper finger assembly 635 and the one or more upper fingers 750, and/or may detect presence of the empty tray 1120 during subsequent manipulation or movement by the passthrough end effector 600 and gantry system 504. In other example embodiments, one or more sensors (similar to sensors 640, 743 described with respect to FIGS. 6A-8D) may be associated with the conveyor, e.g., the lower tier of the conveyor, in order to identify the empty tray 1120, identify a presence of the empty tray 1120, identify a position or orientation of the empty tray 1120, etc.

Figure 11B:
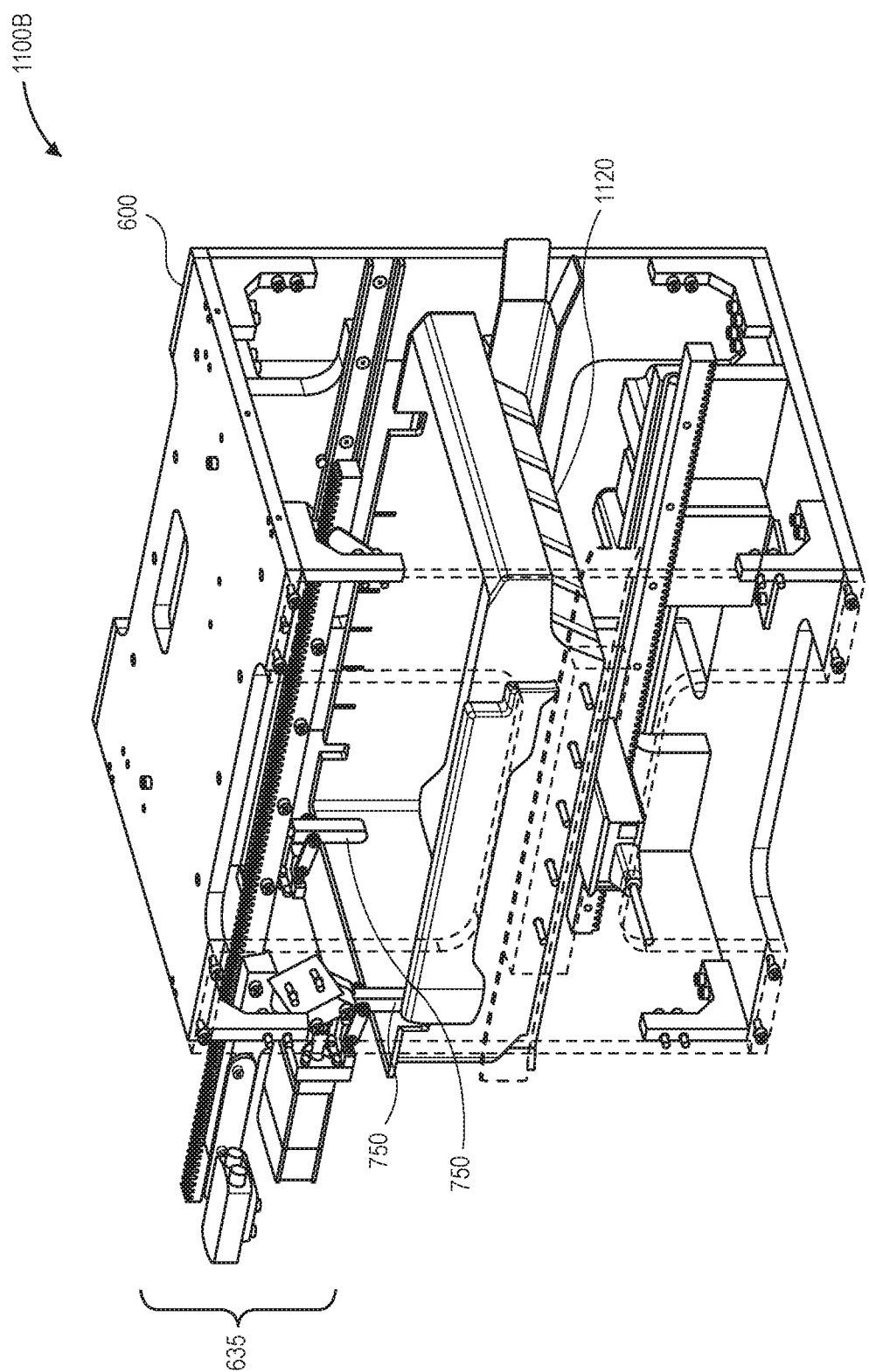

As shown in FIG. 11B, upon engagement between the one or more upper fingers 750 and the upper edge of the empty tray 1120, the upper finger assembly 635, e.g., a motor, pinion 742, and rack 744, may be actuated to pull the empty tray 1120 into an interior of the passthrough end effector 600. One or more sensors associated with the passthrough end effector 600 may continue to detect positions or actuations of the upper finger assembly 635 and the one or more upper fingers 750, and/or may continue to detect presence of the empty tray 1120 during subsequent manipulation or movement by the passthrough end effector 600 and gantry system 504.

Figure 11C:
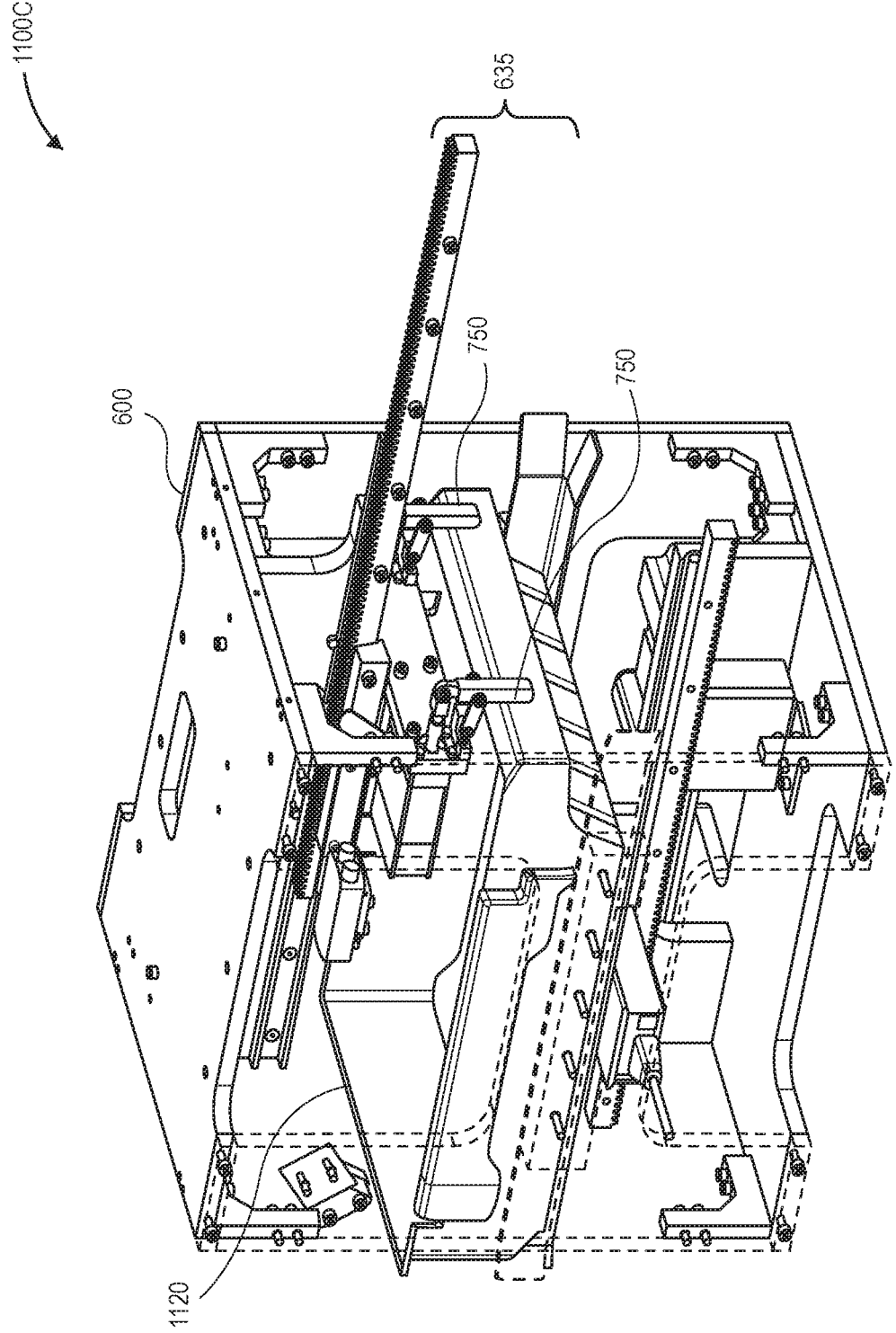

In FIG. 11C, the gantry system 504 and associated passthrough end effector 600 is in the process of placing a tray, such as an empty tray 1120 at a tray position of an item sortation system. Initially, the empty tray 1120 and/or the tray position of the item sortation system may be identified using one or more sensors associated with the passthrough end effector 600. In order to place the empty tray 1120, the upper finger assembly 635, e.g., a motor, pinion 742, and rack 744, may be actuated to extend toward the empty tray 1120, e.g., toward an upper edge of the empty tray 1120 that is within the interior of the passthrough end effector 600, and the one or more upper fingers 750 may be actuated to the lowered position to engage with an upper edge of the empty tray 1120. One or more sensors associated with the passthrough end effector 600 may be used for positioning and movement of the passthrough end effector 600 during tray placement, may detect positions or actuations of the upper finger assembly 635 and the one or more upper fingers 750, and/or may detect presence of the empty tray 1120 during subsequent manipulation or movement by the passthrough end effector 600 and gantry system 504.

Figure 11D:
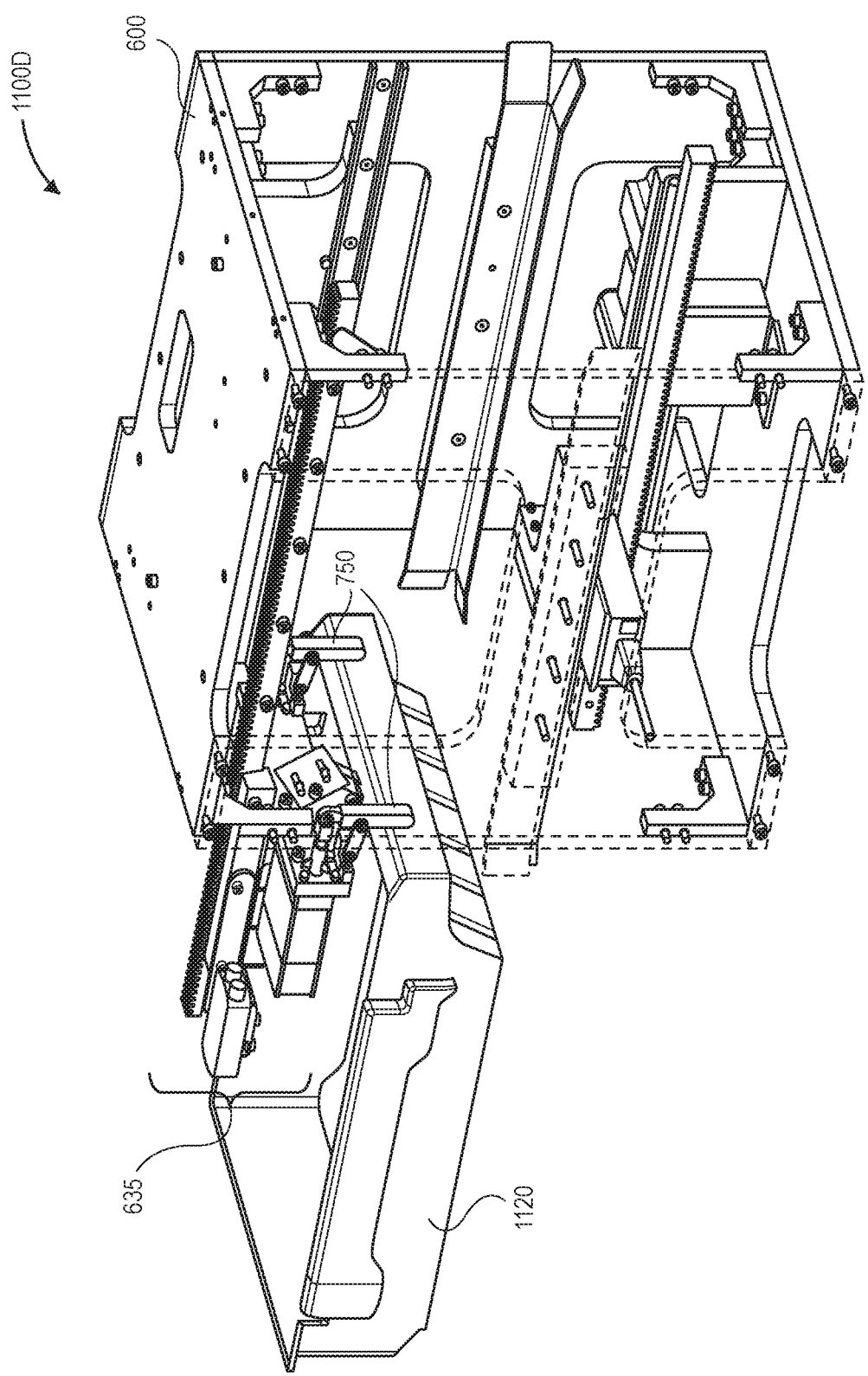

As shown in FIG. 11D, upon engagement between the one or more upper fingers 750 and the upper edge of the empty tray 1120, the upper finger assembly 635, e.g., a motor, pinion 742, and rack 744, may be actuated to push the empty tray 1120 out of an interior of the passthrough end effector 600 to a tray position of an item sortation system. One or more sensors associated with the passthrough end effector 600 may continue to detect positions or actuations of the upper finger assembly 635 and the one or more upper fingers 750, and/or may continue to detect absence of the empty tray 1120 during subsequent manipulation or movement by the passthrough end effector 600 and gantry system 504.

Thereafter, the example passthrough end effector tray replenishment process 1100A-1100D of the automated tray handling system described with respect to FIGS. 11A-11D may be substantially repeated to continuously remove additional empty trays from upstream stations or processes and place additional empty trays at tray positions of the item sortation system. At least in part because of the operations of the gantry system and associated passthrough end effector, substantially all tray positions of the item sortation system may be maintained occupied by trays that are ready to receive sorted items, by efficiently and quickly refilling empty trays at tray positions from upstream stations or processes.

Figure 12:
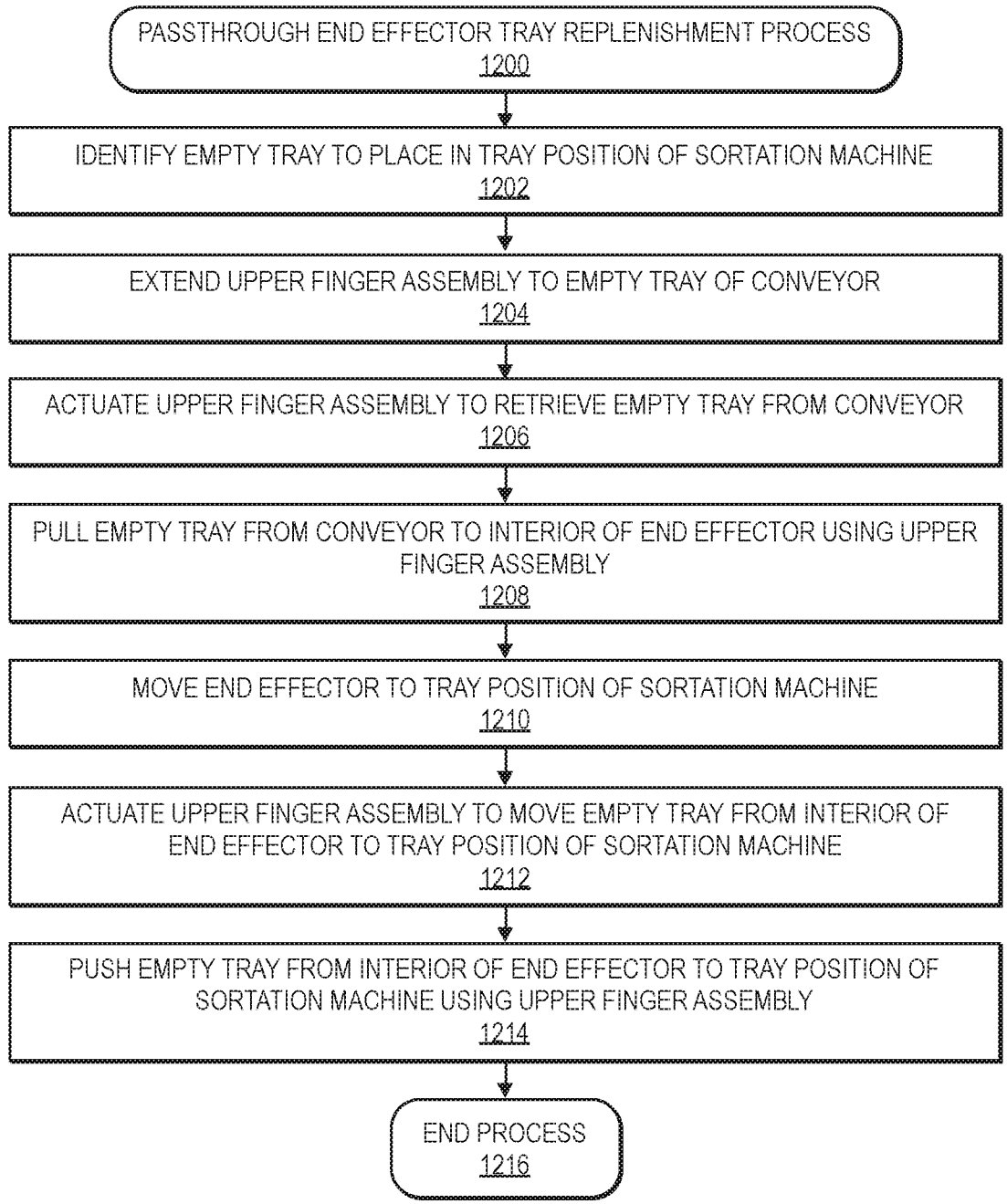
FIG. 12 is a flow diagram illustrating an example passthrough end effector tray replenishment process, in accordance with disclosed implementations.

FIG. 12 is a flow diagram illustrating an example passthrough end effector tray replenishment process 1200, in accordance with disclosed implementations.

The process 1200 may begin by identifying an empty tray to place at a tray position of an item sortation machine, as at 1202. For example, one or more sensors, such as imaging sensors, barcode scanning sensors, RFID readers, or other sensors, may identify an empty tray at an upstream station or process that is to be placed at a respective tray position of an item sortation system. In example embodiments, the one or more sensors may be associated with a passthrough end effector coupled to a gantry system. In other example embodiments, one or more sensors (similar to sensors 640, 743 described with respect to FIGS. 6A-8D) may be associated with the conveyor, e.g., the lower tier of the conveyor, in order to identify the empty tray 1120, identify a presence of the empty tray 1120, identify a position or orientation of the empty tray 1120, etc. Further, a control system may provide instructions or commands to the gantry system, passthrough end effector, or components thereof to identify an empty tray to be placed at a respective tray position of an item sortation system.

The process 1200 may proceed by extending an upper finger assembly toward the empty tray of the conveyor, as at 1204. For example, the upper finger assembly may be actuated to extend, e.g. using a motor, pinion, and rack, toward the empty tray to be retrieved from the upstream station or process, such as a portion of a conveyor. In example embodiments, the upper finger assembly may be extended such that one or more upper fingers are aligned with an upper edge of the empty tray to be retrieved. Moreover, a gantry system may move the passthrough end effector to a desired position or orientation adjacent the upstream station or process, e.g., a portion of a conveyor, from which the empty tray is to be retrieved. Further, a control system may provide instructions or commands to the gantry system, passthrough end effector, or components thereof to actuate the upper finger assembly of the passthrough end effector.

The process 1200 may then continue to actuate the upper finger assembly to retrieve the empty tray from the conveyor, as at 1206. For example, the one or more upper fingers may be actuated to the lowered or engaged position, such that the one or more upper fingers engage with an upper edge of the empty tray, e.g., an inside of an upper edge of the empty tray. Further, a control system may provide instructions or commands to the gantry system, passthrough end effector, or components thereof to actuate the upper finger assembly of the passthrough end effector.

The process 1200 may then proceed to pull the empty tray from the conveyor to an interior of the passthrough end effector using the upper finger assembly, as at 1208. For example, upon engagement of the one or more upper fingers with an upper edge of the empty tray, the upper finger assembly may be actuated to pull, e.g. using a motor, pinion, and rack, the empty tray from the conveyor and into an interior of the passthrough end effector. In example embodiments, the upper finger assembly may pull the empty tray substantially or completely into an interior of the passthrough end effector. Further, a control system may provide instructions or commands to the gantry system, passthrough end effector, or components thereof to actuate the upper finger assembly of the passthrough end effector.

The process 1200 may continue by moving the passthrough end effector toward the tray position of the item sortation machine, as at 1210. For example, a gantry system may position and orient the passthrough end effector to align with the tray position of the item sortation system. In example embodiments, the gantry system may move and rotate the passthrough end effector and associated empty tray to a desired position and orientation. Further, a control system may provide instructions or commands to the gantry system, passthrough end effector, or components thereof to move the passthrough end effector using the gantry system.

The process 1200 may continue with actuating the upper finger assembly to move the empty tray from the interior of the passthrough end effector to the tray position of the item sortation machine, as at 1212. For example, the upper finger assembly may be actuated to extend, e.g. using a motor, pinion, and rack, toward the empty tray to be moved out of the interior of the passthrough end effector. In example embodiments, the upper finger assembly may be extended such that one or more upper fingers are aligned with an upper edge of the empty tray to be moved. In addition, the one or more upper fingers may be actuated to the lowered or engaged position, such that the one or more upper fingers engage with an upper edge of the empty tray, e.g., an outer side of an upper edge of the empty tray. Further, a control system may provide instructions or commands to the gantry system, passthrough end effector, or components thereof to actuate the upper finger assembly of the passthrough end effector.

The process 1200 may proceed with pushing the empty tray from the interior of the passthrough end effector to the tray position of the item sortation machine using the upper finger assembly, as at 1214. For example, upon engagement of the one or more upper fingers with an upper edge of the empty tray, the upper finger assembly may be actuated to push, e.g. using a motor, pinion, and rack, the empty tray from the interior of the passthrough end effector to the tray position of the item sortation system. In example embodiments, the upper finger assembly may push the empty tray substantially or completely out of an interior of the passthrough end effector. Further, a control system may provide instructions or commands to the gantry system, passthrough end effector, or components thereof to actuate the upper finger assembly of the passthrough end effector. The process 1200 may then end, as at 1216.

Thereafter, the example passthrough end effector tray replenishment process 1200 of the automated tray handling system described with respect to FIG. 12 may be substantially repeated to continuously remove additional empty trays from upstream stations or processes and place additional empty trays at tray positions of the item sortation system. At least in part because of the operations of the gantry system and associated passthrough end effector, substantially all tray positions of the item sortation system may be maintained occupied by trays that are ready to receive sorted items, by efficiently and quickly refilling empty trays at tray positions from upstream stations or processes.

Although FIGS. 9A-12 describe particular operations performed by the upper finger assembly or the lower finger assembly, in other example embodiments, various of the operations described herein with respect to the passthrough end effector may be performed by either or both of the upper finger assembly and/or the lower finger assembly. For example, if a tray includes similar flanges or lips on opposite or multiple sides, the lower finger assembly may be used to perform any or all of the operations of retrieving (e.g., pulling) an empty tray from an upstream station or process, placing (e.g., pushing) an empty tray at a tray position of a sortation system, retrieving (e.g., pulling) a full tray from a tray position of a sortation system, and/or placing (e.g., pushing) a full tray at a downstream station or process. In addition, if a tray includes similar upper edges on opposite or multiple sides, the upper finger assembly may be used to perform any or all of the operations of retrieving (e.g., pulling) an empty tray from an upstream station or process, placing (e.g., pushing) an empty tray at a tray position of a sortation system, retrieving (e.g., pulling) a full tray from a tray position of a sortation system (in the absence of a ridge, protrusion, or wall over which the full tray should be lifted), and/or placing (e.g., pushing) a full tray at a downstream station or process.

Figure 13:
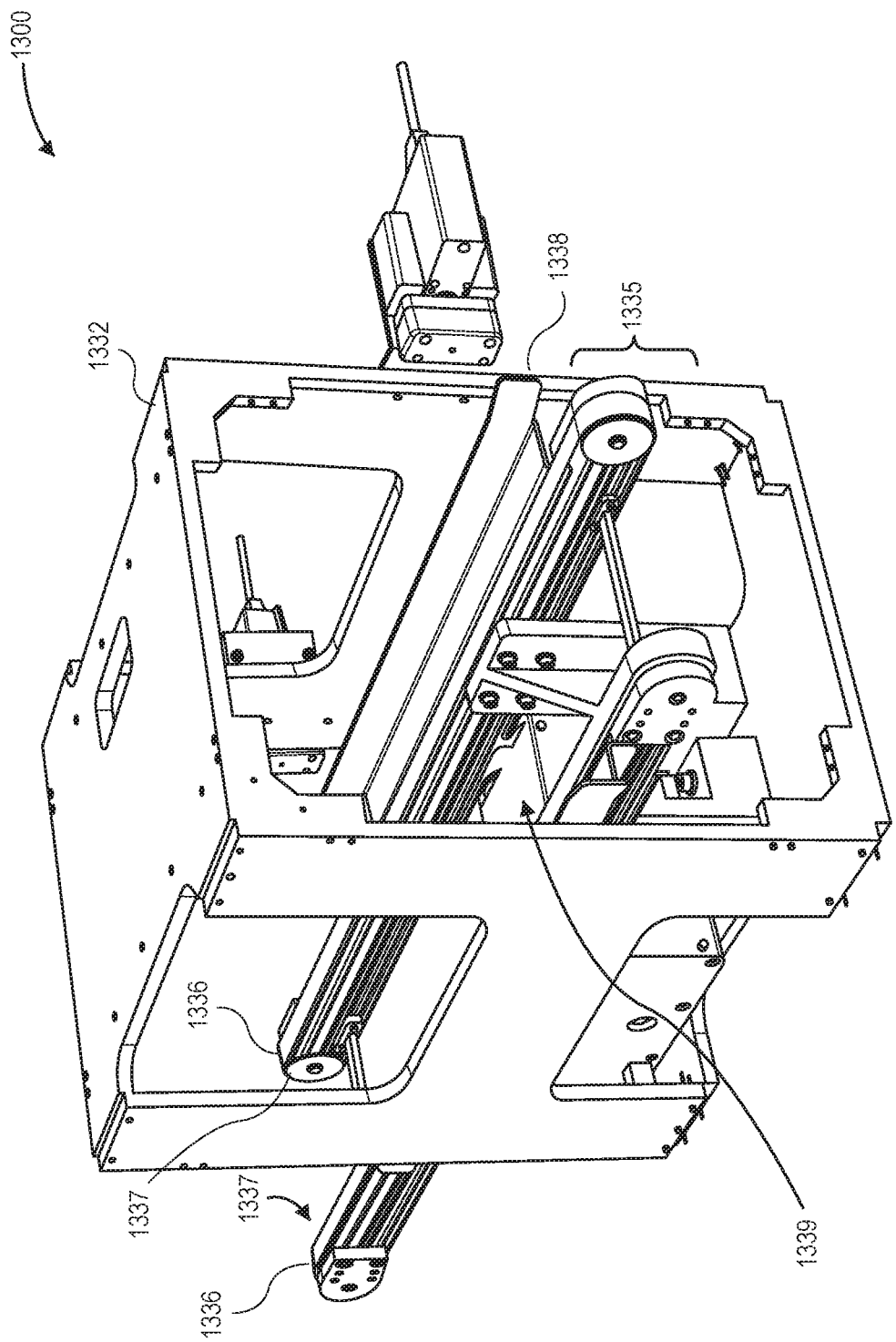
FIG. 13 is a perspective view schematic diagram of an example passthrough belted end effector of an automated tray handling system, in accordance with disclosed implementations.

FIG. 13 is a perspective view schematic diagram of an example passthrough belted end effector 1300 of an automated tray handling system, in accordance with disclosed implementations. The example passthrough belted end effector 1300 may be an example of passthrough end effectors 505, as described with respect to FIG. 5.

The passthrough belted end effector may include a frame or body 1332, a belt assembly 1335, one or more tray guides 1338, and one or more sensors (not shown). The frame or body 1332 may form an enclosure, box, channel, tube, cylinder, tunnel, or other similar structure of the end effector to which other components may be attached or coupled. In addition, the passthrough belted end effector may couple to a gantry system 504 via a portion, e.g., a top, a bottom, and/or sides, of the frame or body 1332, and the gantry system 504 may move or rotate the passthrough belted end effector to various positions or orientations. The passthrough belted end effector may couple to the gantry system 504 in various ways, such as fasteners, adhesives, welds, other attachment elements, or combinations thereof. In addition, various components of the passthrough belted end effector may couple to the frame or body 1332 in various ways, such as fasteners, adhesives, welds, other attachment elements, or combinations thereof.

As shown in FIG. 13, within an interior of the frame 1332, a belt assembly 1335 may be coupled to the frame 1332, and the belt assembly 1335 may be configured to manipulate trays, e.g., by contact and movement between the belt assembly 1335 and undersides or other portions of trays. For example, the belt assembly 1335 may include one or more belts 1336, one or more rollers 1337, and a motor or actuator 1339. In example embodiments, the one or more belts 1336 and the one or more rollers 1337 may be configured to extend outward from an outer periphery, extent, or dimension of the frame 1332 in order to lift, retrieve, move, and/or place trays relative to an item sortation system, and/or upstream or downstream stations or processes. For example, the one or more belts 1336 and rollers 1337 may extend a same amount or distance from opposite sides of the frame 1332, or the one or more belts 1336 and rollers 1337 may extend different amounts from different sides of the frame 1332. Accordingly, the one or more belts 1336 and the one or more rollers 1337 may have various sizes, shapes, lengths, angles, curves, surfaces, edges, or other features that correspond to features associated with an underside or other portion of trays to be manipulated by the belt assembly 1335. In addition, the motor or actuator 1339 may be configured to rotate or drive the one or more belts 1336 around the one or more rollers 1337, e.g., by actuation of a pinion, drive roller, or other driving component that is operatively engaged with a portion of the one or more belts 1336. Further, the motor or actuator 1339 may comprise various types of actuators, such as motors, servos, rotary actuators, geared actuators, gearboxes or drivetrains, other types of actuators, or combinations thereof.

In addition, one or more tray guides 1338 may be coupled to an interior of the frame 1332. For example, the tray guides 1338 may comprise substantially straight, flat, or smooth surfaces, rails, slides, or plates upon which one or more surfaces or features of a tray may slide into, through, and out of an interior of the passthrough belted end effector. Further, the tray guides 1338 may be substantially aligned with surfaces of the one or more belts 1336 of the belt assembly 1335 in order to facilitate movement and support of trays that are manipulated by the passthrough belted end effector 1300. The frame or body 1332, portions of the belt assembly 1335 such as the one or more rollers 1337, and the one or more tray guides 1338 may be formed of various materials, such as metals, plastics, composites, other materials, or combinations thereof. In addition, the one or more belts 1336 may be formed of various materials, such as rubbers, silicones, plastics, fabrics, composites, other materials, or combinations thereof.

Further, the passthrough belted end effector may also include one or more sensors (not shown), similar to that described with respect to FIGS. 6A-6C, 7, and 8. For example, the sensors may comprise photoeyes, proximity sensors, ranging sensors, imaging sensors, barcode scanning sensors, radiofrequency identification (RFID) readers, or other types of sensors. In one example, the sensors may comprise a ranging sensor that is configured to detect a distance between the passthrough belted end effector and a tray, e.g., a distance between the belt assembly 1335 and/or one or more belts 1336 and rollers 1337 thereof, and an underside or other portion of a tray. In a further example, the sensors may comprise an imaging sensor, a barcode scanning sensor, or an RFID reader that is configured to identify a tray, a tray position, and/or one or more items in a tray. In another example, the sensors may comprise a photoeye or proximity sensor that is configured to detect a presence of a tray within an interior of the passthrough belted end effector. In still another example, the sensors may comprise a photoeye, a proximity sensor, or an imaging sensor that is configured to detect a position or actuation of the belt assembly 1335 and/or one or more belts 1336 and rollers 1337 thereof.

Although FIG. 13 shows a particular number, arrangement, and configuration of components of a passthrough belted end effector, the passthrough belted end effector may include other numbers, arrangements, and configurations of various components. For example, the frame or body may have other shapes, sizes, or configurations, one, two, three, four, or other numbers of belt assemblies may be coupled to the frame or body, e.g., within an interior of the frame or body, other numbers or arrangements of one or more belts, rollers, and associated motors or actuators may be included, other numbers or arrangements of one or more tray guides may be included, and other numbers or arrangements of sensors may be included.

Figure 14:
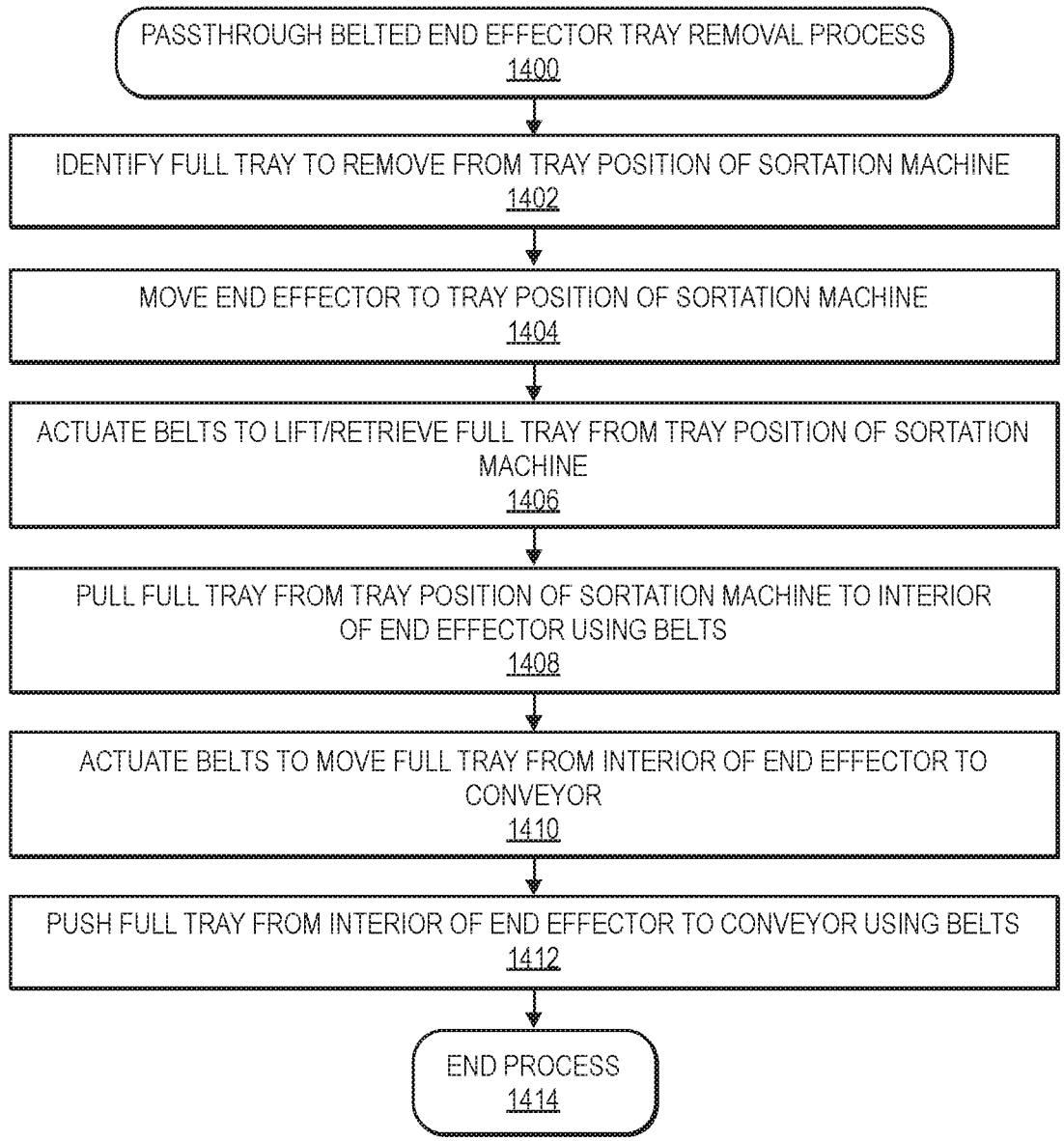
FIG. 14 is a flow diagram illustrating an example passthrough belted end effector tray removal process, in accordance with disclosed implementations.

FIG. 14 is a flow diagram illustrating an example passthrough belted end effector tray removal process 1400, in accordance with disclosed implementations.

The process 1400 may begin by identifying a full tray to remove from a tray position of an item sortation machine, as at 1402. For example, one or more sensors, such as imaging sensors, barcode scanning sensors, RFID readers, or other sensors, may identify a full tray that is to be removed from a respective tray position of an item sortation system. In example embodiments, the one or more sensors may be associated with a passthrough belted end effector coupled to a gantry system. Further, a control system may provide instructions or commands to the gantry system, passthrough belted end effector, or components thereof to identify a full tray at a respective tray position of an item sortation system.

The process 1400 may continue by moving a passthrough belted end effector toward the tray position of the item sortation machine, as at 1404. For example, a gantry system may position and orient the passthrough belted end effector to align with the tray position of the item sortation system. In example embodiments, the gantry system may move and rotate the passthrough belted end effector to a desired position and orientation. Further, a control system may provide instructions or commands to the gantry system, passthrough belted end effector, or components thereof to move the passthrough belted end effector using the gantry system.

The process 1400 may then continue to actuate the one or more belts to lift or retrieve the full tray from the tray position of the item sortation machine, as at 1406. For example, the one or more belts and rollers of the belt assembly may be actuated to engage with an underside or other portion of the full tray, at least partially lift the full tray, and/or pull or move the full tray toward an interior of the passthrough belted end effector. In example embodiments, the full tray may be at least partially lifted in order to provide clearance over a ridge, protrusion, or wall configured to maintain the full tray inside the tray position of the item sortation system. Further, a control system may provide instructions or commands to the gantry system, passthrough belted end effector, or components thereof to actuate the belt assembly of the passthrough belted end effector.

The process 1400 may then proceed to pull the full tray from the tray position of the item sortation machine to an interior of the passthrough belted end effector using the belts, as at 1408. For example, upon engagement between at least a portion of the one or more belts and rollers of the belt assembly and an underside or other portion of the full tray, the belt assembly may be actuated to at least partially lift, and/or pull or move the full tray from the tray position of the item sortation system and into an interior of the passthrough end effector. In example embodiments, the belt assembly may pull the full tray substantially or completely into an interior of the passthrough end effector. Further, a control system may provide instructions or commands to the gantry system, passthrough belted end effector, or components thereof to actuate the belt assembly of the passthrough belted end effector.

The process 1400 may continue with actuating the one or more belts to move the full tray from the interior of the passthrough belted end effector to a conveyor, as at 1410. For example, the one or more belts and rollers of the belt assembly may be actuated to push or move the full tray out of an interior of the passthrough belted end effector. In example embodiments, a gantry system may move the passthrough belted end effector to a desired position or orientation adjacent a downstream station or process, e.g., a portion of a conveyor, to which the full tray is to be moved, and then actuate the belt assembly to push or move the full tray out of the interior of the passthrough belted end effector to the downstream station or process. In other example embodiments, one or more sensors (similar to sensors 640, 743 described with respect to FIGS. 6A-8D) may be associated with the conveyor, e.g., the upper tier of the conveyor, in order to identify the full tray, identify one or more items sorted to the full tray, identify a presence of the full tray, identify a position or orientation of the full tray, identify one or more other trays associated with or positioned on the conveyor, etc. Further, a control system may provide instructions or commands to the gantry system, passthrough belted end effector, or components thereof to actuate the belt assembly of the passthrough belted end effector.

The process 1400 may proceed with pushing the full tray from the interior of the passthrough end effector to a conveyor using the belts, as at 1412. For example, the one or more belts and rollers of the belt assembly may be actuated to push or move the full tray from the interior of the passthrough end effector to a downstream station or process, such as a portion of a conveyor. In example embodiments, the belt assembly may push the full tray substantially or completely out of an interior of the passthrough end effector. Further, a control system may provide instructions or commands to the gantry system, passthrough belted end effector, or components thereof to actuate the belt assembly of the passthrough belted end effector. The process 1400 may then end, as at 1414.

Thereafter, the example passthrough belted end effector tray removal process 1400 of the automated tray handling system described with respect to FIG. 14 may be substantially repeated to continuously remove additional full trays from tray positions of the item sortation system and place additional full trays at downstream stations or processes. At least in part because of the operations of the gantry system and associated passthrough belted end effector, substantially all tray positions of the item sortation system may be maintained occupied by trays that are ready to receive sorted items, by efficiently and quickly removing full trays from tray positions to downstream stations or processes.

Figure 15:
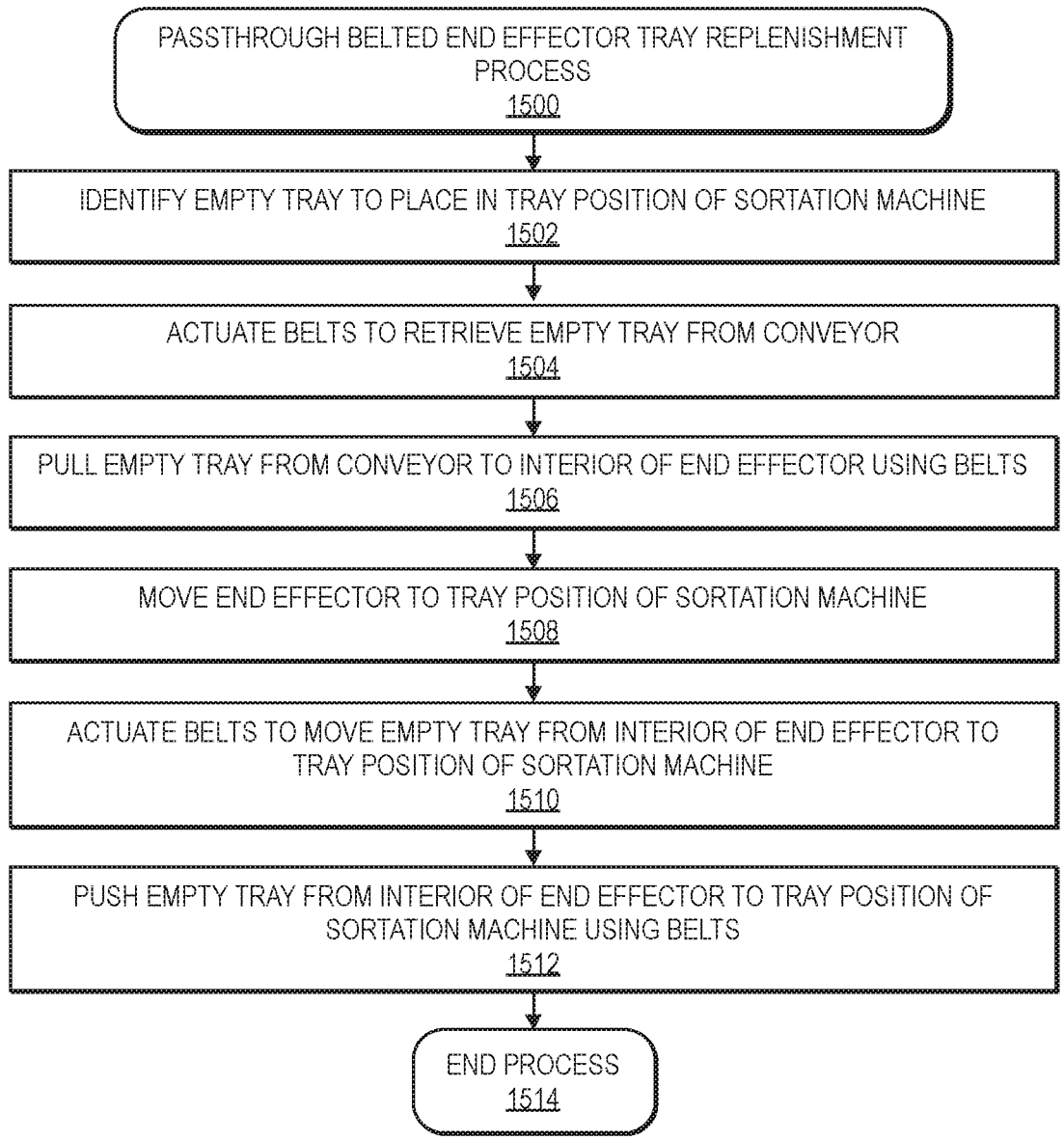
FIG. 15 is a flow diagram illustrating an example passthrough belted end effector tray replenishment process, in accordance with disclosed implementations.

FIG. 15 is a flow diagram illustrating an example passthrough belted end effector tray replenishment process 1500, in accordance with disclosed implementations.

The process 1500 may begin by identifying an empty tray to place at a tray position of an item sortation machine, as at 1502. For example, one or more sensors, such as imaging sensors, barcode scanning sensors, RFID readers, or other sensors, may identify an empty tray at an upstream station or process that is to be placed at a respective tray position of an item sortation system. In example embodiments, the one or more sensors may be associated with a passthrough belted end effector coupled to a gantry system. In other example embodiments, one or more sensors (similar to sensors 640, 743 described with respect to FIGS. 6A-8D) may be associated with the conveyor, e.g., the lower tier of the conveyor, in order to identify the empty tray, identify a presence of the empty tray, identify a position or orientation of the empty tray, etc. Further, a control system may provide instructions or commands to the gantry system, passthrough belted end effector, or components thereof to identify an empty tray to be placed at a respective tray position of an item sortation system.

The process 1500 may then continue to actuate the one or more belts to retrieve the empty tray from the conveyor, as at 1504. For example, the one or more belts and rollers of the belt assembly may be actuated to engage with an underside or other portion of the empty tray, at least partially lift the empty tray, and/or pull or move the empty tray toward an interior of the passthrough belted end effector. In example embodiments, a gantry system may move the passthrough belted end effector to a desired position or orientation adjacent the upstream station or process, e.g., a portion of a conveyor, from which the empty tray is to be retrieved. Further, a control system may provide instructions or commands to the gantry system, passthrough belted end effector, or components thereof to actuate the belt assembly of the passthrough belted end effector.

The process 1500 may then proceed to pull the empty tray from the conveyor to an interior of the passthrough belted end effector using the belts, as at 1506. For example, upon engagement between at least a portion of the one or more belts and rollers of the belt assembly and an underside or other portion of the empty tray, the belt assembly may be actuated to at least partially lift, and/or pull or move the empty tray from the upstream station or process and into an interior of the passthrough end effector. In example embodiments, the belt assembly may pull the empty tray substantially or completely into an interior of the passthrough end effector. Further, a control system may provide instructions or commands to the gantry system, passthrough belted end effector, or components thereof to actuate the belt assembly of the passthrough belted end effector.

The process 1500 may continue by moving the passthrough belted end effector toward the tray position of the item sortation machine, as at 1508. For example, a gantry system may position and orient the passthrough belted end effector to align with the tray position of the item sortation system. In example embodiments, the gantry system may move and rotate the passthrough belted end effector to a desired position and orientation. Further, a control system may provide instructions or commands to the gantry system, passthrough belted end effector, or components thereof to move the passthrough belted end effector using the gantry system.

The process 1500 may proceed by actuating the one or more belts to move the empty tray from the interior of the passthrough belted end effector to a tray position of the item sortation machine, as at 1510. For example, the one or more belts and rollers of the belt assembly may be actuated to push or move the empty tray out of an interior of the passthrough belted end effector. In example embodiments, a gantry system may move the passthrough belted end effector to a desired position or orientation adjacent the tray position of an item sortation system at which the empty tray is to be placed, and then actuate the belt assembly to push or move the empty tray out of the interior of the passthrough belted end effector to the tray position. Further, a control system may provide instructions or commands to the gantry system, passthrough belted end effector, or components thereof to actuate the belt assembly of the passthrough belted end effector.

The process 1500 may proceed with pushing the empty tray from the interior of the passthrough end effector to the tray position of the item sortation machine using the belts, as at 1512. For example, the one or more belts and rollers of the belt assembly may be actuated to push or move the empty tray from the interior of the passthrough end effector to the tray position of the item sortation system. In example embodiments, the belt assembly may push the empty tray substantially or completely out of an interior of the passthrough end effector. Further, a control system may provide instructions or commands to the gantry system, passthrough belted end effector, or components thereof to actuate the belt assembly of the passthrough belted end effector. The process 1500 may then end, as at 1514.

Thereafter, the example passthrough belted end effector tray replenishment process 1500 of the automated tray handling system described with respect to FIG. 15 may be substantially repeated to continuously remove additional empty trays from upstream stations or processes and place additional empty trays at tray positions of the item sortation system. At least in part because of the operations of the gantry system and associated passthrough belted end effector, substantially all tray positions of the item sortation system may be maintained occupied by trays that are ready to receive sorted items, by efficiently and quickly refilling empty trays at tray positions from upstream stations or processes.

For the example embodiments described herein that utilize gantry systems and passthrough end effectors instead of robotic arms and dual end effectors, the gantry systems and passthrough end effectors may reduce a required space or footprint of the automated tray handling systems because the gantry systems and passthrough end effectors may not need the space and/or clearance that may be required for movement, translation, rotation, and/or manipulation of trays by robotic arms and dual end effectors. Thus, the required space or footprint of example embodiments utilizing gantry systems and passthrough end effectors may be up to or approximately 50% less than a required space or footprint of example embodiments utilizing robotic arms and dual end effectors. Furthermore, example embodiments utilizing gantry systems and passthrough end effectors may operate at up to or approximately 50% greater unit processing density or capacity than example embodiments utilizing robotic arms and dual end effectors, at least partially due to the reduced movement, translation, rotation, and/or manipulation of trays relative to item sortation systems and upstream or downstream stations or processes required by gantry systems and passthrough end effectors as compared to the movement, translation, rotation, and/or manipulation of trays required by robotic arms and dual end effectors.

In other example embodiments, various of the end effectors described herein, including dual end effectors, passthrough end effectors, and/or passthrough belted end effectors may be utilized in combination with robotic arms, such as six-axis robotic arms. Likewise, in further example embodiments, various of the end effectors described herein, including dual end effectors, passthrough end effectors, and/or passthrough belted end effectors may be utilized in combination with gantry systems. Moreover, still further example embodiments of the automated tray handling systems described herein may utilize various combinations of robotic arms and gantry systems, in combination with various end effectors described herein.

In further example embodiments, the passthrough end effectors and/or the passthrough belted end effectors may include or utilize other types or configurations of grasping or gripping elements. For example, one or more finger assemblies of passthrough end effectors may grip flanges, lips, edges, surfaces, undersides, or other portions of trays using suction, magnetism, electromagnetism, gripping arms, or other grasping or gripping elements, in place of or in addition to upper fingers and/or lower fingers. In addition, one or more belt or roller assemblies of passthrough end effectors may also grip flanges, lips, edges, surfaces, undersides, or other portions of trays using suction, magnetism, electromagnetism, gripping arms, or other grasping or gripping elements, in place of or in addition to belts. In order to utilize suction, one or more suction or vacuum cups or grippers may be associated with the end effectors to contact and grip flanges, lips, edges, surfaces, undersides, or other portions of trays to move the trays. In order to utilize magnetism or electromagnetism, one or more magnets or electromagnets and one or more magnetic elements may be associated with the end effectors and trays to contact and grip flanges, lips, edges, surfaces, undersides, or other portions of trays to move the trays. Various other types of grasping or gripping elements may be used in place or in combination with upper fingers, lower fingers, belts, rollers, suction, magnetism, or other elements.

Figure 16:
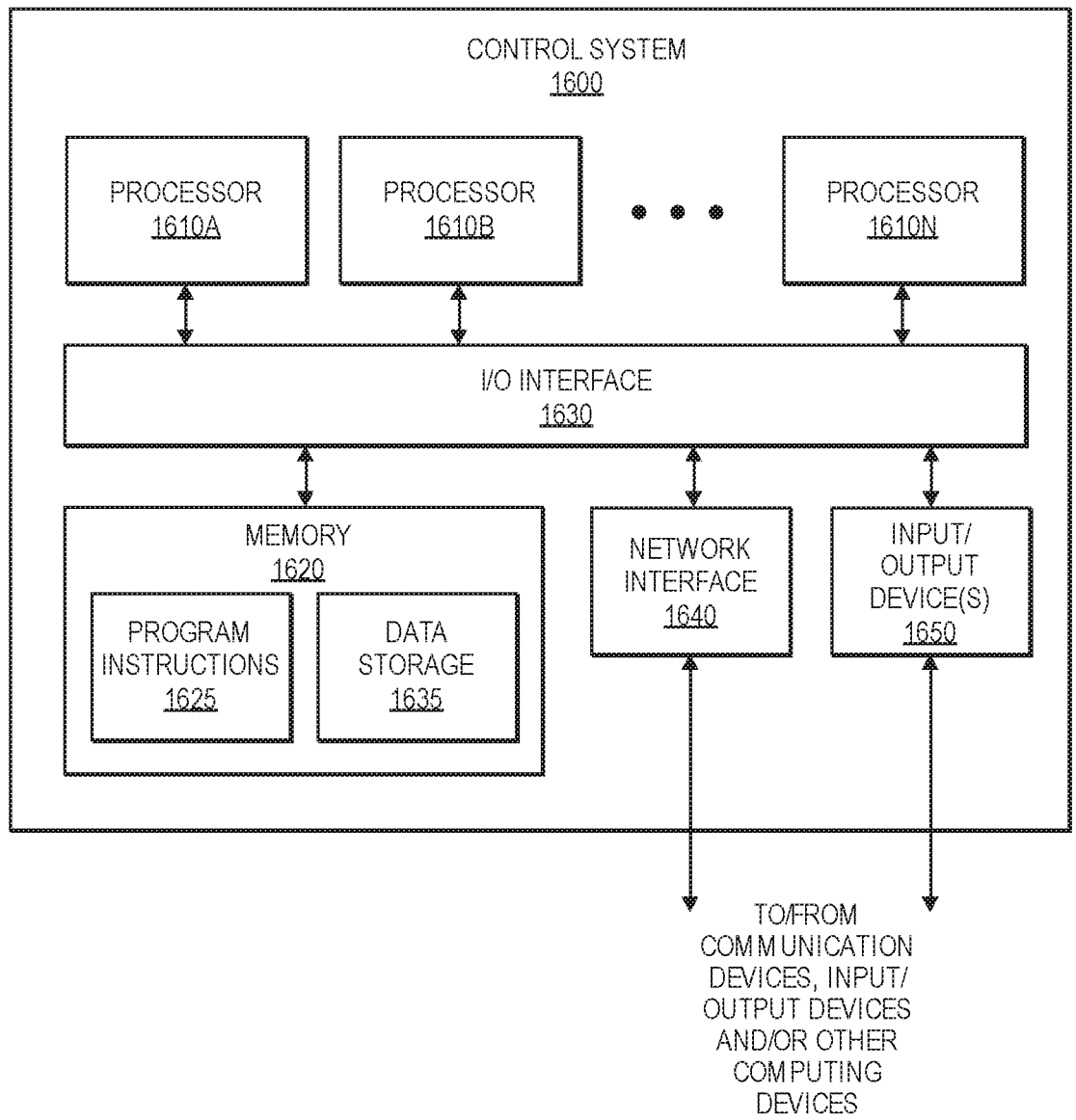
FIG. 16 is a block diagram illustrating an example control system, in accordance with disclosed implementations.

FIG. 16 is a block diagram illustrating an example control system 1600, in accordance with disclosed implementations.

Various operations of a control system, such as those described herein, may be executed on one or more computer systems, and/or interacting with various other computers, systems, or devices in a material handling facility, according to various implementations. For example, the control system discussed above may function and operate on one or more computer systems. One such control system is illustrated by the block diagram in FIG. 16. In the illustrated implementation, a control system 1600 includes one or more processors 1610A, 1610B through 1610N, coupled to a non-transitory computer-readable storage medium 1620 via an input/output (I/O) interface 1630. The control system 1600 further includes a network interface 1640 coupled to the I/O interface 1630, and one or more input/output devices 1650. In some implementations, it is contemplated that a described implementation may be implemented using a single instance of the control system 1600 while, in other implementations, multiple such systems or multiple nodes making up the control system 1600 may be configured to host different portions or instances of the described implementations. For example, in one implementation, some data sources or services (e.g., related to portions of a sortation and automated tray handling system, operations, or processes, etc.) may be implemented via one or more nodes of the control system 1600 that are distinct from those nodes implementing other data sources or services (e.g., related to other portions of a sortation and automated tray handling system, operations, or processes, etc.).

In various implementations, the control system 1600 may be a uniprocessor system including one processor 1610A, or a multiprocessor system including several processors 1610A-1610N (e.g., two, four, eight, or another suitable number). The processors 1610A-1610N may be any suitable processor capable of executing instructions. For example, in various implementations, the processors 1610A-1610N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1610A-1610N may commonly, but not necessarily, implement the same ISA.

The non-transitory computer-readable storage medium 1620 may be configured to store executable instructions and/or data accessible by the one or more processors 1610A-1610N. In various implementations, the non-transitory computer-readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1620 as program instructions 1625 and data storage 1635, respectively. In other implementations, program instructions and/or data may be received, sent or stored upon different types of computer-accessible media, such as non-transitory media, or on similar media separate from the non-transitory computer-readable storage medium 1620 or the control system 1600. Generally speaking, a non-transitory, computer-readable storage medium may include storage media or memory media such as magnetic or optical media, e.g., disk or CD/DVD-ROM, coupled to the control system 1600 via the I/O interface 1630. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1640.

In one implementation, the I/O interface 1630 may be configured to coordinate I/O traffic between the processors 1610A-1610N, the non-transitory computer-readable storage medium 1620, and any peripheral devices, including the network interface 1640 or other peripheral interfaces, such as input/output devices 1650. In some implementations, the I/O interface 1630 may perform any necessary protocol, timing or other data transformations to convert data signals from one component (e.g., non-transitory computer-readable storage medium 1620) into a format suitable for use by another component (e.g., processors 1610A-1610N). In some implementations, the I/O interface 1630 may include support for devices attached through various types of peripheral buses, such as a variant of the Peripheral Component Interconnect (PCI) bus standard or the Universal Serial Bus (USB) standard, for example. In some implementations, the function of the I/O interface 1630 may be split into two or more separate components, such as a north bridge and a south bridge, for example. Also, in some implementations, some or all of the functionality of the I/O interface 1630, such as an interface to the non-transitory computer-readable storage medium 1620, may be incorporated directly into the processors 1610A-1610N.

The network interface 1640 may be configured to allow data to be exchanged between the control system 1600 and other devices attached to a network, such as other control systems, computer systems, robotic arms, manipulators, or systems, gantry systems, various end effectors, various types of sensors, item sortation systems or machines, robotic or mobile drive units and systems, conveyors, upstream stations or processes, downstream stations or processes, other material handling systems or equipment, or between nodes of the control system 1600. In various implementations, the network interface 1640 may support communication via wired or wireless general data networks, such as any suitable type of Ethernet network.

Input/output devices 1650 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1600. Multiple input/output devices 1650 may be present in the control system 1600 or may be distributed on various nodes of the control system 1600. In some implementations, similar input/output devices may be separate from the control system 1600 and may interact with one or more nodes of the control system 1600 through a wired or wireless connection, such as over the network interface 1640.

As shown in FIG. 16, the memory 1620 may include program instructions 1625 that may be configured to implement one or more of the described implementations and/or provide data storage 1635, which may comprise various tables, data stores and/or other data structures accessible by the program instructions 1625. The program instructions 1625 may include various executable instructions, programs, or applications to facilitate automated tray handling operations and processes described herein, such as item sortation controllers, drivers, or applications, robotic arm, manipulator, or apparatus controllers, drivers, or applications, gantry system controllers, drivers, or applications, end effector controllers, drivers, or applications, motor or actuator controllers, drivers, or applications, sensor controllers, drivers, or applications, sensor data processing applications, imaging data processing applications, conveyor controllers, drivers, or applications, upstream station controllers, drivers, or applications, downstream station controllers, drivers, or applications, etc. The data storage 1635 may include various data stores for maintaining data related to systems, operations, or processes described herein, such as item sortation systems or machines, robotic arms, manipulators, or apparatus, gantry systems, end effectors, actuators, motors, sensors, sensor data, trays, tray positions, items, item data, conveyors and other material handling equipment or apparatus, upstream systems, stations, or processes, downstream systems, stations, or processes, etc.

Those skilled in the art will appreciate that the control system 1600 is merely illustrative and is not intended to limit the scope of implementations. In particular, the control system and devices may include any combination of hardware or software that can perform the indicated functions, including computers, network devices, internet appliances, robotic devices, etc. The control system 1600 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An automated tray handling system, comprising:
a robotic arm; and
a dual end effector comprising:
a frame coupled to the robotic arm; and
tray grasping elements associated with opposite sides of the frame, the tray grasping elements comprising:
a first set of tray grasping elements associated with a first side of the frame and configured to lift a first tray via a flange of the first tray;
a first locking plate configured to lock the flange of the first tray relative to the first set of tray grasping elements;
a second set of tray grasping elements associated with a second side of the frame and configured to lift a second tray via a flange of the second tray; and
a second locking plate configured to lock the flange of the second tray relative to the second set of tray grasping elements;
wherein the robotic arm is configured to move the first tray relative to a first tray position of an item sortation system via the first set of tray grasping elements and the first locking plate, and the robotic arm is configured to move the second tray relative to a second tray position of the item sortation system via the second set of tray grasping elements and the second locking plate.

2. The automated tray handling system of claim 1, wherein:
the first set of tray grasping elements is configured to engage with an underside of the flange of the first tray; and
the second set of tray grasping elements is configured to engage with an underside of the flange of the second tray.

3. The automated tray handling system of claim 1, wherein:
the first locking plate is configured to engage with an upper side of the flange of the first tray; and
the second locking plate is configured to engage with an upper side of the flange of the second tray.

4. The automated tray handling system of claim 1, wherein the dual end effector further comprises:
a first actuator configured to move the first locking plate between an open position and a closed position in which the first locking plate locks the flange of the first tray relative to the first set of tray grasping elements; and
a second actuator configured to move the second locking plate between an open position and a closed position in which the second locking plate locks the flange of the second tray relative to the second set of tray grasping elements.

5. The automated tray handling system of claim 4, wherein the dual end effector further comprises:
at least one sensor configured to at least one of:
determine a distance to at least one of the first tray or the second tray;

detect a presence of at least one of the first tray or the second tray;

determine a position of at least one of the first actuator or the second actuator;

identify at least one of the first tray or the second tray; or identify at least one item within at least one of the first tray or the second tray.

6. An apparatus, comprising:

a robotic system; and an end effector coupled to the robotic system, the end effector comprising a grasping element configured to engage and lift a tray via an underside of a flange of the tray;

wherein the robotic system is configured to lift and move the tray from a tray position of a sortation system to a downstream station;

wherein the robotic system is further configured to lift and move a second tray from an upstream station to the tray position of the sortation system.

7. The apparatus of claim 6, wherein the robotic system comprises at least one of a robotic arm or a gantry.

8. The apparatus of claim 6, wherein the tray includes at least one item sorted to the tray by the sortation system, and the second tray is an empty tray; and wherein the downstream station comprises an upper level of a two-tier conveyor, and the upstream station comprises a lower level of the two-tier conveyor.

9. An apparatus, comprising:

a robotic system; and an end effector coupled to the robotic system, the end effector comprising:

a grasping element configured to engage and lift a tray via an underside of a flange of the tray, wherein the grasping element is shaped to fit within and engage with the underside of the flange of the tray;

a locking plate configured to engage with an upper side of the flange of the tray; and an actuator configured to move the locking plate between an open position and a closed position in which the locking plate locks the flange of the tray relative to the grasping element;

wherein the robotic system is configured to lift and move the tray from a tray position of a sortation system to a downstream station.

10. The apparatus of claim 9, wherein the grasping element comprises a plurality of grasping elements that are offset from each other around an axis of rotation of the end effector.

11. An apparatus, comprising:

a robotic system; and an end effector coupled to the robotic system, the end effector comprising:

a grasping element configured to engage and lift a tray via an underside of a flange of the tray, wherein the grasping element comprises a lifting finger shaped to fit within and engage with the underside of the flange of the tray;

an actuator configured to move the lifting finger between a lowered position and a raised position in which the lifting finger engages and lifts the flange of the tray; and a linear actuator configured to translate the lifting finger such that the tray is pulled or pushed relative to an interior of the end effector;

wherein the robotic system is configured to lift and move the tray from a tray position of a sortation system to a downstream station.

12. The apparatus of claim 11, wherein the grasping element of the end effector further comprises a second finger shaped to engage with an upper edge of the tray.

13. The apparatus of claim 12, wherein the end effector further comprises:

a second actuator configured to move the second finger between a raised position and a lowered position in which the second finger engages the upper edge of the tray; and a second linear actuator configured to translate the second finger such that the tray is pulled or pushed relative to an interior of the end effector.

14. A method, comprising:

instructing, by a control system, a robotic system to move an end effector toward a tray at a tray position of a sortation system, wherein the end effector comprises a first grasping element and a second grasping element;

instructing, by the control system, the first grasping element of the end effector to engage and lift the tray at the tray position of the sortation system via an underside of a flange of the tray; and instructing, by the control system, the robotic system to remove the tray from the tray position of the sortation system and move the tray to a downstream station using at least the first grasping element;

wherein the first grasping element and the second grasping element are offset from each other around an axis of rotation of the end effector.

15. The method of claim 14, further comprising:

instructing, by the control system, the robotic system to move the end effector toward an empty tray at an upstream station;

instructing, by the control system, the second grasping element of the end effector to engage and lift the empty tray at the upstream station via an underside of a flange of the empty tray; and instructing, by the control system, the robotic system to remove the empty tray from the upstream station and move the empty tray to an empty tray position of the sortation system using the second grasping element;

wherein the first grasping element includes a first locking plate configured to engage with an upper side of the flange of the tray; and wherein the second grasping element includes a second locking plate configured to engage with an upper side of the flange of the empty tray.

16. A method, comprising:

instructing, by a control system, a robotic system to move an end effector toward a tray at a tray position of a sortation system;

instructing, by the control system, a first grasping element of the end effector to engage and lift the tray at the tray position of the sortation system via an underside of a flange of the tray; and instructing, by the control system, the robotic system to remove the tray from the tray position of the sortation system and move the tray to a downstream station using at least the first grasping element;

wherein the end effector comprises a passthrough end effector such that the tray is moved through an interior of the end effector.

17. The method of claim 16, further comprising:
instructing, by the control system, the robotic system to move the end effector toward an empty tray at an upstream station;
instructing, by the control system, a second grasping element of the end effector to engage the empty tray at the upstream station via an upper edge of the empty tray; and
instructing, by the control system, the robotic system to remove the empty tray from the upstream station and move the empty tray to an empty tray position of the sortation system using at least the second grasping element;
wherein the first grasping element comprises a lower finger assembly, and the second grasping element comprises an upper finger assembly; and
wherein the end effector comprises the passthrough end effector such that and the empty tray is moved through the interior of the end effector.

18. The method of claim 17, wherein:
instructing, by the control system, the robotic system to remove the tray from the tray position of the sortation system and move the tray to the downstream station using at least the first grasping element further comprises:
instructing, by the control system, the first grasping element to move the tray from the tray position of the sortation system to the interior of the end effector; and
instructing, by the control system, the second grasping element to move the tray from the interior of the end effector to the downstream station; and
instructing, by the control system, the robotic system to remove the empty tray from the upstream station and move the empty tray to the empty tray position of the sortation system using at least the second grasping element further comprises:
instructing, by the control system, the second grasping element to move the empty tray from the upstream station to the interior of the end effector; and
instructing, by the control system, one of the first grasping element or the second grasping element to move the empty tray from the interior of the end effector to the empty tray position of the sortation system.

19. A system, comprising:
a sortation system comprising an array of trays associated with respective tray positions;
a robotic system; and
a passthrough end effector coupled to the robotic system and configured to manipulate individual trays of the array of trays;
wherein the passthrough end effector is configured to move individual trays through an interior of the passthrough end effector between respective tray positions of the sortation system and at least one of an upstream station or a downstream station.

20. The system of claim 19, wherein the robotic system comprises a two-axis gantry system configured to move the passthrough end effector along a substantially vertical plane that is substantially parallel to a plane associated with the array of trays.

21. The system of claim 20, wherein the passthrough end effector is configured to move individual trays through the interior of the passthrough end effector in a direction substantially perpendicular to the substantially vertical plane.

22. The system of claim 19, wherein the passthrough end effector comprises at least one tray guide along which individual trays slide through the interior of the passthrough end effector.

23. The system of claim 19, wherein the passthrough end effector comprises at least one of an upper finger assembly, a lower finger assembly, a belt assembly, a suction assembly, or a magnetic assembly configured to grasp and move individual trays through the interior of the passthrough end effector.

* * * * *